United States Patent
Uehara

(10) Patent No.: US 10,990,786 B2
(45) Date of Patent: Apr. 27, 2021

(54) DETECTION APPARATUS

(71) Applicant: Japan Display Inc., Tokyo (JP)

(72) Inventor: Toshinori Uehara, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 16/694,033

(22) Filed: Nov. 25, 2019

(65) Prior Publication Data

US 2020/0175242 A1    Jun. 4, 2020

(30) Foreign Application Priority Data

Nov. 30, 2018  (JP) .............................. JP2018-226099

(51) Int. Cl.
*G06K 9/00*  (2006.01)
*G06F 3/044*  (2006.01)

(52) U.S. Cl.
CPC ......... *G06K 9/0002* (2013.01); *G06F 3/0446* (2019.05); *G06F 2203/04107* (2013.01); *G06F 2203/04108* (2013.01); *G06K 9/00033* (2013.01)

(58) Field of Classification Search
CPC .............. G06K 9/0002; G06K 9/00033; G06F 3/0446; G06F 2203/04108; G06F 2203/04107
See application file for complete search history.

(56) References Cited

U.S. PATENT DOCUMENTS

| | | | |
|---|---|---|---|
| 8,320,403 B2 | 11/2012 | Hood | |
| 8,462,136 B2 | 6/2013 | Oda et al. | |
| 8,682,949 B2 | 3/2014 | Matsushima | |
| 2011/0043478 A1 | 2/2011 | Matsushima | |
| 2017/0285847 A1* | 10/2017 | Uehara | ............... G06F 3/04166 |
| 2017/0285865 A1 | 10/2017 | Uehara | |
| 2019/0102006 A1* | 4/2019 | Suzuki | ..................... G01D 5/24 |
| 2019/0171314 A1 | 6/2019 | Hamaguchi | |

FOREIGN PATENT DOCUMENTS

JP        2017-188106 A    10/2017

* cited by examiner

*Primary Examiner* — Christopher J Kohlman
(74) *Attorney, Agent, or Firm* — K&L Gates LLP

(57) ABSTRACT

A detection apparatus includes: a plurality of detection electrodes; a detection circuit configured to be coupled to the detection electrodes; and a coupling circuit configured to cause the detection electrodes to be a coupled state in which the detection electrodes are coupled to the detection circuit and a non-coupled state in which the detection electrodes are uncoupled from the detection circuit. The detection apparatus has a plurality of selection patterns of the detection electrodes causing detection electrodes as first selection targets among the detection electrodes to be the coupled state and causing detection electrodes as second selection targets to be the non-coupled state. The selection patterns do not include any selection patterns causing detection electrodes as the first selection targets to be the non-coupled state and causing detection electrodes as the second selection targets to be the coupled state.

8 Claims, 29 Drawing Sheets

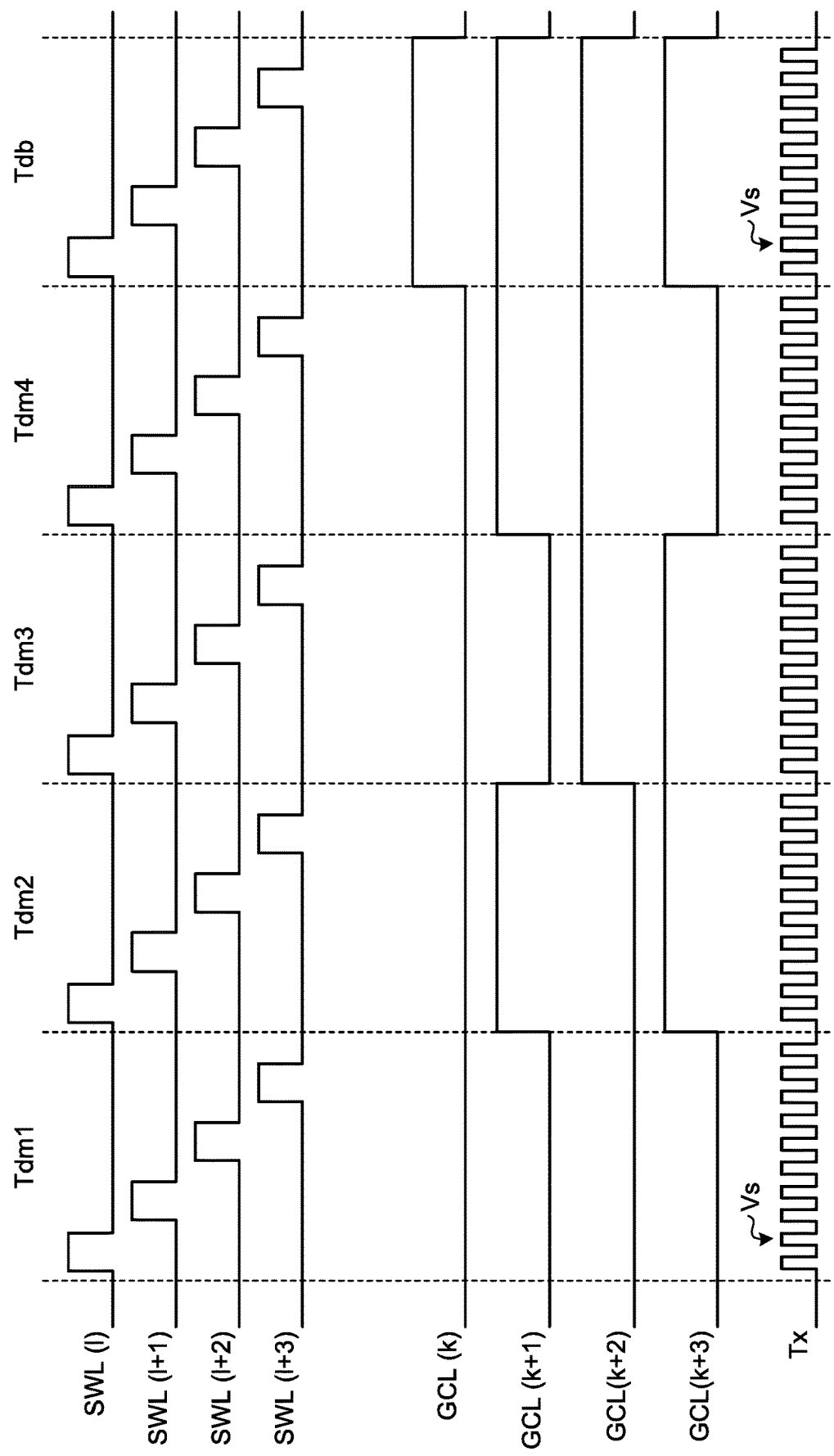

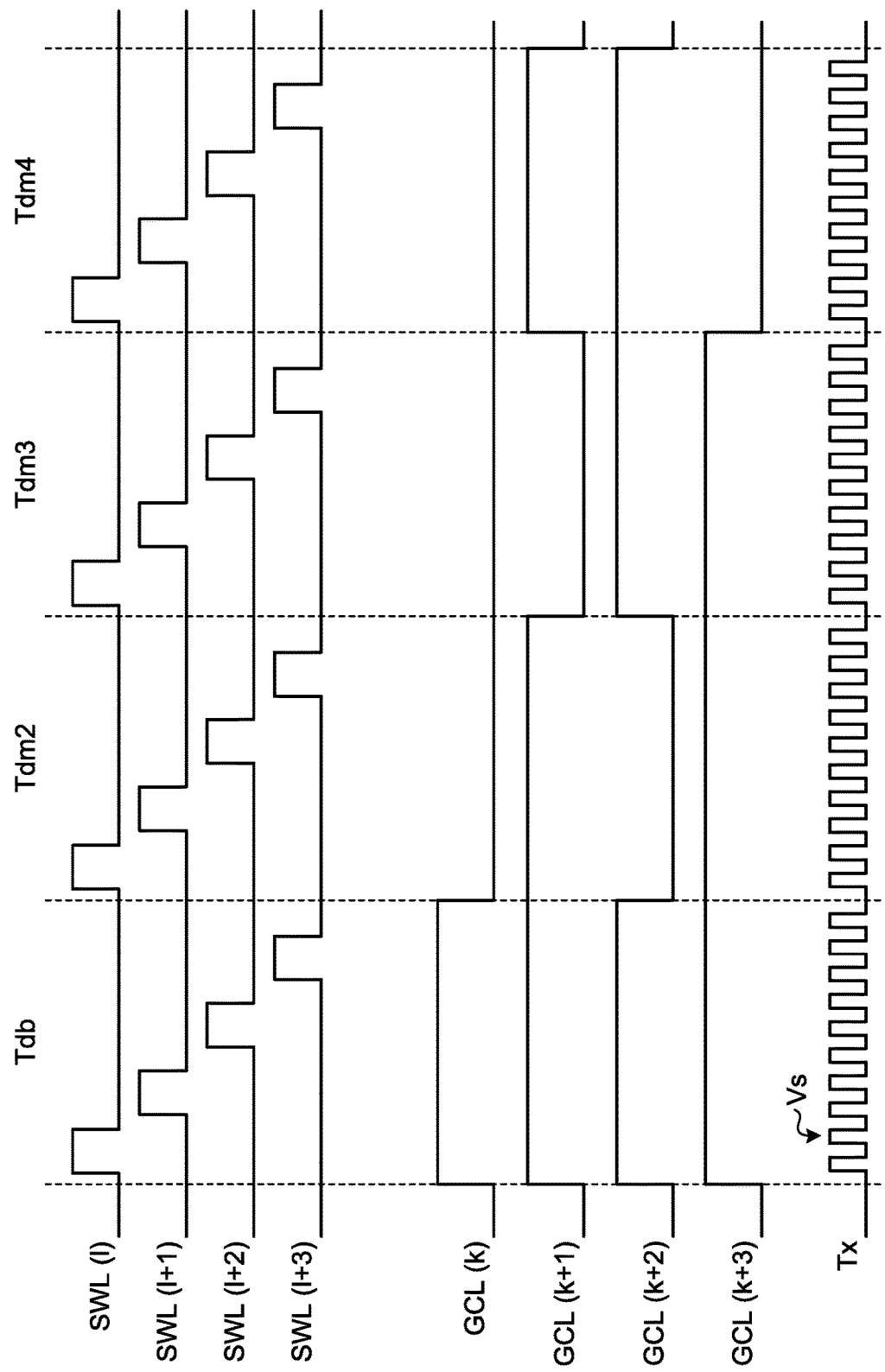

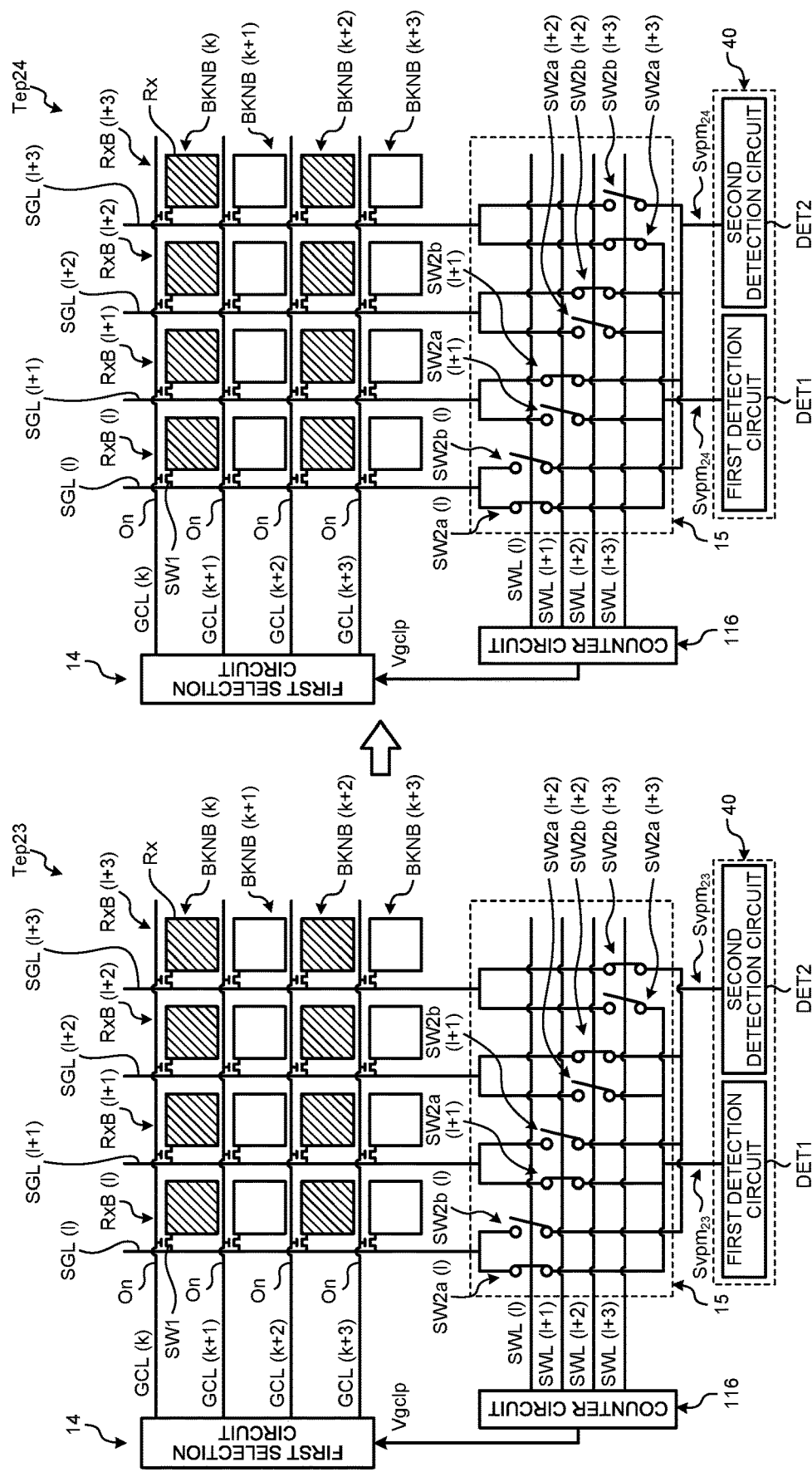

DETECTION APPARATUS

CROSS-REFERENCE TO RELATED APPLICATIONS

This application claims priority from Japanese Application No. 2018-226099, filed on Nov. 30, 2018, the contents of which are incorporated by reference herein in its entirety.

BACKGROUND

1. Technical Field

The present invention relates to a detection apparatus.

2. Description of the Related Art

It is known that there is a method for improving accuracy in a detection apparatus that can detect an external proximity object based on a change in capacitance, by switching among a plurality of combination patterns of detection electrodes that are used for detection and detection electrodes that are not used for detection among a plurality of detection electrodes.

The method described above assumes that, in each detection process, signals are integrated by using two combination patterns that are opposite to each other in the positional relation between the detection electrodes that are used for detection and the detection electrodes that are not used for detection among the detection electrodes. Such a method has caused increases in various kinds of loads corresponding to detection accuracy such as the lengthening of one detection time caused by an increase in the number of combination patterns, the enlargement of the amount of data required for detection, and an increase in required data processing capability. Given these circumstances, there have been demands for a detection apparatus that can achieve both a reduction in loads and an improvement in accuracy.

For the foregoing reasons, there is a need for a detection apparatus that can achieve both a reduction in loads and an improvement in accuracy.

SUMMARY

According to an aspect, a detection apparatus includes: a plurality of detection electrodes; a detection circuit configured to be coupled to the detection electrodes to detect detection signals corresponding to changes in capacitance of the detection electrodes; and a coupling circuit configured to cause the detection electrodes to be a coupled state in which the detection electrodes are coupled to the detection circuit and a non-coupled state in which the detection electrodes are uncoupled from the detection circuit. The detection apparatus has a plurality of selection patterns of the detection electrodes causing detection electrodes as first selection targets among the detection electrodes to be the coupled state in which the detection electrodes as the first selection targets are coupled to the detection circuit and causing detection electrodes as second selection targets that are not included in the first selection targets to be the non-coupled state in which the detection electrodes as the second selection targets are not coupled to the detection circuit. The selection patterns do not include any selection patterns causing detection electrodes as the first selection targets to be the non-coupled state and causing detection electrodes as the second selection targets to be the coupled state.

BRIEF DESCRIPTION OF THE DRAWINGS

FIG. 13 is a diagram of drive waveforms of the detection apparatus in a second embodiment;

FIG. 15 is a diagram of drive waveforms corresponding to a first modification of the second embodiment;

FIGS. 17A to 7D are illustrative diagrams for illustrating an example of a selection pattern by a second selection circuit when detection electrodes are selected by a first selection circuit according to a fourth embodiment in accordance with a first selection pattern;

FIGS. 18A to 18D are illustrative diagrams for illustrating an example of a selection pattern by the second selection circuit when detection electrodes are selected by the first selection circuit according to the fourth embodiment in accordance with a second selection pattern;

DETAILED DESCRIPTION

Figure 1:
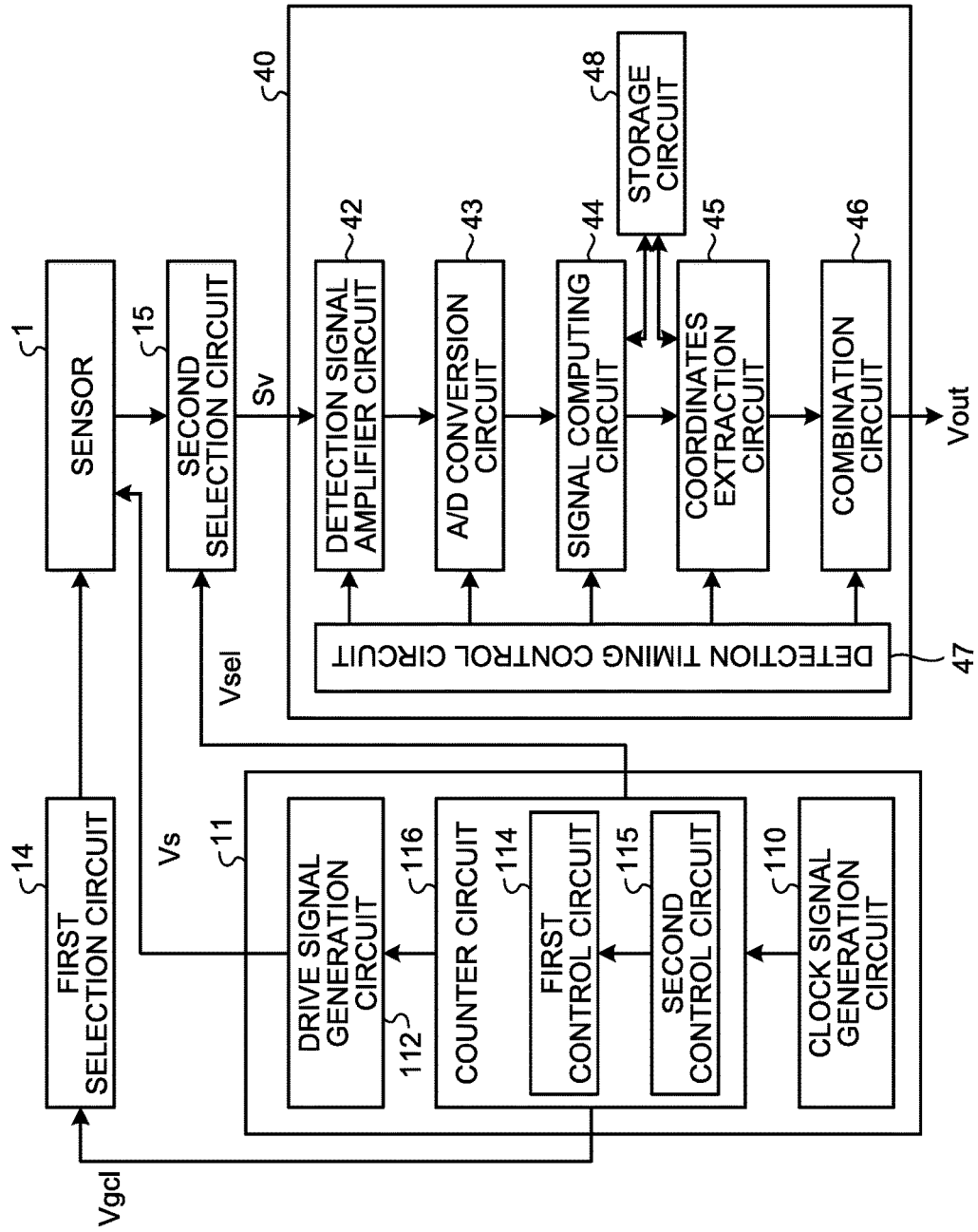
FIG. 1 is a block diagram of a configuration example of a detection apparatus according to a first embodiment.

The following describes modes (embodiments) for carrying out the present invention in detail with reference to the accompanying drawings. The details described in the embodiments below do not limit the present invention. Components described below include those easily conceivable by those skilled in the art or those substantially identical thereto. Further, the components described below can be combined as appropriate. The disclosure is only an example, and the scope of the present invention naturally includes appropriate changes with the gist of the invention maintained that can be easily thought of by those skilled in the art. To further clarify the description, widths, thicknesses, shapes, and the like of various parts are schematically illustrated in the drawings as compared with actual aspects thereof, in some cases. However, they are merely examples, and interpretation of the present disclosure is not limited thereto. In the present specification and the drawings, the same element as that illustrated in a drawing that has already been discussed is denoted by the same reference numeral through the specification and the drawings, and detailed description thereof will not be repeated in some cases where appropriate.

In this disclosure, when an element is described as being "on" another element, the element can be directly on the other element, or there can be one or more elements between the element and the other element.

First Embodiment

Figure 2:
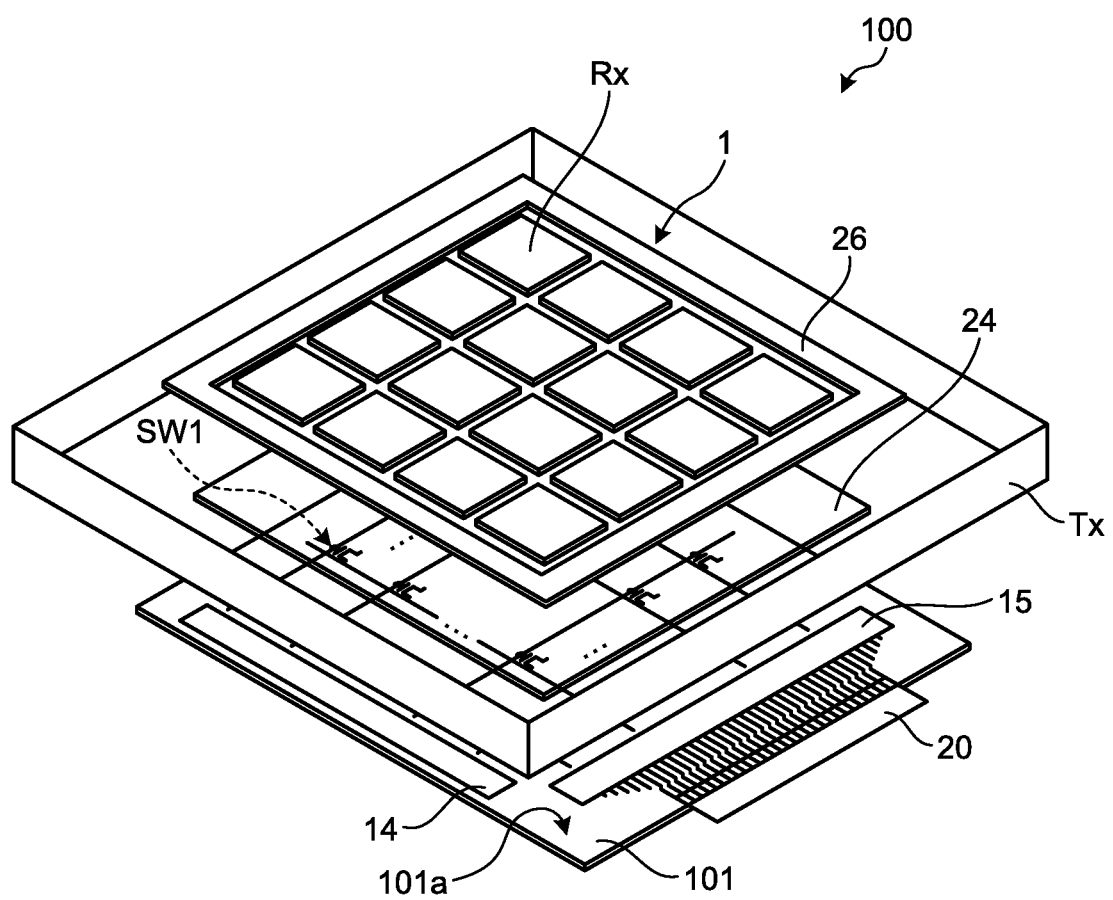
FIG. 2 is a schematic diagram of a configuration example of the detection apparatus.
Figure 3:
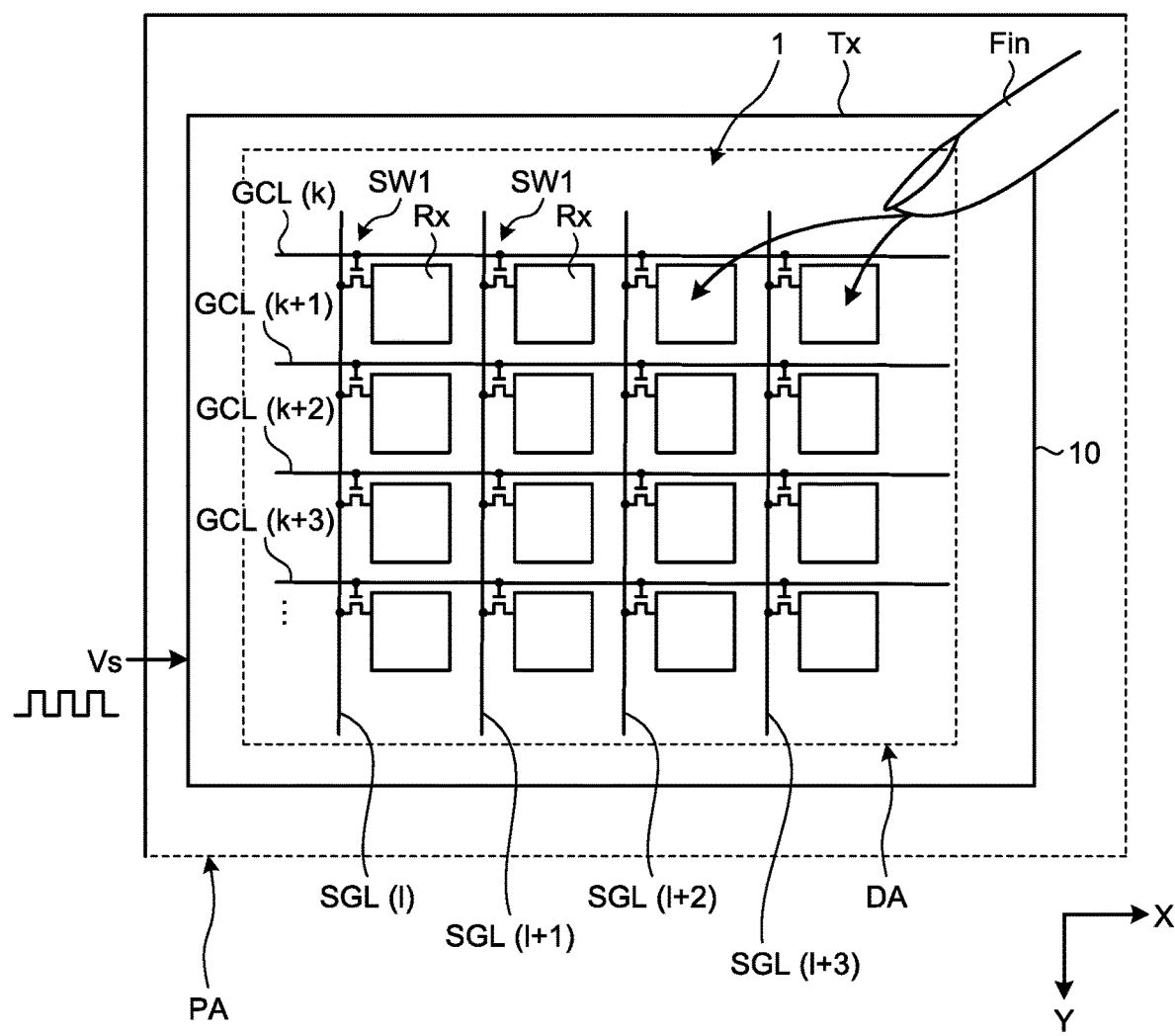
FIG. 3 is a schematic diagram of a configuration example of a sensor included in the detection apparatus.

FIG. 1 is a block diagram of a configuration example of a detection apparatus according to a first embodiment. FIG. 2 is a schematic diagram of a configuration example of the detection apparatus. FIG. 3 is a schematic diagram of a configuration example of a sensor included in the detection apparatus. The detection apparatus 100 of this embodiment is a detection apparatus detecting capacitance between a fine recess or a fine protrusion and a detection electrode and is a fingerprint detection apparatus, for example. As illustrated in FIG. 1, the detection apparatus 100 includes a sensor 1, a detection control circuit 11, a first selection circuit 14, a second selection circuit 15, and a detection circuit 40.

As illustrated in FIG. 2 and FIG. 3, the sensor 1 includes an insulating base member 101, a plurality of detection electrodes Rx provided on one face 101a of the base member 101, a plurality of switch elements SW1, scan lines GCL coupled to the switch elements SW1, data lines SGL coupled to the switch elements SW1, and a detection electrode Tx (a drive electrode). The switch elements SW1 are each a thin film transistor, for example. The scan lines GCL are wiring lines for supplying a scan signal to the switch elements SW1. When the switch elements SW1 are each a transistor, for example, the scan lines GCL are each coupled to a gate of the transistor. The data lines SGL are wiring lines electrically coupled to the detection electrodes Rx in accordance with the scan signal from the scan lines GCL. In other words, the data lines SGL are wiring lines to which detection signals Sv are output from the detection electrodes Rx. When the switch elements SW1 are each a transistor, for example, the data lines SGL are each coupled to a source of the transistor. The base member 101 is made of glass, for example. As illustrated in FIG. 2, the sensor 1 further has a shield layer 24 between the detection electrodes Rx and the switch elements SW1. In other words, the switch elements SW1, the scan lines GCL, and the data lines SGL are provided between the one face 101a of the base member 101 and the shield layer 24.

The first selection circuit 14 and the second selection circuit 15 are provided on the one face 101a of the base member 101. The data lines SGL are coupled to the second selection circuit 15. The scan lines GCL are coupled to the first selection circuit 14. The shield layer 24 is coupled to fixed potential (e.g., ground potential). This hinders the potential of the detection electrodes Rx from having an influence on the data lines SGL and the like and thus suppresses noise that would otherwise be caused. The shield layer 24 may be in a floating state, in which the potential thereof is not fixed.

As illustrated in FIG. 3, the sensor 1 has a detection area DA and a peripheral area PA other than the detection area DA. The detection area DA is rectangular in shape, for example. In the detection area DA, the detection electrodes Rx and the switch elements SW1 are arranged. The peripheral area PA of the sensor 1 is formed along at least one side of the detection area DA when the detection area DA is rectangular in shape. In the peripheral area PA of the sensor 1, the detection electrode Tx (the drive electrode) is arranged. The sensor 1 further has a conductor 26. The conductor 26 is arranged in the peripheral area PA. More specifically, the conductor 26 is arranged between the detection electrodes Rx and the detection electrode Tx. The conductor 26 is coupled to the detection circuit 40. The conductor 26 is an electrode for detecting the approach of an external object (e.g., a finger Fin) to the sensor 1. The conductor 26 is coupled to a clock signal generation circuit 110, for example, and a drive signal Vs is supplied thereto. When the finger Fin approaches the conductor 26, capacitance occurs between the conductor 26 and the finger Fin, and the capacitance value of the conductor 26 increases. A change in the capacitance value of the conductor 26 is detected by the detection circuit 40 coupled to the conductor 26, whereby the approach of the external object (e.g., the finger Fin) to the sensor 1 can be detected. The detection circuit 40 may stop supply of the drive signal Vs to the detection electrode Tx by the detection control circuit 11 and reception of the detection signals Sv from the detection electrodes Rx by the detection circuit 40 until the detection circuit 40 detects the approach the finger Fin by the conductor 26, and may start the operation of the detection electrode Tx by the detection control circuit 11 and the operation of the detection electrodes Rx by the detection circuit 40 when the approach of the finger Fin has been detected by the conductor 26. A mode of operating only the conductor 26 is referred to as a standby mode.

The drive signal Vs is supplied to the detection electrode Tx. The detection electrode Tx is arranged outside the detection area DA in which the detection electrodes Rx are arranged, for example. More specifically, the detection electrode Tx is arranged outside the conductor 26. That is to say, the conductor 26 is arranged between the detection electrodes Rx and the detection electrode Tx. The detection electrodes Rx, the conductor 26, and the detection electrode Tx are arranged spaced apart from each other.

The detection control circuit 11 controls each operation of the sensor 1, the first selection circuit 14, the second selection circuit 15, and the detection circuit 40. The detection control circuit 11 supplies the drive signal Vs for detection to the detection electrode Tx. The first selection circuit 14 supplies the scan signal to a scan line GCL selected based on a selection signal Vgcl supplied from the detection control circuit 11. In other words, the first selection circuit 14 is a selection circuit selecting a plurality of detection electrodes Rx (refer to FIG. 12 described later) coupled in a row direction (an X direction) and coupled to the scan line GCL. The first selection circuit 14 is a gate driver, such as a decoder. The second selection circuit 15 couples, to the detection circuit 40, a data line SGL selected based on a selection signal Vsel supplied from the detection control circuit 11. In other words, the second selection circuit 15 is a selection circuit selecting the detection electrodes Rx coupled to the data line SGL in a column direction (a Y direction). The second selection circuit 15 is a multiplexer, for example.

As illustrated in FIG. 3, for example, the sensor 1 has the detection electrodes Rx, scan lines GCL(k), GCL(k+1), . . . and data lines SGL(l), SGL(l+1), . . . . The k and l are each an integer equal to or greater than 1. The detection electrodes Rx are arranged in the row direction (the X direction) and the column direction (the Y direction) each. The scan lines GCL(k), GCL(k+1), . . . are wiring lines for turning on and off the switch elements SW1. The scan lines GCL(k), GCL(k+1), . . . are arranged in the column direction (the Y direction) and extend in the row direction (the X direction). The data lines SGL(l), SGL(l+1), . . . are wiring lines for outputting the detection signals Sv. The data lines SGL(l), SGL(l+1), . . . are arranged in the row direction (the X direction) and extend in the column direction (the Y direction). In the following description, when there is no need to separately describe the scan lines GCL(k), GCL(k+1), . . . , each of them will be referred to simply as a scan line GCL. When there is no need to separately describe the data lines SGL(l), SGL(l+1), . . . , each of them will be referred to simply as a data line SGL.

The first selection circuit 14 selects certain scan lines GCL (e.g., GCL(k) and GCL(k+2)) out of a plurality of scan lines GCL based on the selection signal Vgcl supplied from the detection control circuit 11. The first selection circuit 14 then applies a certain voltage (a scan signal) to the selected scan lines GCL(k) and GCL(k+2). With this operation, the detection electrodes Rx belonging to the k-th row and the detection electrodes Rx belonging to the (k+2)-th row are coupled to the second selection circuit 15 via the data lines SGL(l), SGL(l+1), . . . . The second selection circuit 15 selects certain data lines SGL (e.g., SGL(l)) out of a plurality of data lines SGL based on a signal supplied from the detection control circuit 11. The second selection circuit 15 then couples the selected data line SGL(l) to the detection circuit 40. With this operation, the detection signal Sv is supplied to the detection circuit 40 from the detection electrode Rx on the k-th row and the l-th column and the detection electrode Rx on the (k+2)-th row and the l-th column.

The detection circuit 40 detects a recess or a protrusion on the surface of the finger Fin or the like being in contact with or proximity to the sensor 1 based on the detection signal Sv output from the second selection circuit 15 in accordance with the signal supplied from the detection control circuit 11 to detect the shape and fingerprint of the finger Fin. The detection circuit 40 includes a detection signal amplifier circuit 42, an analog-to-digital (A/D) conversion circuit 43, a signal computing circuit 44, a coordinates extraction circuit 45, a combination circuit 46, a detection timing control circuit 47, and a storage circuit 48. The detection timing control circuit 47 performs control to cause the detection signal amplifier circuit 42, the A/D conversion circuit 43, the signal computing circuit 44, the coordinates extraction circuit 45, and the combination circuit 46 to operate in sync with each other based on a clock signal supplied from the detection control circuit 11.

The detection signal Sv is supplied to the detection signal amplifier circuit 42 of the detection circuit 40 from the sensor 1. The detection signal amplifier circuit 42 amplifies the detection signal Sv. The A/D conversion circuit 43 converts an analog signal output from the detection signal amplifier circuit 42 into a digital signal.

The signal computing circuit 44 is a logic circuit detecting a recess or protrusion of the finger Fin against the sensor 1 based on an output signal of the A/D conversion circuit 43. The signal computing circuit 44 calculates a differential signal of the detection signal Sv (an absolute value $|\Delta V|$) by the recess or protrusion of the finger Fin based on the detection signal Sv output from the sensor 1. The signal computing circuit 44 compares the absolute value $|\Delta V|$ with a certain threshold voltage and, if this absolute value $|\Delta V|$ is less than the threshold voltage (a second threshold Vth2), determines that the recess of the finger Fin has been detected. In contrast, if the absolute value $|\Delta V|$ is equal to or greater than the threshold voltage, the signal computing circuit 44 determines that the protrusion of the finger Fin has been detected. Thus, the detection circuit 40 can detect the recess or protrusion of the finger Fin. Likewise, when a signal is input to the detection circuit 40 via the conductor 26, the signal computing circuit 44 compares the absolute value $|\Delta V|$ with a certain threshold voltage and, if this absolute value $|\Delta V|$ is less than the threshold voltage (a first threshold Vth1), determines that the finger Fin is in a noncontact state. In contrast, if the absolute value $|\Delta V|$ is equal to or greater than the threshold voltage, the signal computing circuit 44 determines that the finger Fin is in a contact state.

As described later, the signal computing circuit 44 receives the detection signal Sv from a detection electrode block RxB to perform computation processing thereon based on a certain sign. The computed detection signal Sv is temporarily stored in the storage circuit 48. Further, the signal computing circuit 44 receives the detection signal Sv stored in the storage circuit 48 to perform decoding processing thereon based on the certain sign. The certain sign is stored in the storage circuit 48 in advance, for example. The detection control circuit 11 and the signal computing circuit 44 can read the certain sign stored in the storage circuit 48 at any timing. The storage circuit 48 may be any of a random access memory (RAM), a read only memory (ROM), a register circuit, and the like, for example.

The coordinates extraction circuit 45 is a logic circuit that, when the recess or protrusion of the finger Fin is detected by the signal computing circuit 44, determines its detected coordinates. The coordinates extraction circuit 45 calculates the detected coordinates based on a decoded detection signal Sid and outputs the obtained detected coordinates to the combination circuit 46. The combination circuit 46 combines the detected coordinates output from the coordinates extraction circuit 45 together to generate two-dimensional information indicating the shape and fingerprint of the finger Fin being in contact or proximity. The combination circuit 46 outputs an output signal Vout of the detection circuit 40 as the two-dimensional information. The combination circuit 46 may generate an image based on the two-dimensional information, and its image information may be the output signal Vout. At least one of the coordinates extraction circuit 45 and the combination circuit 46 may be arranged in an external apparatus coupled to the detection apparatus 100. In other words, a detection signal Sid decoded by the signal computing circuit 44 may be output as the output signal Vout. The detection apparatus 100 can detect the proximity of an object, not limited to the finger Fin, which can have an influence on the capacitance of the detection electrodes Rx.

As illustrated in FIG. 1, the detection control circuit 11 includes the clock signal generation circuit 110, a drive signal generation circuit 112, and a counter circuit 116. The counter circuit 116 includes a first control circuit 114 and a second control circuit 115.

The clock signal generation circuit 110 generates a clock signal. This clock signal is supplied to the counter circuit 116 of the detection control circuit 11 and the detection timing control circuit 47 of the detection circuit 40, for example.

The counter circuit 116 measures the number of pulses of the clock signal generated by the clock signal generation circuit 110. The counter circuit 116 then, based on the measured value of the number of pulses, generates a first timing control signal for controlling the timing at which a scan line GCL out of the scan lines GCL is selected and supplies the generated first timing control signal to the first control circuit 114. The first control circuit 114 generates the selection signal Vgcl (e.g., a selection signal Vgclp or a selection signal Vgclm illustrated in FIG. 12 described later) for selecting the detection electrode Rx (refer to FIG. 3) based on the first timing control signal supplied from the counter circuit 116 and supplies the generated selection signal Vgcl to the first selection circuit 14. The first selection circuit 14 supplies a scan signal to the scan line GCL based on the selection signal Vgcl supplied from the first control circuit 114. With this operation, a certain scan line GCL is selected out of the scan lines GCL. The detection electrode Rx coupled to the selected scan line GCL is coupled to the data line SGL.

The counter circuit 116 generates a second timing control signal for controlling the timing at which a data line SGL out of the data lines SGL is selected based on the measured value of the number of pulses of the clock signal described above. The counter circuit 116 supplies the generated second timing control signal to the second control circuit 115. The second control circuit 115 outputs the selection signal Vsel to the second selection circuit 15 based on the second timing control signal supplied from the counter circuit 116. The selection signal Vsel is a signal for scanning switches in the second selection circuit 15. With this operation, a certain data line SGL is selected out of the data lines SGL. The selected data line SGL is coupled to the detection circuit 40 via the second selection circuit 15.

The drive signal generation circuit 112 generates the drive signal Vs for detection and outputs the drive signal Vs for detection to the detection electrode Tx.

Figure 4:
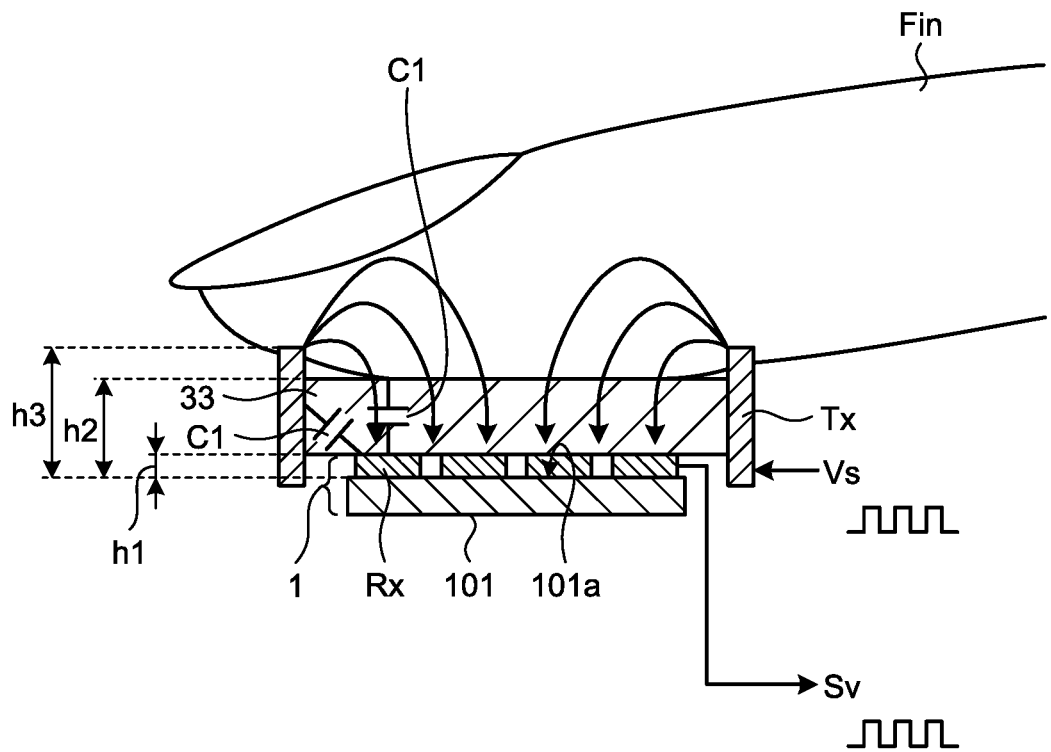
FIG. 4 is a diagram schematically illustrating how a drive signal is transmitted to a detection electrode from a drive electrode via a finger.
Figure 5:
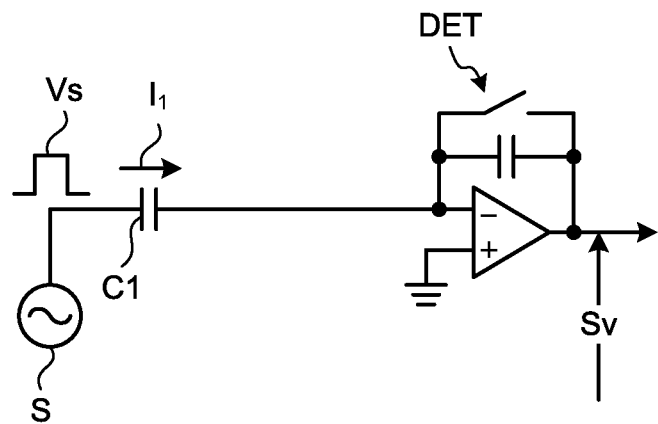
FIG. 5 is an illustrative diagram of an example of an equivalent circuit for illustrating a detection operation by the sensor and a detection circuit.
Figure 6:
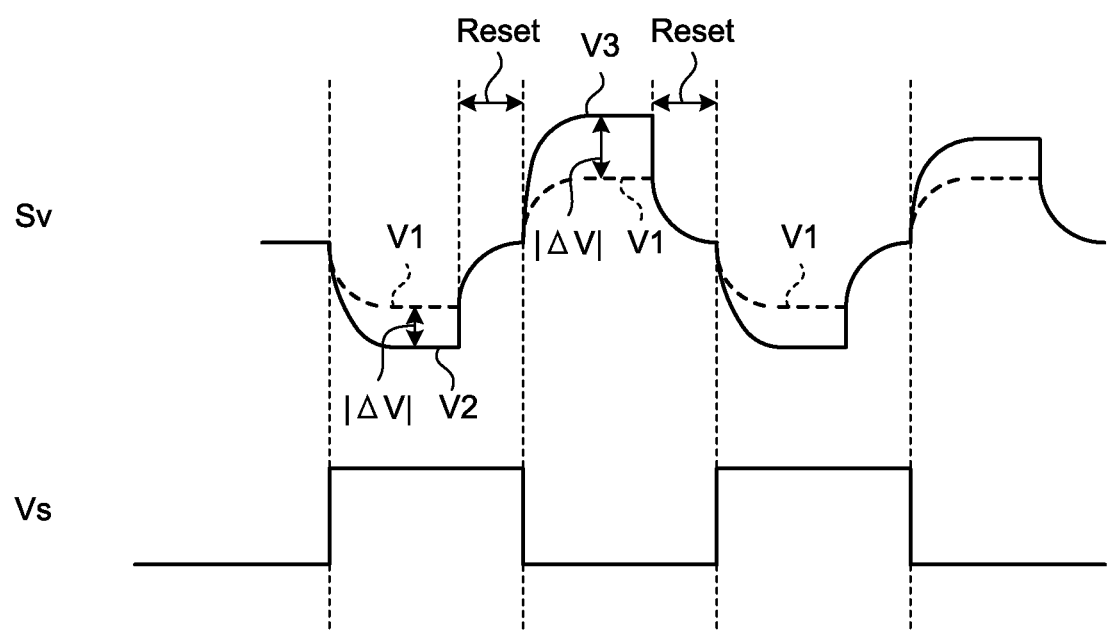
FIG. 6 is a diagram of an example of waveforms of the drive signal and a detection signal of the detection operation.

The sensor 1 illustrated in FIG. 1 to FIG. 3 detects changes in the capacitance of the detection electrode Rx. The following describes a detection operation by the sensor 1 with reference to FIG. 4 to FIG. 6. FIG. 4 is a diagram schematically illustrating how a drive signal is transmitted to a detection electrode from a drive electrode via the finger Fin. FIG. 5 is an illustrative diagram of an example of an equivalent circuit for illustrating a detection operation by a sensor and a detection circuit. FIG. 6 is a diagram of an example of waveforms of the drive signal and a detection signal of the detection operation.

As illustrated in FIG. 4, a capacitance element C1 is formed between the detection electrode Tx and the detection electrode Rx. As illustrated in FIG. 5, an alternating current (AC) signal source S is coupled to the detection electrode Tx. In other words, the drive signal Vs is supplied from the detection control circuit 11 to the detection electrode Tx. The detection electrode Rx is coupled to a voltage detector DET. The voltage detector DET corresponds to the detection signal amplifier circuit 42 of the detection circuit 40, for example. The voltage detector DET is an integrating circuit.

The drive signal Vs applied to the detection electrode Tx is an AC rectangular wave with a certain frequency (e.g., a frequency of the order of several kilohertz to several hundred kilohertz), for example. When the drive signal Vs is applied to the detection electrode Tx, the detection signal Sv is output from the detection electrode Rx via the voltage detector DET.

In a state in which the finger Fin is not in contact or proximity (a noncontact state), a current corresponding to the capacitance value of the capacitance element C1 flows with charging and discharging of the capacitance element C1. The detection circuit 40 converts variations in a current I1 corresponding to the drive signal Vs into variations in voltage (a dotted line waveform V1 (refer to FIG. 6)).

In contrast, in a state in which the finger Fin is in contact or proximity (a contact state), as illustrated in FIG. 4, the finger Fin is in contact with the detection electrode Tx. Then the drive signal Vs supplied to the detection electrode Tx from the detection control circuit 11 has an influence on the detection electrode Rx via the finger Fin and an insulating protective layer 33 (e.g., an insulating resin) protecting the sensor 1. That is to say, the finger Fin acts as part of the detection electrode Tx. Thus, in the contact state, the separating distance between the detection electrode Tx and the detection electrode Rx is substantially short, and the capacitance element C1 acts as a capacitance element with a capacitance value larger than a capacitance value in the noncontact state. Further, a difference in the separating distance to the detection electrode Rx occurs between the recess and the protrusion of the finger Fin, and the capacitance value of the capacitance element C1 occurring at the protrusion of the finger Fin is larger than that occurring at the recess of the finger Fin. As illustrated in FIG. 6, the detection circuit 40 converts variations in a current I2 or I3 corresponding to the drive signal Vs into variations in voltage (a solid line waveform V2 or waveform V3). The waveform V2 corresponds to a waveform in a state in which the recess of the finger Fin is in contact, whereas the waveform V3 corresponds to a waveform in a state in which the protrusion of the finger Fin is in contact.

In this case, the waveform V2 and the waveform V3 are larger in amplitude than the waveform V1 described above. In addition, the waveform V3 is larger in amplitude than the waveform V2. With this relation, the absolute value |ΔV| of a voltage difference between the waveform V1 and the waveform V2 changes depending on the contact or proximity of the external object such as the finger Fin and a recess or protrusion of the external object. In order to detect the absolute value |ΔV| of the voltage difference between the waveform V1 and the waveform V2 or the waveform V3 with high precision, the voltage detector DET more preferably performs an operation including a period Reset in which the charging and discharging of a capacitor are reset by switching within the circuit in accordance with the frequency of the drive signal Vs.

The detection circuit 40 compares the absolute value |ΔV| with the first threshold Vth1. If the absolute value |ΔV| is less than the first threshold Vth1, the detection circuit 40 determines that the finger Fin is in a noncontact state. In contrast, if the absolute value |ΔV| is equal to or greater than the first threshold Vth1, the detection circuit 40 determines that the finger Fin is in a contact-or-proximity state. Further, the detection circuit 40 compares the absolute value |ΔV| with the second threshold Vth2. If the absolute value |ΔV| is less than the second threshold Vth2, the detection circuit 40 determines that the recess of the finger Fin is in contact. In contrast, if the absolute value |ΔV| is equal to or greater than the second threshold Vth2, the detection circuit 40 determines that the protrusion of the finger Fin is in contact. The second threshold Vth2 is a value larger than the first threshold Vth1.

Figure 7:
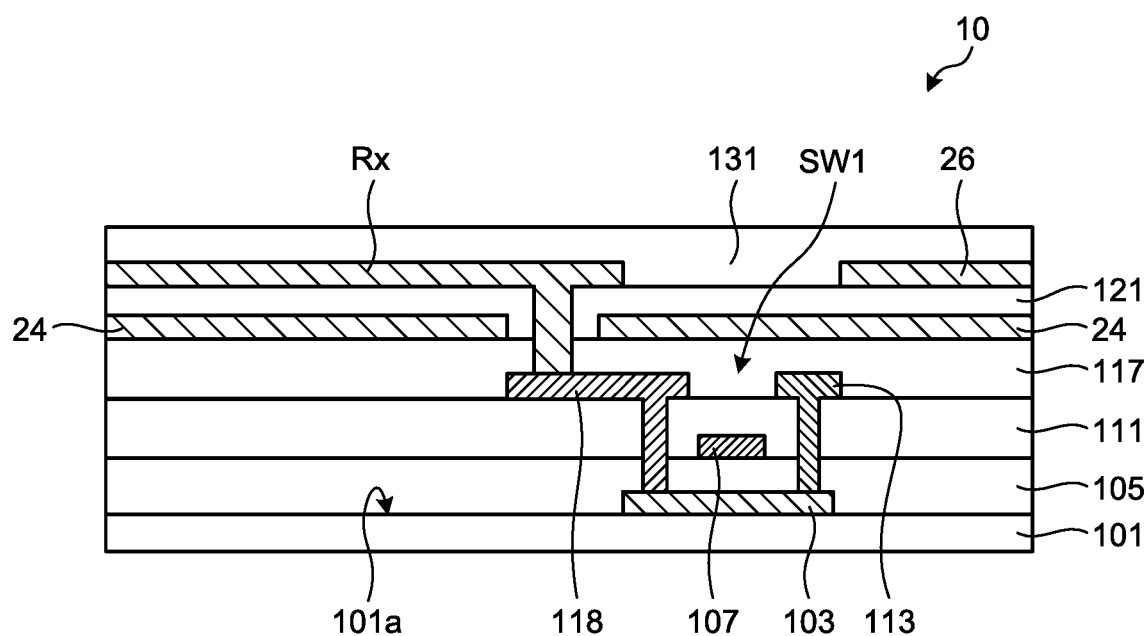
FIG. 7 is a sectional view of a configuration example of a substrate of the detection apparatus.

FIG. 7 is a sectional view of a configuration example of a substrate of the detection apparatus. FIG. 7 is a diagram of part of a section obtained by cutting FIG. 8, which will be described later, along an A11-A12 line. The sensor 1 described above is provided on a substrate 10. As illustrated in FIG. 7, the substrate 10 has the base member 101, a semiconductor layer 103, an insulating film 105, a gate electrode 107, a wiring layer 109, an insulating film 111, a source electrode 113, a drain electrode 118, an insulating film 117, the shield layer 24, an insulating film 121, the detection electrode Rx, the conductor 26, and a protective film 131.

The semiconductor layer 103 is provided on the one face 101a of the base member 101. The insulating film 105 is provided on the base member 101 to cover the semiconductor layer 103. An upper face of the insulating film 105 is flattened.

The gate electrode 107 is provided on the insulating film 105. The insulating film 111 is provided on the insulating film 105 to cover the gate electrode 107. An upper face of the insulating film 111 is flattened.

Through holes bottomed by the semiconductor layer 103 are provided in the insulating film 111 and the insulating film 105. The source electrode 113 and the drain electrode 118 are provided on the insulating film 111. The source electrode 113 and the drain electrode 118 are individually coupled to the semiconductor layer 103 via the through holes provided in the insulating film 111 and the insulating film 105.

The insulating film 117 is provided on the insulating film 111 to cover the source electrode 113 and the drain electrode 118. An upper face of the insulating film 117 is flattened. The shield layer 24 is provided on the insulating film 117. The insulating film 121 is provided on the insulating film 117 to cover the shield layer 24. An upper face of the insulating film 121 is flattened. A through hole bottomed by the drain electrode 118 is provided in the insulating film 117 and the insulating film 121. The detection electrode Rx is provided on the insulating film 121. The detection electrode Rx is coupled to the drain electrode 118 via the through hole provided in the insulating film 121 and the insulating film 117. The conductor 26 is provided on the insulating film 121. The protective film 131 is provided on the insulating film 121 to cover the detection electrode Rx and the conductor 26.

The following describes examples of the materials of the respective films laminated on the base member 101. The insulating film 105, the insulating film 111, the insulating film 117, and the insulating film 121 are formed of inorganic films such as a silicon oxide film, a silicon nitride film, and a silicon oxide nitride film. Any one of the insulating film 105, the insulating film 111, the insulating film 117, and the insulating film 121 may be an organic insulating film. The insulating film 105, the insulating film 111, the insulating film 117, and the insulating film 121 are each not limited to a single layer and may be each a film with a laminated structure. The insulating film 105 may be a film with a laminated structure in which a silicon nitride film is formed on a silicon oxide film, for example.

The semiconductor layer 103 is formed of any of an amorphous silicon film, a polysilicon film, and an oxide semiconductor film, for example. The gate electrode 107 is formed of aluminum (Al), copper (Cu), silver (Ag), molybdenum (Mo), or an alloy film thereof. The source electrode 113 and the drain electrode 118 are each formed of a titanium-aluminum (TiAl) film as an alloy of titanium and aluminum. The shield layer 24, the detection electrode Rx, and the conductor 26 are each formed of a conductor film that allows visible light to pass therethrough. In the following, the property that allows visible light to pass will be referred to as translucency. Examples of the conductor film with translucency include an indium tin oxide (ITO) film. The detection electrode Rx and the conductor 26 may be formed of metallic thin lines having mesh-like openings. The protective film 131 is a passivation film, for example. The protective film 131 is an insulating film, for example, and is formed of a film of an inorganic material such as a silicon nitride film or a resin film. The protective film 131 corresponds to the protective layer 33 illustrated in FIG. 4. The protective film 131 and the protective layer 33 may be separate layers and may be formed of different materials.

Although the gate electrode 107 has a top gate structure, in which it is arranged above the semiconductor layer 103, but its structure is not limited thereto; the gate electrode 107 may have a bottom gate structure, in which it is arranged below the semiconductor layer 103. The detection apparatus 100 does not necessarily have the shield layer 24 and the insulating film 121.

Figure 8:
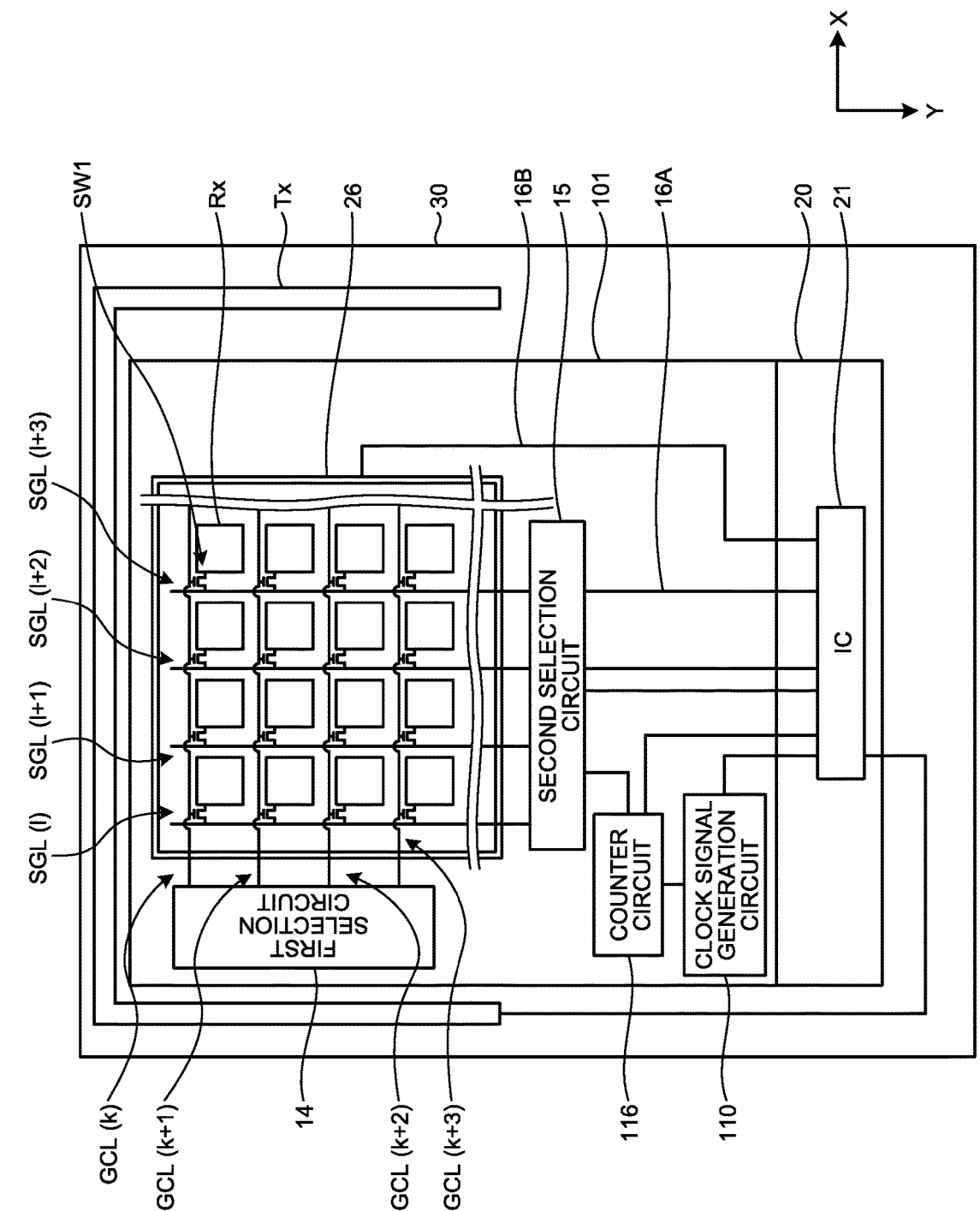
FIG. 8 is a plan view of a configuration example of the detection apparatus.

FIG. 8 is a plan view of a configuration example of the detection apparatus. As illustrated in FIG. 8, the detection apparatus 100 includes the substrate 10, a first circuit board 20, and a second circuit board 30. The substrate 10 and the first circuit board 20 are arranged on one face 30a of the second circuit board 30, for example. The first circuit board 20 is a flexible board, for example. The second circuit board 30 is a rigid board such as a printed circuit board (PCB), for example. The first circuit board 20 couples the substrate 10 and the second circuit board 30 to each other.

As illustrated in FIG. 8, the substrate 10 is provided with the sensor 1, the clock signal generation circuit 110, and the counter circuit 116. The counter circuit 116 includes the first selection circuit 14 and the second selection circuit 15. The detection electrodes Rx included in the sensor 1 are coupled to the first selection circuit 14 via the scan lines GCL. The detection electrodes Rx included in the sensor 1 are coupled to an input side of the second selection circuit 15 via the data lines SGL. The counter circuit 116 is coupled to the first selection circuit 14, the second selection circuit 15, and the clock signal generation circuit 110 via wiring. The first selection circuit 14 is arranged between the detection electrodes Rx and the detection electrode Tx. The conductor 26 is arranged between the first selection circuit 14 and the detection electrodes Rx.

The first circuit board 20 is provided with an IC 21. An output side of the second selection circuit 15 is coupled to a plurality of terminals of the IC 21 via a plurality of wiring lines 16A. The conductor 26 is coupled to one terminal of the IC 21 via a wiring line 16B. The counter circuit 116 is coupled to the IC 21 via wiring. The clock signal generation circuit 110 is coupled to the IC 21 via wiring.

On the one face 30a of the second circuit board 30, the detection electrode Tx is provided. The clock signal generation circuit 110 is coupled to the detection electrode Tx via the IC 21 and wiring on the second circuit board 30. The detection electrode Tx may be of a ring shape surrounding the sensor 1 or, as illustrated in FIG. 8, may be of a shape lacking part of the ring surrounding the sensor 1. The detection electrode Tx may be of a shape lacking one side out of four sides in a rectangular ring surrounding the sensor 1, for example. The detection electrode Tx may be arranged so as not to overlap, in a plan view, the data lines SGL that couple the sensor 1 to the second selection circuit 15, for example. The detection electrode Tx may be arranged so as not to overlap, in a plan view, the wiring lines 16A that couple the second selection circuit 15 to the IC 21. With this arrangement, the drive signal Vs to be supplied to the detection electrode Tx can be inhibited from having an influence on the data lines SGL or the wiring lines 16A, and thus noise, which would otherwise be caused, can be suppressed.

At least partial components of the detection control circuit 11 and at least partial components of the detection circuit 40 illustrated in FIG. 1 are included in the IC 21. Among the various components of the detection circuit 40 illustrated in FIG. 1, the detection signal amplifier circuit 42, the A/D conversion circuit 43, the signal computing circuit 44, the coordinates extraction circuit 45, the combination circuit 46, the detection timing control circuit 47, and the storage circuit 48 are included in the IC 21, for example. Among the various components of the detection control circuit 11 illustrated in FIG. 1, the clock signal generation circuit 110 is included in the IC 21. At least partial components of the detection circuit 40 illustrated in FIG. 1 are formed on the substrate 10. Among the various kinds of components of the detection control circuit 11 illustrated in FIG. 1, the counter circuit 116 and the clock signal generation circuit 110 are formed on the substrate 10, for example. The IC 21 may have a protective circuit as a circuit to be coupled to the clock signal generation circuit 110 and the detection electrode Tx. The protective circuit, for example, is a diode that prevents the sensor 1 from electro-static discharge (ESD), which would otherwise be conveyed to the sensor 1 from the detection electrode Tx through the IC 21.

At least partial components of the detection control circuit 11 illustrated in FIG. 1 may be included in the first selection circuit 14. The first control circuit 114 may be included in the first selection circuit 14, for example. At least partial components of the detection control circuit 11 or at least partial components of the detection circuit 40 illustrated in FIG. 1 may be included in an IC provided separately from the IC 21 and arranged on the second circuit board 30. The protective circuit may be provided on the second circuit board 30 and coupled to the clock signal generation circuit 110 and the detection electrode Tx not through the IC 21, for example. At least partial components of the detection control circuit 11 and the detection circuit 40 may be included in a central processing unit (CPU) arranged on an external substrate coupled to the second circuit board 30. The substrate 10 may have an integrated circuit not illustrated. In this case, at least partial components of the detection control circuit 11 or at least partial components of the detection circuit 40 illustrated in FIG. 1 may be included in the integrated circuit of the substrate 10. Among the various kinds of components of the detection circuit 40, the detection signal amplifier circuit 42 may be included in the integrated circuit of the substrate 10, for example.

Figure 9:
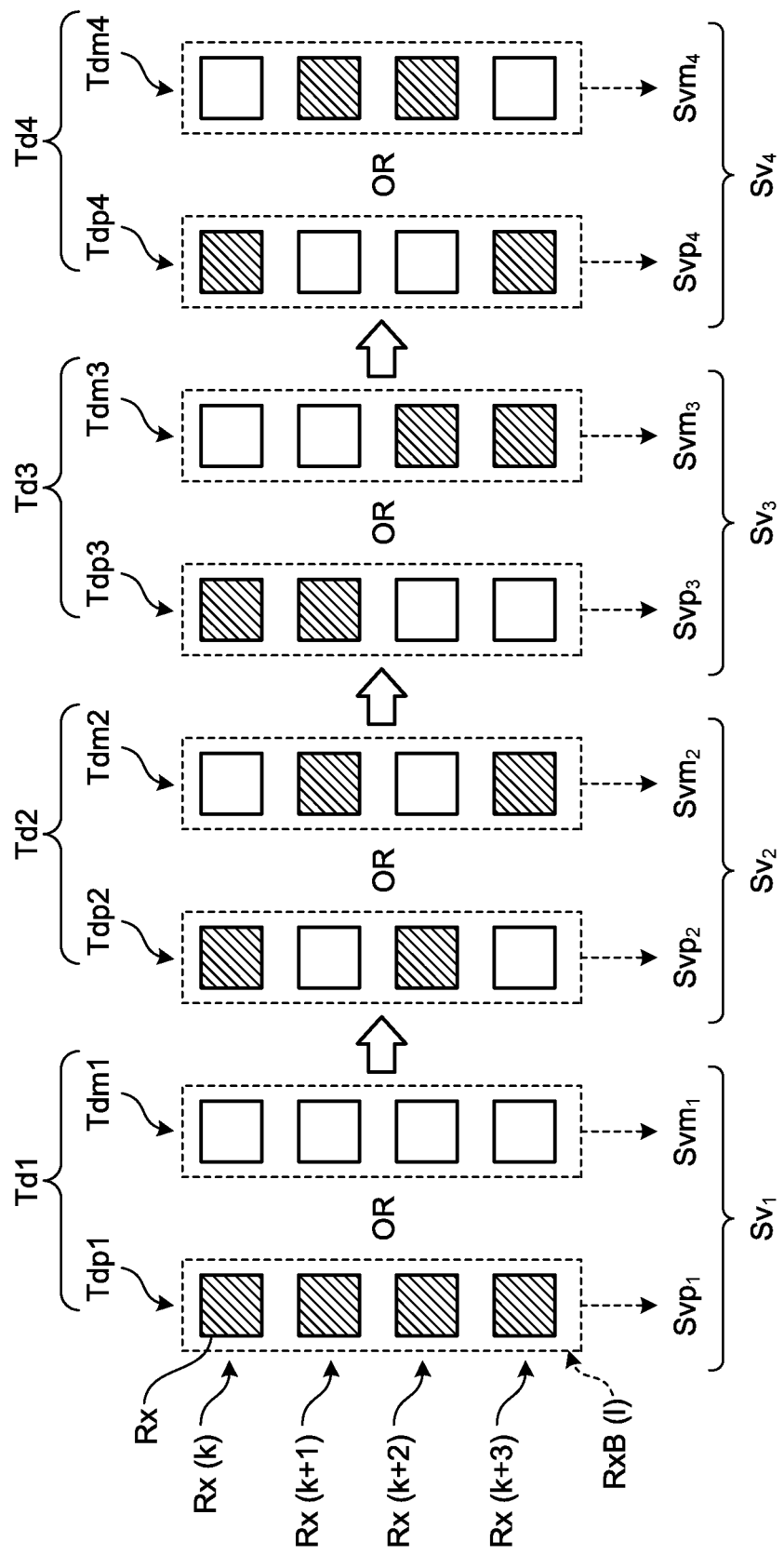
FIGS. 9A to 9D are diagrams illustrating selection patterns of detection electrodes by sign selection driving.

The following describes a method for detecting a fingerprint by the detection apparatus 100. The detection apparatus 100 performs sign selection driving for the detection electrode block RxB including a plurality of detection electrodes Rx to detect a fingerprint. The sign selection driving is a detection operation based on a certain sign. FIGS. 9A to 9D are diagrams illustrating selection patterns of detection electrodes by the sign selection driving. FIG. 9A illustrates a selection pattern of the detection electrodes Rx in a detection operation Td1. FIG. 9B illustrates a selection pattern of the detection electrodes Rx in a detection operation Td2. FIG. 9C illustrates a selection pattern of the detection electrodes Rx in a detection operation Td3. FIG. 9D illustrates a selection pattern of the detection electrodes Rx in a detection operation Td4.

The following first describes performing the sign selection driving for one detection electrode block RxB(l). As illustrated in FIGS. 9A to 9D, the detection electrode block RxB(l) includes n detection electrodes Rx arranged in the column direction (the Y direction). The n is an integer equal to or greater than 1; in the first embodiment, n is 4. The n is a value equal to or less than the order d of a square matrix Hv as the certain sign; in the first embodiment, n is equal to the order d of the square matrix Hv and is 4. The four detection electrodes Rx are coupled, via the switch elements SW1, to the data line SGL(l) (refer to FIG. 3) shared among the four detection electrodes Rx. In addition, the n detection electrodes Rx are coupled to the respective n scan lines GCL. The detection control circuit 11 supplies the drive signal Vs to the detection electrode Tx. The first selection circuit 14 supplies a scan signal to a scan line GCL corresponding to a detection electrode Rx selected from the detection electrode block RxB(l) and turns on a switch element SW1 corresponding to the selected detection electrode Rx (a first selection target). With this operation, the selected detection electrode Rx is coupled to the data line SGL(l), and the detection signal Sv is output to the second selection circuit 15 from the data line SGL(l).

When the certain sign is the square matrix Hv and a g-th element on an f-th row as any element thereof is $Hv_{fg}$, the relation between a detection signal $Sv_f$ output in an f-th detection operation Td based on the square matrix Hv and a detection signal $Si_g$ output from a g-th detection electrode Rx included in the detection electrode block RxB is represented by Expression (1) below. As described in Expression (1), a value obtained by integrating the detection signals $Si_g$ of the selected detection electrodes Rx is output as the detection signal Sv. That is to say, the detection signal $Sv_f$ is represented by the sum of the detection signals $Si_g$ output from the selected detection electrodes Rx. The f and g are each an integer equal to or greater than 1, for example. Although Expression (1) describes an example in which the detection electrode Rx is selected based on the sign of the f-th row of the square matrix Hv in the f-th detection operation Td, the detection operation Td is not limited thereto; in other words, the detection operation Td is not necessarily performed in orderly sequence along the column direction of the matrix.

$$Sv_f = \sum_{g=0}^{n} Hv_{fg} Si_g \qquad (1)$$

A detection signal Sc is determined by computing signals output from the detection electrodes Rx selected from the detection electrode block RxB(l) based on the certain sign. The certain sign is defined by the square matrix Hv, for example. The square matrix Hv is an Hadamard matrix and is a square matrix in which "1" or "−1" are included as its elements and any different two rows form an orthogonal matrix. The order d of the square matrix Hv is indicated by $2^{Na}$. The Na is an integer equal to or greater than 1; in the first embodiment, the Na is 2 as described by Expression (2) below. The order of an Hadamard matrix indicates the number of elements in the vertical direction of the matrix, for example. In the detection electrode block RxB(l), selection of the detection electrodes Rx is performed based on the positive and negative signs of the Hadamard matrix, for example. Consequently, a signal output from the detection electrode block RxB(l) (that is, the signals output from the selected detection electrodes Rx) is determined by the positive and negative signs of the Hadamard matrix. The detection signal Sv output from the detection electrode block RxB(l) corresponds to the number of a plurality of detection electrodes Rx as the first selection targets in a first selection operation and the arrangement of the detection electrodes Rx as the first selection targets.

$$Hv = \begin{pmatrix} 1 & 1 & 1 & 1 \\ 1 & -1 & 1 & -1 \\ 1 & 1 & -1 & -1 \\ 1 & -1 & -1 & 1 \end{pmatrix} \quad (2)$$

The order d of the square matrix Hv is equal to or greater than the number (n) of the detection electrodes Rx included in the detection electrode block RxB(l). In the example illustrated in FIG. 9A to 9D, for example, the order d of the square matrix Hv is equal to the number of the detection electrodes Rx and is 4.

The following describes an example of the sign selection driving by dividing it into four detection operations: the detection operation Td1, the detection operation Td2, the detection operation Td3, and the detection operation Td4 as illustrated in FIG. 9A to FIG. 9D. In this embodiment, the detection operation Td1, the detection operation Td2, the detection operation Td3, and the detection operation Td4 are either positive sign selection operations Tdp1, Tdp2, Tdp3, and Tdp4, respectively, or negative sign selection operations Tdm1, Tdm2, Tdm3, and Tdm4, respectively. In the following description, when there is no need to separately describe the detection operation Td1, the detection operation Td2, the detection operation Td3, and the detection operation Td4, they will be referred to as the detection operation Td. Similarly, when there is no need to separately describe the positive sign selection operations Tdp1, Tdp2, Tdp3, and Tdp4, they will be referred to simply as a positive sign selection operation Tdp. Similarly, when there is no need to separately describe the negative sign selection operations Tdm1, Tdm2, Tdm3, and Tdm4, they will be referred to simply as a negative sign selection operation Tdm.

In the first embodiment, the positive sign selection operation Tdp is performed as the detection operation Td. In other words, the detection control circuit 11 (refer to FIG. 1) selects the detection electrodes Rx as the first selection targets in accordance with the selection signal Vgclp corresponding to the elements "1" of the square matrix Hv. The detection control circuit 11 selects the detection electrodes Rx as second selection targets that are not included in the detection electrodes Rx as the first selection targets among the detection electrodes Rx. The detection control circuit 11 supplies the selection signal Vgclp to the first selection circuit 14 (refer to FIG. 1), and the first selection circuit 14 supplies a scan signal based on the selection signal Vgclp to the scan line GCL (refer to FIG. 3).

With this operation, the detection electrodes Rx as the first selection targets are caused to be a coupled state with respect to the detection circuit 40 (refer to FIG. 1), whereas the detection electrodes Rx as the second selection targets are caused to be a non-coupled state with respect to the detection circuit 40. The coupled state refers to a state in which the selected detection electrodes Rx are coupled to the detection circuit 40 via the data lines SGL and the second selection circuit 15 (refer to FIG. 1). The non-coupled state refers to a state in which the selected detection electrodes Rx are not coupled to the detection circuit 40. In FIGS. 9A to 9D, to easily distinguish the first selection targets and the second selection targets from each other, the detection electrodes Rx as the first selection targets are hatched.

A detection signal Svp is output to the detection circuit 40 from the detection electrode block RxB via one data line SGL and the second selection circuit 15. The detection signal Svp is a signal obtained by integrating detection signals Si output from the detection electrodes Rx as the first selection targets selected in accordance with the selection signal Vgclp. As described above, the selection signal Vgclp corresponds to the element "1" of the square matrix Hv.

In the first embodiment, in order to obtain the detection signal Svp, the first selection circuit 14 and the second selection circuit 15 couple the detection electrodes Rx to the detection circuit 40 and uncouple the detection electrodes Rx from the detection circuit 40 by performing the positive sign selection operations Tdp1, Tdp2, Tdp3, and Tdp4. Thus, the first selection circuit 14 and the second selection circuit 15 function as coupling circuits. A selection pattern Cpp1 by the positive sign selection operation Tdp1, a selection pattern Cpp2 by the positive sign selection operation Tdp2, a selection pattern Cpp3 by the positive sign selection operation Tdp3, and a selection pattern Cpp4 by the positive sign selection operation Tdp4 are different from each other. That is to say, the positive sign selection operation Tdp includes a plurality of selection patterns Cpp indicating which of the detection electrodes Rx among the detection electrodes Rx included in the detection electrode block RxB are to be coupled to the detection circuit 40. Even when the coupled state and the non-coupled state in any one of the selection patterns Cpp of the positive sign selection operation Tdp (first selection patterns) are inverted, the inverted pattern is not identical to any of the other selection patterns Cpp included in the positive sign selection operation Tdp. That is to say, the selection patterns Cpp included in the positive sign selection operation Tdp do not include any selection patterns causing the detection electrodes as the first selection targets in any of the selection patterns to be the non-coupled state and causing the detection electrodes as the second selection targets therein to be the coupled state.

The signal computing circuit 44 outputs the detection signal Svp to the storage circuit 48 to temporarily store therein the detection signal Sv. In other words, a matrix ScX consisting of the detection signals Sc of all the detection operations Td is equal to HvSiX obtained by multiplying the square matrix Hv by a matrix SiX consisting of the detection signals Si output from all the detection electrodes Rx included in the detection electrode block RxB. HvSiX is equal to a result of subtraction of HvmSiX from HvpSiX, HvmSiX being obtained by multiplying a square matrix Hvm by the matrix SiX, HvpSiX being obtained by multiplying a square matrix Hvp by the matrix SiX. The square matrix Hvm is a matrix obtained by replacing the elements "1" in the square matrix Hv with 0 and the elements "−1" therein with "1", and the square matrix Hvp is a matrix obtained by replacing the elements "−1" in the square matrix Hv with 0. HvpSiX corresponds to a matrix SvpX of detection signals Svp detected by all the positive sign selection operations Tdp. HvmSiX corresponds to a matrix SvmX of detection signals Svm detected by all the negative sign selection operations Tdm.

When the square matrix Hv the order d of which is 4 is multiplied by the matrix SiX consisting of four detection signals Si ($Si_1$, $Si_2$, $Si_3$, $Si_4$) of the detection electrodes Rx included in one detection electrode block RxB, four detection signals Sc ($Si_1$, $Si_2$, $Si_3$, $Si_4$) is obtained, as described in Expression (3) below. These four detection signals Sc are determined from four detection signals Svp ($Svp_1$, $Svp_{21}$, $Svp_3$, $Svp_4$), respectively.

$$\begin{pmatrix} Sc_1 \\ Sc_2 \\ Sc_3 \\ Sc_4 \end{pmatrix} = \begin{pmatrix} 1 & 1 & 1 & 1 \\ 1 & -1 & 1 & -1 \\ 1 & 1 & -1 & -1 \\ 1 & -1 & -1 & 1 \end{pmatrix} \begin{pmatrix} Si_1 \\ Si_2 \\ Si_3 \\ Si_4 \end{pmatrix} \quad (3)$$

The following describes a method for determining the detection signals Sc ($Sc_1$, $SC_2$, $SC_3$, $Sc_4$) from the four detection signals Svp ($Svp_1$, $Svp_2$, $Svp_3$, $Svp_4$) as an example. This description describes a case in which the detection signals Si are ($Si_1$, $Si_2$, $Si_3$, $Si_4$)=(1, 7, 3, 2) as an example. The detection signal $Si_1$ is a signal output from a detection electrode Rx(k). The detection signal $Si_2$ is a signal output from a detection electrode Rx(k+1). The detection signal $Si_3$ is a signal output from a detection electrode Rx(k+2). The detection signal $Si_4$ is a signal output from a detection electrode Rx(k+3). The sensor 1 outputs one detection signal Sv obtained by integrating the detection signals Si of the detection electrodes Rx selected from one detection electrode block RxB. The detection circuit 40 calculates the individual detection signals Si by computations below.

As illustrated in FIG. 9A, in the positive sign selection operation Tdp1 of the detection operation Td1, the detection control circuit 11 (refer to FIG. 1) and the first selection circuit 14 select, as the first selection targets, four detection electrodes Rx(k), Rx(k+1), Rx(k+2), and Rx(k+3) corresponding to the elements "1" on the first row of the square matrix Hv. This brings the detection electrodes Rx(k), Rx(k+1), Rx(k+2), and Rx(k+3) into the coupled state. Consequently, from Expression (3), the detection signal $Svp_i$ detected by the detection circuit 40 is $Svp_1$=1×1+1×7+1×3+1×2=13.

Next, as illustrated in FIG. 9B, in the positive sign selection operation Tdp2 of the detection operation Td2, the detection control circuit 11 and the first selection circuit 14 select, as the first selection targets, the detection electrodes Rx(k) and Rx(k+2) corresponding to the elements "1" on the second row of the square matrix Hv. This brings the detection electrodes Rx(k) and Rx(k+2) into the coupled state. The detection control circuit 11 brings the detection electrodes Rx(k+1) and Rx(k+3) as the second selection targets into the non-coupled state. Consequently, from Expression (3), the detection signal $Svp_2$ detected by the detection circuit 40 is $Svp_2$=1×1+0×7+1×3+0×2=4.

Next, as illustrated in FIG. 9C, in the positive sign selection operation Tdp3 of the detection operation Td3, the detection control circuit 11 and the first selection circuit 14 select, as the first selection targets, the detection electrodes Rx(k) and Rx(k+1) corresponding to the elements "1" on the third row of the square matrix Hv. This brings the detection electrodes Rx(k) and Rx(k+1) into the coupled state. The detection control circuit 11 and the first selection circuit 14 bring the detection electrodes Rx(k+2) and Rx(k+3) as the second selection targets into the non-coupled state. Consequently, from Expression (3), the detection signal $Svp_3$ detected by the detection circuit 40 is $Svp_3$=1×1+1×7+0×3+0×2=8.

Next, as illustrated in FIG. 9D, in the positive sign selection operation Tdp4 of the detection operation Td4, the detection control circuit 11 and the first selection circuit 14 select, as the first selection targets, the detection electrodes Rx(k) and Rx(k+3) corresponding to the elements "1" on the fourth row of the square matrix Hv. This brings the detection electrodes Rx(k) and Rx(k+3) into the coupled state. The detection control circuit 11 and the first selection circuit 14 bring the detection electrodes Rx(k+1) and Rx(k+2) as the second selection targets into the non-coupled state. Consequently, from Expression (3), the detection signal $Svp_4$ detected by the detection circuit 40 is $Svp_4$=1×1+0×7+0×3+1×2=3.

A square matrix HvX obtained by multiplying the square matrix Hv described in Expression (2) by a matrix X consisting of a plurality of detection signals Si of the detection electrodes Rx included in the detection electrode block RxB can be transformed into Expression (4). The square matrix Hv can be represented as a result of subtraction of the square matrix Hvm from the square matrix Hvp, the square matrix Hvm being obtained by replacing the elements "1" and "−1" in the square matrix Hv with respective elements "0" and "1", and the square matrix Hvp being obtained by replacing the elements "−1" in the square matrix Hv with elements "0". Consequently, the matrix HvX can be represented as a result of subtraction of a matrix HvmX from a matrix Hvpx. The matrix HvX corresponds to the detection signals Sc ($Sc_1$, $SC_2$, $SC_3$, $Sc_4$) as described in Expression (3).

$$\begin{aligned} HvScX &= \begin{pmatrix} 1 & 1 & 1 & 1 \\ 1 & -1 & 1 & -1 \\ 1 & 1 & -1 & -1 \\ 1 & -1 & -1 & 1 \end{pmatrix} \begin{pmatrix} Si_1 \\ Si_2 \\ Si_3 \\ Si_4 \end{pmatrix} = \begin{pmatrix} 1 & 1 & 1 & 1 \\ 1 & 0 & 1 & 0 \\ 1 & 1 & 0 & 0 \\ 1 & 0 & 0 & 1 \end{pmatrix} \begin{pmatrix} Si_1 \\ Si_2 \\ Si_3 \\ Si_4 \end{pmatrix} - \\ & \quad \begin{pmatrix} 0 & 0 & 0 & 0 \\ 0 & 1 & 0 & 1 \\ 0 & 0 & 1 & 1 \\ 0 & 1 & 1 & 0 \end{pmatrix} \begin{pmatrix} Si_1 \\ Si_2 \\ Si_3 \\ Si_4 \end{pmatrix} \\ &= HvpSiX - HvmSiX \\ &= 2\begin{pmatrix} 1 & 1 & 1 & 1 \\ 1 & 0 & 1 & 0 \\ 1 & 1 & 0 & 0 \\ 1 & 0 & 0 & 1 \end{pmatrix}\begin{pmatrix} Si_1 \\ Si_2 \\ Si_3 \\ Si_4 \end{pmatrix} - \begin{pmatrix} 1 & 1 & 1 & 1 \\ 1 & 1 & 1 & 1 \\ 1 & 1 & 1 & 1 \\ 1 & 1 & 1 & 1 \end{pmatrix}\begin{pmatrix} Si_1 \\ Si_2 \\ Si_3 \\ Si_4 \end{pmatrix} \\ &= 2HvpSiX - HvbSiX \\ &= 2\begin{pmatrix} Svp_1 \\ Svp_2 \\ Svp_3 \\ Svp_4 \end{pmatrix} - \begin{pmatrix} Svp_1 \\ Svp_1 \\ Svp_1 \\ Svp_1 \end{pmatrix} = \begin{pmatrix} 2Svp_1 - Svp_1 \\ 2Svp_2 - Svp_1 \\ 2Svp_3 - Svp_1 \\ 2Svp_4 - Svp_1 \end{pmatrix} = \begin{pmatrix} Sc_1 \\ Sc_2 \\ Sc_3 \\ Sc_4 \end{pmatrix} \end{aligned} \quad (4)$$

As described in Expression (4), the square matrix Hv can be represented as a result of subtraction of a square matrix Hvb with all the elements being "1" from the double of the square matrix Hvp. In other words, the square matrix Hvb is a square matrix obtained by having the first row of the square matrix Hvp assigned to its all rows. Consequently, the matrix HvX can be represented as a result of subtraction of a matrix HvbX from the double of the matrix HvpX. The matrix HvpX corresponds to a matrix consisting of the detection signals Svp ($Svp_1$, $Svp_2$, $Svp_3$, $Svp_4$), whereas the matrix HvbX corresponds to a matrix consisting of the detection signal $Svp_1$.

The signal computing circuit 44 can determine the four detection signals Sc ($Sc_1$, $Sc_2$, $SC_3$, $Sc_4$) from the four detection signals $Svp_1$, $Svp_2$, $Svp_3$, and $Svp_4$ through a mechanism similar to the description with reference to Expression (4) described above. A signal corresponding to a column in which all the rows are the elements "1" in the square matrix Hv is the detection signal $Svp_1$, for example. Consequently, the four detection signals Sc ($Sc_1$, $Sc_2$, $Sc_3$, $Sc_4$) can be respectively determined by subtracting the detection signal $Svp_1$ from values obtained by multiplying the detection signals $Svp_1$, $Svp_2$, $Svp_3$, and $Svp_4$ by 2. The four detection signals $Svp_1$, $Svp_2$, $Svp_3$, and $Svp_4$ can be represented as ($Svp_1$, $Svp_2$, $Svp_3$, $Svp_4$)=(13, 4, 8, 3). Consequently, the values obtained by multiplying the detection signals $Svp_1$, $Svp_2$, $Svp_3$, and $Svp_4$ by 2 each are ($Svp_1$, $Svp_2$, $Svp_3$, and $Svp_4$)×2=(26, 8, 16, 6). When the detection signal $Svp_1$ is subtracted from all of these values, (26, 8, 16, 6)−(13, 13, 13, 13)=(13, −5, 3, −7). Thus, the signal computing circuit 44 successively calculates the four detection signals Sc ($Sc_1$, $Sc_2Sc_3$, $Sc_4$)=(13, −5, 3, −7) from the detection signals Svp and outputs the four detection signals Sc ($Sc_1Sc_2$, $Sc_3$, $Sc_4$) to the storage circuit 48. That is to say, the signal computing circuit 44 functions as an arithmetic unit configured to subtract a basic signal, which is obtained when the detection electrodes Rx are all the first selection targets, from a double signal, which is obtained by doubling the signal intensity of one selection pattern. The basic signal is a detection signal when all the detection electrodes Rx included in the detection electrode block RxB are in the coupled state (the detection signal $Svp_1$), for example.

The signal computing circuit 44 decodes the four detection signals Sc ($Sc_1$, $Sc_2$, $Sc_3$, $Sc_4$)=(13, −5, 3, −7) by Expression (5) below. The signal computing circuit 44 multiplies a matrix consisting of the detection signals Sc by the square matrix Hv to calculate decoded detection signals Sid ($Si_1d$, $Si_2d$, $Si_3d$, $Si_4d$)=(4, 28, 12, 8).

$$\begin{pmatrix} Si_1d \\ Si_2d \\ Si_3d \\ Si_4d \end{pmatrix} = \begin{pmatrix} 1 & 1 & 1 & 1 \\ 1 & -1 & 1 & -1 \\ 1 & 1 & -1 & -1 \\ 1 & -1 & -1 & 1 \end{pmatrix} \begin{pmatrix} Sc_1 \\ Sc_2 \\ Sc_3 \\ Sc_4 \end{pmatrix} \quad (5)$$

The decoded detection signals Sid correspond to values obtained by increasing the detection signals Si output from the detection electrodes Rx d-fold. The d corresponds to the order d of the square matrix Hv and is 4 in this embodiment. $Si_1d$ is assigned to the detection electrode Rx(k). The decoded detection signal $Si_2d$ is assigned to the detection electrode Rx(k+1). The decoded detection signal $Si_3d$ is assigned to the detection electrode Rx(k+2). The decoded detection signal $Si_4d$ is assigned to the detection electrode Rx(k+3). In accordance with the protrusion or recess of the finger Fin, the value of the decoded detection signal $Si_1d$, $Si_2d$, $Si_3d$, or $Si_4d$ of the detection electrode Rx corresponding to the position of the protrusion or recess changes.

In the sign selection driving described above, the signal computing circuit 44 performs the decoding processing using Expression (5) for the detection signals Si ($Si_1$, $Si_2$, $Si_3$, $Si_4$)=(1, 7, 3, 2), and thus the decoded detection signals Sid: ($Si_1d$, $Si_2d$, $Si_3d$, $Si_4d$)=(4, 28, 12, 8), can be obtained. The decoded detection signals Sid are the quadruple of the detection signals Si in signal intensity. That is to say, the signal intensity can be obtained four times as great as that obtained by time-division selection driving, without increasing the voltage of the drive signal Vs. Consequently, even when noise comes in from the outside, the noise immunity of the detection apparatus 100 can be improved by increasing the signal intensity.

In the first embodiment, the detection control circuit 11 switches between the coupled state and the non-coupled state for the detection electrodes Rx as the first selection targets selected based on the certain sign and the detection electrodes Rx as the second selection targets that are not included in the first selection targets. The detection circuit 40 performs decoding processing on the detection signals output from the detection electrodes Rx for each of different selection patterns Cpp of the detection electrodes Rx.

Figure 10:
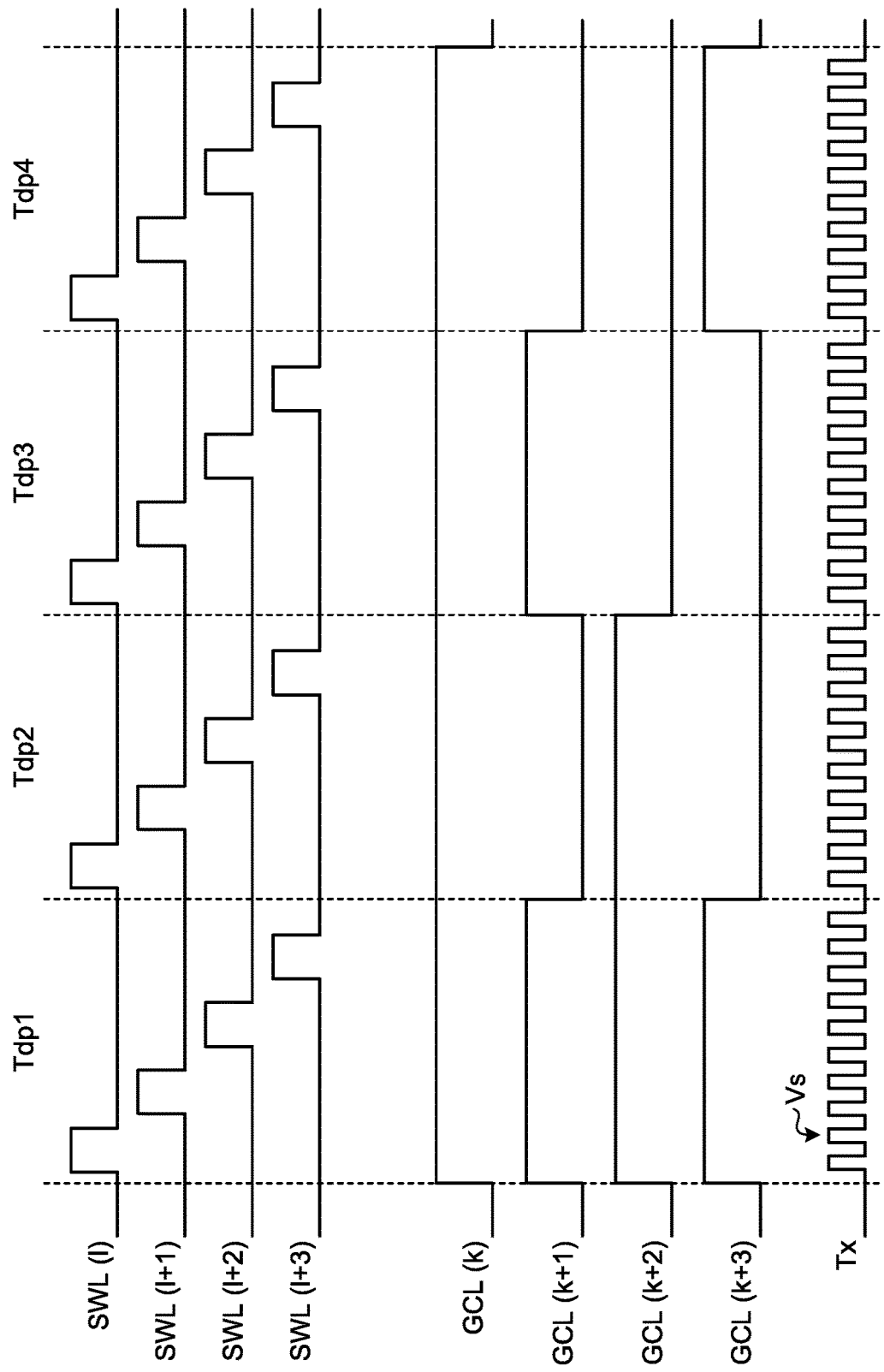
FIG. 10 is a timing waveform diagram of an operation example of the detection apparatus according to the first embodiment.

FIG. 10 is a timing waveform diagram of an operation example of the detection apparatus according to the first embodiment. As described above, the sign selection driving successively performs the positive sign selection operations Tdp. In the example illustrated in FIG. 10, for example, for one detection electrode block RxB(l) (refer to FIGS. 9A to 9D), the positive sign selection operation Tdp1, the positive sign selection operation Tdp2, the positive sign selection operation Tdp3, and the positive sign selection operation Tdp4 are performed successively in this order.

Figure 11A:
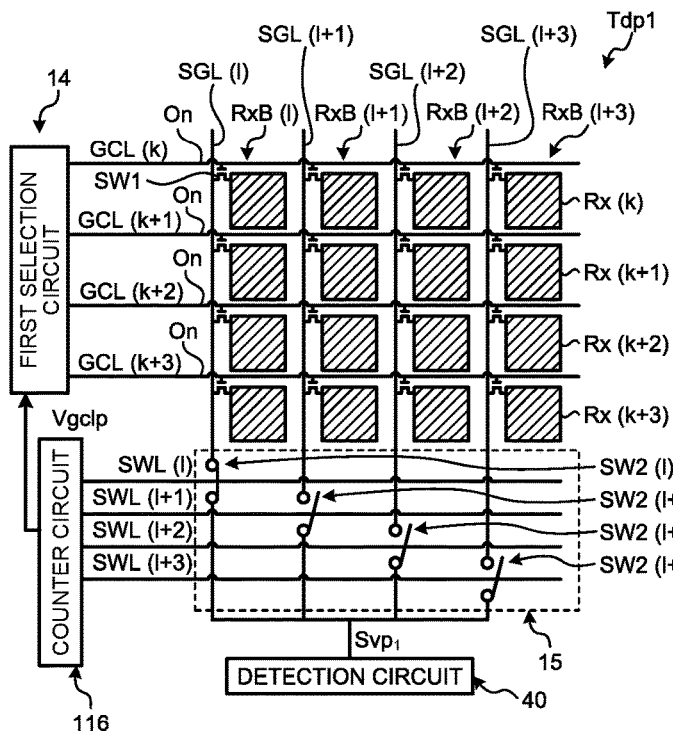
FIGS. 11A to 11G are diagrams of selection patterns of detection electrodes by positive sign selection driving for a plurality of detection electrode blocks.
Figure 11B:
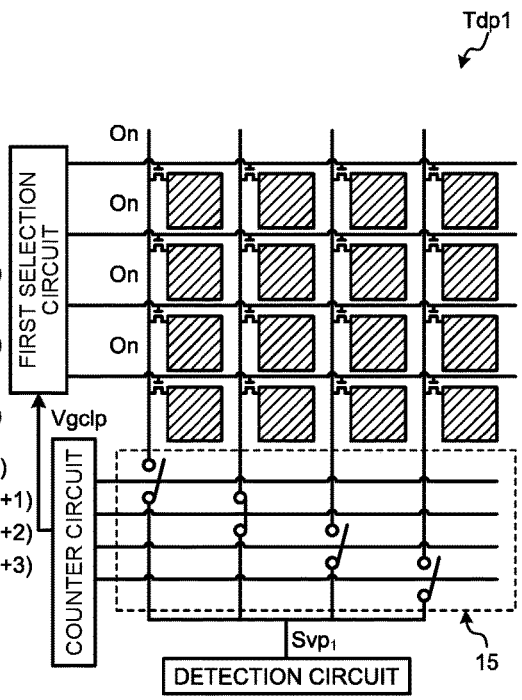
Figure 11C:
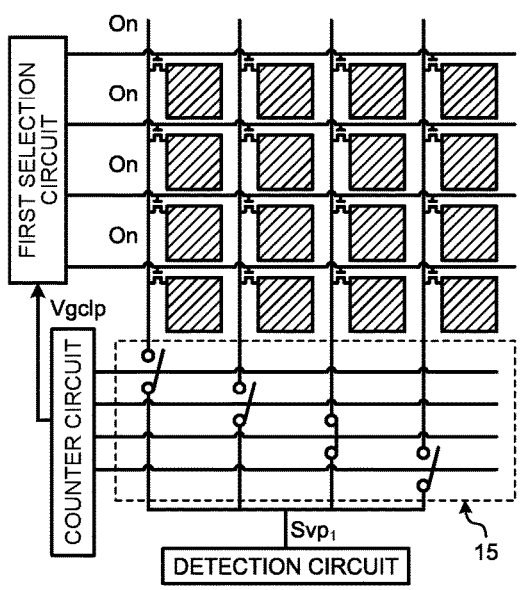
Figure 11D:
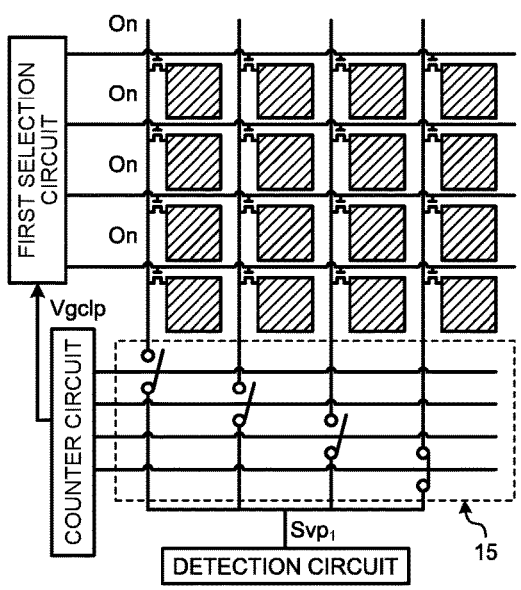
Figure 11E:
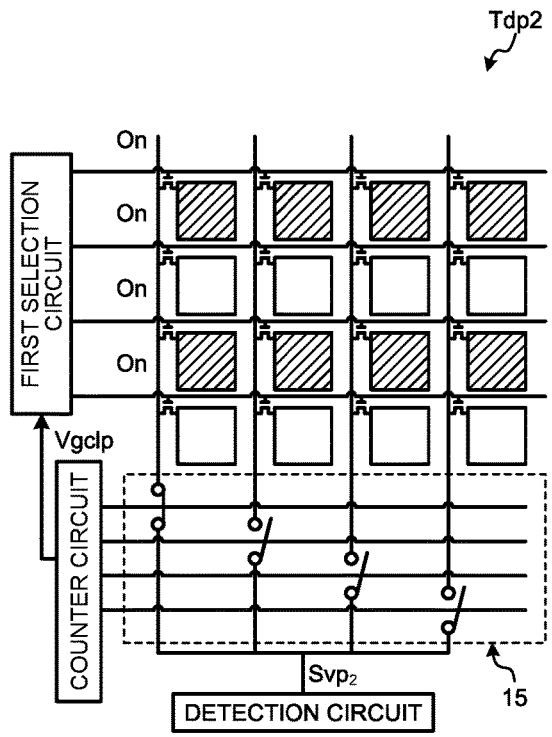
Figure 11F:
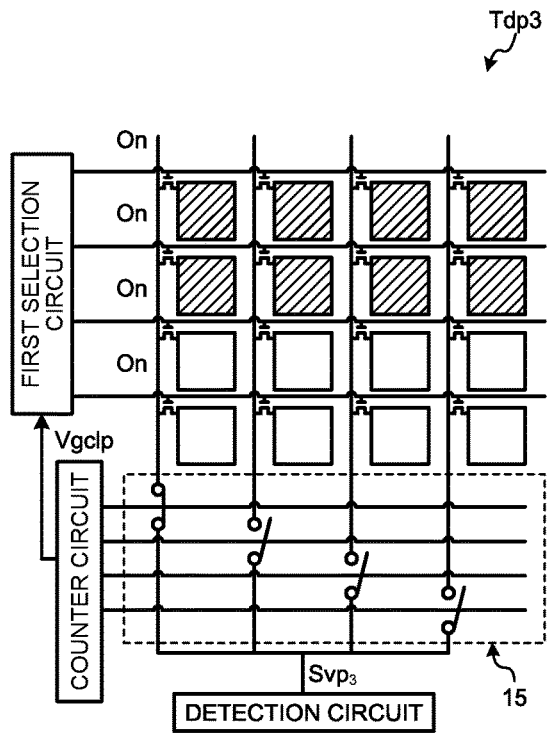
Figure 11G:
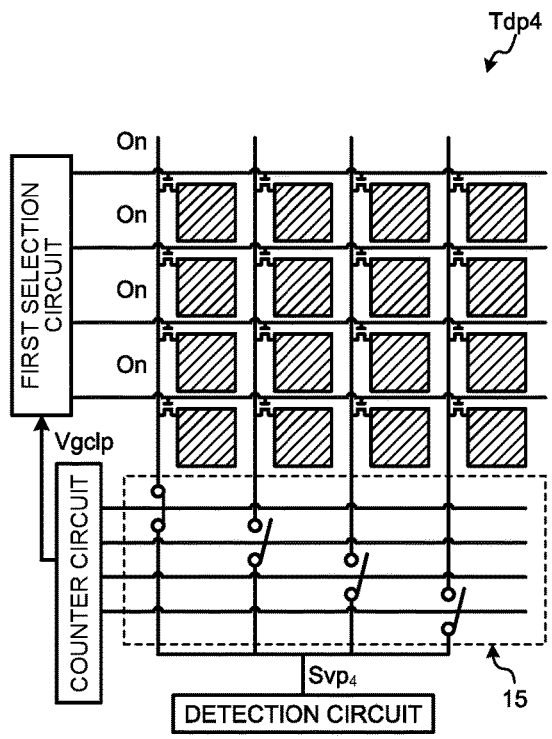

The following describes performing the sign selection driving for a plurality of detection electrode blocks RxB(l), RxB(l+1), RxB(l+2), and RxB(l+3). FIGS. 11A to 11G are diagrams of selection patterns of detection electrodes by positive sign selection driving for a plurality of detection electrodes. FIG. 11A is a diagram of a first selection pattern in the positive sign selection operation Tdp1. FIG. 11B is a diagram of a second selection pattern in the positive sign selection operation Tdp1. FIG. 11C is a third selection pattern in the positive sign selection operation Tdp1. FIG. 11D is a fourth selection pattern in the positive sign selection operation Tdp1. FIG. 11E is a diagram of a selection pattern in the positive sign selection operation Tdp2. FIG. 11F is a diagram of a selection pattern in the positive sign selection operation Tdp3. FIG. 11G is a diagram of a selection pattern in the positive sign selection operation Tdp4.

As illustrated in FIGS. 11A to 11G, the four detection electrode blocks RxB(l), RxB(l+1), RxB(l+2), and RxB(l+3) each have four detection electrodes Rx(k), Rx(k+1), Rx(k+2), and Rx(k+3) arranged in the column direction. The four detection electrode blocks RxB(l), RxB(l+1), RxB(l+2), and RxB(l+3) are arranged at regular intervals in the row direction. In the following description, when there is no need to separately describe the detection electrode blocks RxB(l), RxB(l+1), RxB(l+2), and RxB(l+3), they will be referred to simply as a detection electrode block RxB.

A plurality of detection electrodes Rx included in each of the detection electrode blocks RxB are coupled to the same data line SGL via the respective switch elements SW1. The four detection electrodes Rx included in the detection electrode block RxB(l) are coupled to the data line SGL(l) via the switch elements SW1, for example.

The second selection circuit 15 includes a plurality of switch elements SW2. The switch elements SW2 each switch between coupling and uncoupling respective data line SGL and the detection circuit 40. The switch elements SW2 are coupled to respective switch control lines SWL. The second selection circuit 15 has four switch elements SW2(l), SW2(l+1), SW2(l+2), and SW2(l+3), for example. The switch element SW2(l) is turned on and off to couple and uncouple the data line SGL(l) to and from the detection circuit 40 based on a signal from the switch control line SWL(l). Similarly, the switch elements SW2(l+1), SW2(l+2), and SW2(l+3) switch between coupling and uncoupling the data lines SGL(l+1), (l+2), and (l+3) to and from the detection circuit 40 based on signals from the switch control lines SWL(l+1), SWL(l+2), and SWL(l+3), respectively. In the following description, when there is no need to separately describe the switch elements SW2(l), SW2(l+1), SW2(l+2), and SW2(l+3), they will be referred to simply as a switch element SW2.

When the positive sign selection operation Tdp is performed, the detection apparatus 100 performs the positive sign selection operation Tdp1 of the detection operation Td1, the positive sign selection operation Tdp2 of the detection operation Td2, the positive sign selection operation Tdp3 of the detection operation Td3, and the positive sign selection operation Tdp4 of the detection operation Td4 for each of the detection electrode blocks RxB.

The order of performing the positive sign selection operations Tdp1, Tdp2, Tdp3, and Tdp4 for each of the detection electrode blocks RxB is not limited to a particular order; in the present embodiment, they are performed as indicated by the drive waveform in FIG. 10.

The following describes an example of a case in which the positive sign selection operation Tdp is performed. The detection apparatus 100 successively performs the detection operation Td1 for a plurality of detection electrode blocks RxB. Specifically, as illustrated in FIG. 10 and FIG. 11A, the first selection circuit 14 performs the positive sign selection operation Tdp1 of the detection operation Td1 based on the selection signal Vgclp supplied from the first control circuit 114 of the counter circuit 116. With this operation, a scan signal is supplied from the first selection circuit 14 to the switch elements SW1 coupled to the detection electrodes Rx as the first selection targets, and the detection electrodes Rx as the first selection targets are coupled to their corresponding data line SGL. In this state, as illustrated in FIG. 11A, the second selection circuit 15 turns on the switch element SW2(l) and turns off the switch elements SW2(l+1), SW2 (l+2), and SW2(l+3) based on the selection signal Vsel supplied from the second control circuit 115 of the counter circuit 116 (refer to FIG. 1). With this operation, the data line SGL(l) coupled to the detection electrode block RxB(l) among the four data lines SGL is coupled to the detection circuit 40, whereas the other data lines SGL are not coupled to the detection circuit 40. With this operation, the detection signal $Svp_1$ is output from the data line SGL(l).

Next, as illustrated in FIG. 10 and FIG. 11B, the second selection circuit 15 turns on the switch element SW2(l+1) and turns off the switch elements SW2(l), SW2(l+2), and SW2(l+3) based on the selection signal Vsel from the second control circuit 115. With this operation, the data line SGL(l+1) coupled to the detection electrode block RxB(l+1) is coupled to the detection circuit 40, whereas the other data lines SGL are not coupled to the detection circuit 40. With this operation, the detection signal $Svp_1$ is output from the data line SGL(l+1).

Next, as illustrated in FIG. 10 and FIG. 11C, the second selection circuit 15 turns on the switch element SW2(l+2) and turns off the switch elements SW2(l), SW2(l+1), and SW2(l+3) based on a signal from the second control circuit 115. With this operation, the data line SGL(l+2) coupled to the detection electrode block RxB(l+2) is coupled to the detection circuit 40, whereas the other data lines SGL are not coupled to the detection circuit 40. With this operation, the detection signal $Svp_1$ is output from the data line SGL(l+2).

Next, as illustrate in FIG. 10 and FIG. 11D, the second selection circuit 15 turns on the switch element SW2(l+3) and turns off the switch elements SW2(l), SW2(l+1), and SW2(l+2) based on a signal from the second control circuit 115. With this operation, the data line SGL(l+3) coupled to the detection electrode block RxB(l+3) is coupled to the detection circuit 40, whereas the other data lines SGL are not coupled to the detection circuit 40. With this operation, the detection signal $Svp_1$ is output from the data line SGL(l+3).

Next, as illustrated in FIG. 10, the detection apparatus 100 successively performs the detection operation Td2 for the detection electrode blocks RxB. Specifically, as illustrated in FIG. 11E, the first selection circuit 14 performs the positive sign selection operation Tdp2 of the detection operation Td2 based on the selection signal Vgclp supplied from the first control circuit 114. With this operation, a scan signal is supplied from the first selection circuit 14 to the switch elements SW1 coupled to the detection electrodes Rx as the first selection targets, and the detection electrodes Rx as the first selection targets are coupled to their corresponding data line SGL. In this state, the second selection circuit 15 turns on the switch element SW2(l) and turns off the switch elements SW2(l+1), SW2(l+2), and SW2(l+3) based on the selection signal Vsel from the second control circuit 115. With this operation, the data line SGL(l) coupled to the detection electrode block RxB(l) is coupled to the detection circuit 40, whereas the other signal lines SGL are not coupled to the detection circuit 40. With this operation, the detection signal $Svp_2$ is output from the data line SGL(l).

As illustrated in FIG. 10, in the detection operation Td2 as well, in a manner similar to the detection operation Td1, the second selection circuit 15 switches the switch elements SW2 to couple the data lines SGL(l), SGL(l+1), SGL(l+2), and SGL(l+3) one by one to the detection circuit 40. With this operation, the detection signals $Svp_2$ corresponding to the detection electrode blocks RxB are output to the detection circuit 40 from the data lines SGL.

Next, as illustrated in FIG. 10, the detection apparatus 100 successively performs the detection operation Td3 for the detection electrode blocks RxB. Specifically, as illustrated in FIG. 11F, the first selection circuit 14 performs the positive sign selection operation Tdp3 of the detection operation Td3 based on the selection signal Vgclp supplied from the first control circuit 114. With this operation, a scan signal is supplied from the first selection circuit 14 to the switch elements SW1 coupled to the detection electrodes Rx as the first selection targets, and the detection electrodes Rx as the first selection targets are coupled to their corresponding data line SGL. In this state, the second selection circuit 15 turns on the switch element SW2(l) and turns off the switch elements SW2(l+1), SW2(l+2), and SW2(l+3) based on the selection signal Vsel from the second control circuit 115. With this operation, the data line SGL(l) is coupled to the detection circuit 40, whereas the other data lines SGL are not coupled to the detection circuit 40. With this operation, the detection signal $Svp_3$ is output from the data line SGL(l).

As illustrated in FIG. 10, in the detection operation Td3 as well, in a manner similar to the detection operation Td1 and the detection operation Td2, the second selection circuit 15 switches the switch elements SW2 to couple the data lines SGL(l), SGL(l+1), SGL(l+2), and SGL(l+3) one by one to the detection circuit 40. With this operation, the detection signals $Svp_3$ corresponding to the detection electrode blocks RxB are output to the detection circuit 40 from the data lines SGL.

Next, as illustrated in FIG. 10, the detection apparatus 100 successively performs the detection operation Td4 for the detection electrode blocks RxB. Specifically, as illustrated in FIG. 11G, the first selection circuit 14 performs the positive sign selection operation Tdp4 of the detection operation Td4 based on the selection signal Vgclp supplied from the first control circuit 114. With this operation, a scan signal is supplied from the first selection circuit 14 to the switch elements SW1 coupled to the detection electrodes Rx as the first selection targets, and the detection electrodes Rx as the first selection targets and the data lines SGL are coupled to each other. In this state, the second selection circuit 15 turns on the switch element SW(l) and turns off the switch elements SW2(l+1), SW2(l+2), and SW2(l+3) based on the selection signal Vsel from the second control circuit 115. With this operation, the data line SGL(l) is coupled to the detection circuit 40, whereas the other data lines SGL are not coupled to the detection circuit 40. With this operation, the detection signal $Svp_4$ is output from the data line SGL(l).

As illustrated in FIG. 10, in the detection operation Td4 as well, in a manner similar to the detection operation Td1, the detection operation Td2, and the detection operation Td3, the second selection circuit 15 switches the switch elements SW2 to couple the data lines SGL(l), SGL(l+1), SGL(l+2), and SGL(l+3) one by one to the detection circuit 40. The first selection circuit 14 performs the positive sign selection operation Tdp4 of the detection operation Td4 for the detection electrode blocks RxB coupled to the detection circuit 40 via the data lines SGL. With this operation, the detection signals $Svp_4$ corresponding to the detection electrode blocks RxB are output to the detection circuit 40 from the data lines SGL.

The signal computing circuit 44 (refer to FIG. 1) calculates the four detection signals Sc ($Sc_1$, $Sc_2$, $Sc_3$, $Sc_4$) for each of the detection electrode blocks RxB. When the positive sign selection operation Tdp is performed, the detection signal $Sc_1$ is calculated from the detection signal $Svp_1$. The detection signal $SC_2$ is calculated from the detection signal $Svp_1$ and the detection signal $Svp_2$. The detection signal $SC_3$ is calculated from the detection signal $Svp_1$ and the detection signal $Svp_3$. The detection signal $Sc_4$ is calculated from the detection signal $Svp_1$ and the detection signal $Svp_4$. The signal computing circuit 44 outputs, to the storage circuit 48, the four detection signals Sc ($Sc_1$, $SC_2$, $SC_3$, $Sc_4$) for each of the detection electrode blocks RxB. The signal computing circuit 44 decodes, by Expression (5), the four detection signals Sc ($Sc_1$, $SC_2$, $SC_3$, $Sc_4$) for each of the detection electrode blocks RxB.

In each of the detection electrode blocks RxB, the decoded detection signal $Si_1d$ corresponds to the detection electrode Rx(k). The decoded detection signal $Si_2d$ corresponds to the detection electrode Rx(k+1). The decoded detection signal $Si_3d$ corresponds to the detection electrode Rx(k+2). The decoded detection signal $Si_4d$ corresponds to the detection electrode Rx(k+3). When the protrusion or recess of the finger Fin is in contact with or proximity to the detection electrode block RxB, the value of the decoded detection signal ($Si_1d$, $Si_2d$, $Si_3d$, or $Si_4d$) of the detection electrode Rx corresponding to the contact or proximity position changes.

The coordinates extraction circuit 45 can determine the coordinates of the detection electrode Rx, where the recess or protrusion of the finger Fin is in contact to or proximity with, among the detection electrodes Rx in each of the detection electrode blocks RxB based on the decoded detection signals $Si_1d$, $Si_2d$, $Si_3d$, and $Si_4d$. The coordinates extraction circuit 45 outputs the detected coordinates to the combination circuit 46. The combination circuit 46 combines the decoded detection signals ($Si_1d$, $Si_2d$, $Si_3d$, $Si_4d$) to generate two-dimensional information indicating the shape of an object being in contact or proximity. The combination circuit 46 outputs the two-dimensional information in the form of the output signal Vout of the detection circuit 40. The combination circuit 46 may generate an image based on the two-dimensional information and output its image information as the output signal Vout. The detection circuit 40 may output, as the output signal Vout, the coordinates that are output by the coordinates extraction circuit 45. The detection circuit 40 may not include the coordinates extraction circuit 45 and the combination circuit 46 and may output each of the decoded detection signals ($Si_1d$, $Si_2d$, $Si_3d$, and $Si_4d$ as the output signal Vout.

As described above, in the first embodiment, the detection signals Sid (the detection signals ($Si_1d$, $Si_2d$, $Si_3d$, $Si_4d$ of the respective detection electrodes Rx included in the detection electrode block RxB can be obtained from the detection signals Svp obtained only by the positive sign selection operation Tdp as one of the two sign selection operations based on a certain sign: the positive sign selection operation Tdp and the negative sign selection operation Tdm. Thus, the detection signals Sid of the respective detection electrodes Rx included in each of the detection electrode blocks RxB can be output with fewer selection patterns than a case in which both the positive sign selection operation Tdp and the negative sign selection operation Tdm are performed.

Performing only the positive sign selection operation Tdp as the detection operation Td can reduce a time required for completing one frame of the detection operation Td and also reduce the amount of data that the storage circuit 48 is required to hold until one frame of the detection operation Td is completed. Consequently, requirements for the detection circuit 40 in processing capability, processing time, and storage capacity can be reduced, and both a reduction in loads and an improvement in accuracy can be achieved. The one frame of the detection operation Td corresponds to a period for the detection operation Td of the same selection pattern to be performed for one detection electrode block RxB and indicates a period from when the detection operation Td1 is performed for the detection electrode block RxB(l) until when the detection operation Td1 is next performed for the detection electrode block RxB(l), for example. The one frame of the detection operation Td may indicate a period for the positive sign selection operations Tdp of all the selection patterns to be completed for one detection electrode block RxB. All the selection patterns are selection patterns the number of which is equal to or less than the order d of the square matrix Hv corresponding to the certain sign and are, in this embodiment, the four selection patterns (Cpp1, Cpp2, Cpp3, Cpp4) corresponding to the order d of the square matrix Hv, for example. The one frame may indicate a period for these positive sign selection operations Tdp1, Tdp2, Tdp3, and Tdp4 to be completed.

Although the first embodiment describes a case in which the number n of the detection electrodes Rx included in the detection electrode block RxB(l) is four, the number of the detection electrodes Rx is not limited thereto and may be two, three, or five or more. The order d of the square matrix Hv is not limited to 4 either and may be 2, 3, or 5 or more. The order d of the square matrix Hv is equal to or greater than the number n of the detection electrodes Rx included in the detection electrode block RxB(l).

The first embodiment describes that the shape and fingerprint of the finger Fin is detected by the detection apparatus 100. However, the object to be detected by the detection apparatus 100 is not limited to the finger Fin. The object to be detected by the detection apparatus 100 is only required to be an object forming capacitance between the object and the detection electrode Rx; a protrusion or recess of a palm or a foot or the like may be detected, for example. The detection apparatus 100 detects a capacitance change by the protrusion or recess of a palm to detect the shape and palm print of the palm, for example.

As illustrated in FIG. 4, a height h3 of the detection electrode Tx from the one face 101a is greater than a height h1 of the detection electrode Rx from the one face 101a. Further, as illustrated in FIG. 4, the height h3 of the detection electrode Tx from the one face 101a is greater than a height h2 of an insulating resin 33 from the one face 101a. With this structure, when the finger Fin approaches the detection electrode Rx, it is easy for the finger Fin to be naturally in contact with the detection electrode Tx.

The detection electrodes Rx are arranged in a first direction and a second direction crossing the first direction. The first direction is the row direction, whereas the second direction is the column direction, for example. With this structure, the resolution of detection of the shape and fingerprint of the finger Fin can be increased.

First Modification of First Embodiment

Figure 12:
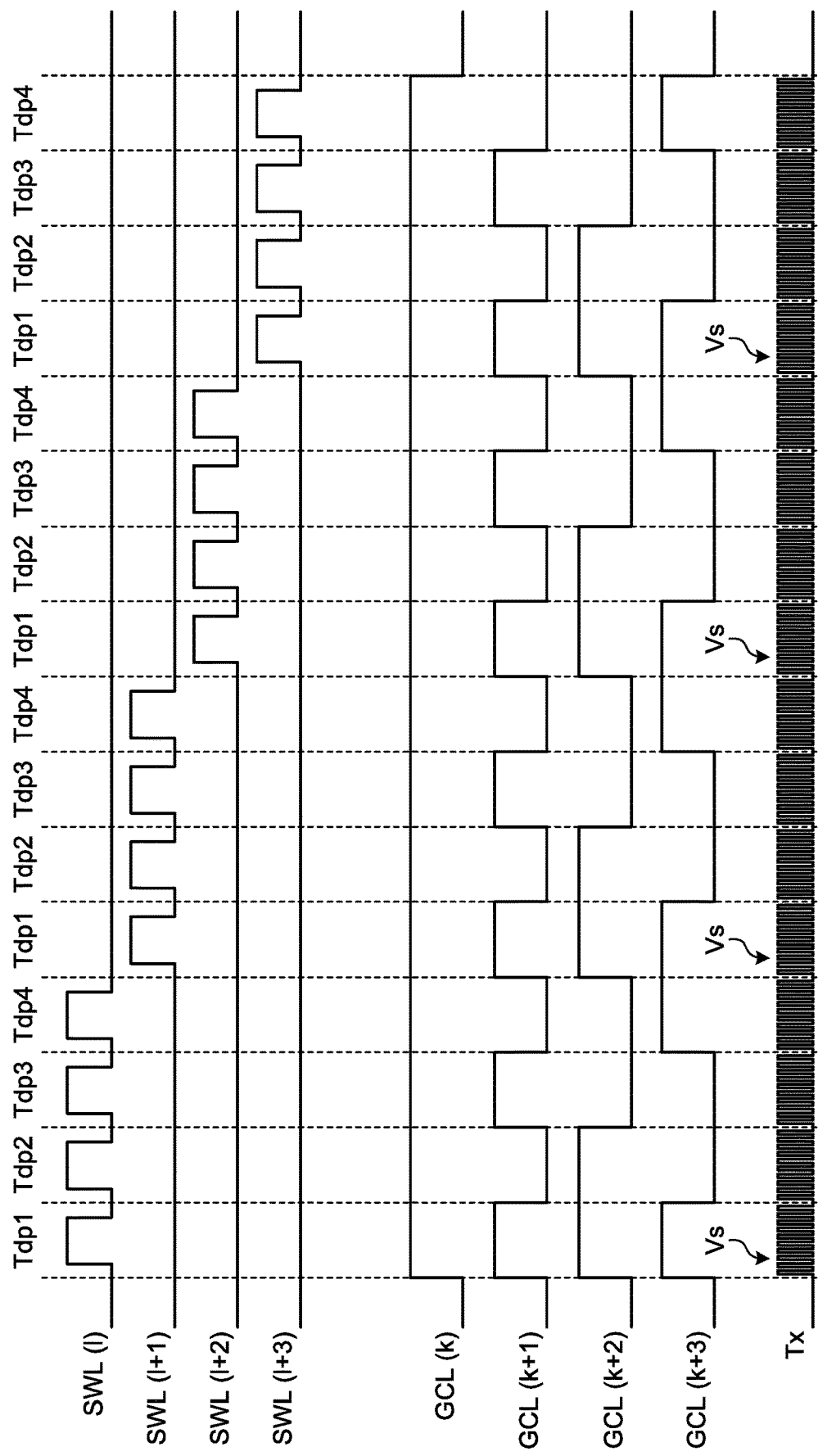
FIG. 12 is a diagram of drive waveforms corresponding to a first modification of the first embodiment.

Although the first embodiment describes a case in which the switch elements SW2 of the second selection circuit 15 are successively selected in a state where the detection electrode block RxB is coupled to the data line SGL in the same selection pattern Cpp by the first selection circuit 14 as illustrated in FIG. 10, the order of driving is not limited thereto. FIG. 12 is a diagram of drive waveforms corresponding to a first modification of the first embodiment. Descriptions of matters common to the first embodiment will be omitted.

In the first modification of the first embodiment, with the switch element SW2(l) of the second selection circuit 15 coupled to the detection circuit 40 based on a signal from the second control circuit 115 to the switch control line SWL(l), the first control circuit 114 and the first selection circuit 14 successively perform the positive sign selection operations Tdp1, Tdp2, Tdp3, and Tdp4. Next, with the switch element SW2(l+1) of the second selection circuit 15 coupled to the detection circuit 40 based on a signal from the second control circuit 115 to the switch control line SWL(l+1), the first control circuit 114 and the first selection circuit 14 successively perform the positive sign selection operations Tdp1, Tdp2, Tdp3, and Tdp4. Similarly, with the switch element SW2(l+2) of the second selection circuit 15 coupled to the detection circuit 40, the first control circuit 114 and the first selection circuit 14 successively perform the positive sign selection operations Tdp1, Tdp2, Tdp3, and Tdp4; with the switch element SW2(l+3) of the second selection circuit 15 coupled to the detection circuit 40, the first control circuit 114 and the first selection circuit 14 successively perform the positive sign selection operations Tdp1, Tdp2, Tdp3, and Tdp4. In other words, after an operation similar to that illustrated in FIG. 11A is performed, operations similar to those illustrated in FIG. 11E, FIG. 11F, and FIG. 11G are performed, and then the operation of FIG. 11B is performed.

As described in Expression (4) and Expression (5), to detect the detection signals Sc and the decoded detection signals Sid, it is necessary to obtain all the detection signals Svp ($Svp_1$, $Svp_2$, $Svp_3$, $Svp_4$). According to the first modification of the first embodiment, after all the detection signals Svp ($Svp_1$, $Svp_2$, $Svp_3$, $Svp_4$) of one detection electrode block RxB are obtained based on all the positive sign selection operations Tdp (Tdp1, Tdp2, Tdp3, Tdp4), the positive sign selection operations Tdp for the next detection electrode block RxB start. Consequently, without waiting for the completion of the positive sign selection operations Tdp by another detection electrode block RxB, when all the positive sign selection operations Tdp are completed for one detection electrode block RxB, the signal computing circuit 44 can perform the computation processing described in Expression (4) and Expression (5). Consequently, the signal computing circuit 44 can perform computation processing for a previous detection electrode block RxB in parallel with an operation of performing the positive sign selection operations Tdp for another detection electrode block RxB and acquiring the detection signals Svp thereof; this can reduce a time until the output signal Vout is output.

After the computation processing described in Expression (4) and the computation processing described in Expression (5) are performed, it becomes unnecessary for the detection signals Svp to be held in the storage circuit 48. This can reduce the amount of data that the storage circuit 48 is required to hold as compared with a case in which all the detection signals Svp are held for all the detection electrode blocks RxB.

Second Embodiment

Although the first embodiment describes a case in which the positive sign selection operation Tdp is performed among the positive sign selection operation Tdp and the negative sign selection operation Tdm based on the certain sign illustrated in FIGS. 9A to 9D, the operation to be performed is not limited thereto. In a second embodiment, the following describes a case in which the negative sign selection operation Tdm is performed. Descriptions of matters common to the first embodiment will be omitted.

As illustrated in FIGS. 9A to 9D, in the negative sign selection operation Tdm, the detection control circuit 11 selects the detection electrodes Rx as the first selection targets in accordance with the selection signal Vgclm corresponding to the elements "−1" of the square matrix Hv. The detection control circuit 11 selects the detection electrodes Rx as the second selection targets that are not included in the detection electrodes Rx as the first selection targets among the detection electrodes Rx. The detection control circuit 11 supplies the selection signal Vgclm to the first selection circuit 14 (refer to FIG. 1), and the first selection circuit 14 supplies a scan signal based on the selection signal Vgclm to the scan line GCL (refer to FIG. 3). With this operation, the detection electrodes Rx as the first selection targets are in the coupled state, whereas the detection electrodes Rx as the second selection targets are in the non-coupled state. In one detection operation Td, the detection electrodes Rx as the first selection targets in the positive sign selection operation Tdp correspond to the detection electrodes Rx as the second selection targets in the negative sign selection operation Tdm. That is to say, in one detection operation Td, the negative sign selection operation Tdm is an operation with selection patterns obtained by inverting the selection patterns Cpp of the detection electrodes Rx of the positive sign selection operation Tdp.

The detection signals Svm ($Svm_1$, $Svm_2$, $Svm_4$, $Svm_4$) are output to the detection circuit 40 from the detection electrode block RxB via one data line SGL and the second selection circuit 15. The detection signals Svm are signals obtained by integrating the detection signals Si output from the detection electrodes Rx as the first selection targets selected in accordance with the selection signal Vgclm. As described above, the selection signal Vgclm corresponds to the elements "−1" of the square matrix Hv.

In the second embodiment, in order to obtain the detection signals Svm, the first selection circuit 14 and the second selection circuit 15 cause the detection electrodes Rx and the detection circuit 40 to be in the coupled state and the non-coupled state by performing the negative sign selection operations Tdm1, Tdm2, Tdm3, and Tdm4. Thus, the first selection circuit 14 and the second selection circuit 15 function as coupling circuits. A selection pattern Cpm1 by the negative sign selection operation Tdm1, a selection pattern Cpm2 by the negative sign selection operation Tdm2, a selection pattern Cpm3 by the negative sign selection operation Tdm3, and a selection pattern Cpm4 by the negative sign selection operation Tdm4 are different from each other. That is to say, the negative sign selection operation Tdm includes a plurality of selection patterns of the detection electrodes Rx and the detection circuit 40 in which the detection electrodes Rx as the first selection targets among a plurality of detection electrodes Rx are caused to be coupled to the detection circuit 40, that is, the coupled state; and the detection electrodes Rx as the second selection targets that are not included in the first selection targets are caused to be uncoupled from the detection circuit 40, that is, the non-coupled state. Even when the coupled state and the non-coupled state in any one of selection patterns Cpm of the negative sign selection operation Tdm (second selection patterns) are inverted, the inverted pattern is not identical to any of the other selection patterns Cpm included in the negative sign selection operation Tdm. That is to say, the selection patterns included in the negative sign selection operation Tdm do not include any selection patterns causing the detection electrodes as the first selection targets in any one of the selection patterns to be the non-coupled state and causing the detection electrodes as the second selection targets therein to be the coupled state.

The relation between the first selection targets and the second selection targets is reversed between the positive sign selection operation Tdp1 and the negative sign selection operation Tdm1. The relation between the first selection targets and the second selection targets is reversed between the positive sign selection operation Tdp2 and the negative sign selection operation Tdm2. The relation between the first selection targets and the second selection targets is reversed between the positive sign selection operation Tdp3 and the negative sign selection operation Tdm3. The relation between the first selection targets and the second selection targets is reversed between the positive sign selection operation Tdp4 and the negative sign selection operation Tdm4. That is to say, the relation between the first selection targets and the second selection targets in a plurality of selection patterns (the selection patterns Cpp) included in one (the positive sign selection operation Tdp) of two operations is obtained by reversing the relation between the first selection targets and the second selection targets in a plurality of selection patterns (the selection patterns Cpm) included in the other (the negative sign selection operation Tdm).

FIG. 13 is a diagram of drive waveforms of the detection apparatus in the second embodiment. As illustrated in FIG. 13, the detection apparatus 100 performs a standard sign selection operation Tdb in addition to the negative sign selection operation Tdm. Specifically, in the standard sign selection operation Tdb, the first control circuit 114 outputs a selection signal Vgclb for selecting all the detection electrodes Rx included in the detection electrode block RxB as the first selection targets. The first selection circuit 14, based on the selection signal Vgclb, supplies a scan signal to the scan lines GCL coupled to the switch elements SW1 of all the detection electrodes Rx included in the detection electrode block RxB. Via the switch elements SW1 to which the scan signal has been supplied, all the detection electrodes Rx included in the detection electrode block RxB are coupled to a data line SGL shared among the all the detection electrodes Rx therein, and a detection signal Svb is output.

The standard sign selection operation Tdb corresponds to the positive sign selection operation Tdp1 for example. In other words, a selection pattern Cpb of the standard sign selection operation Tdb corresponds to an inverted pattern of the selection pattern Cpm1 of the negative sign selection operation Tdm. The detection signal Svb corresponds to the detection signal Svp1. Consequently, in the detection apparatus 100, except for the selection pattern Cpb of the standard sign selection operation Tdb, even when the coupled state and the non-coupled state in any one of the selection patterns Cpm (Cpm1, Cpm2, Cpm3, Cpm4) of the negative sign selection operation Tdm are inverted, the inverted pattern is not identical to any of the other selection patterns Cpm included in the negative sign selection operation Tdm.

As described in Expression (6), the square matrix Hv can be represented as a result of subtraction of the double of the square matrix Hvm from the square matrix Hvb with all the elements being "1". Consequently, a matrix HvScX can be represented as a result of subtraction of the double of the matrix HvmSiX from a matrix HvbSiX. The matrix HvmSiX corresponds to a matrix consisting of the detection signals Svm ($Svm_1$, $Svm_2$, $Svm_3$, $Svm_4$), whereas the matrix HvbSiX corresponds to a matrix consisting of the detection signal Svb.

$$HvScX = \begin{pmatrix} 1 & 1 & 1 & 1 \\ 1 & -1 & 1 & -1 \\ 1 & 1 & -1 & -1 \\ 1 & -1 & -1 & 1 \end{pmatrix}\begin{pmatrix} Si_1 \\ Si_2 \\ Si_3 \\ Si_4 \end{pmatrix} = \begin{pmatrix} 1 & 1 & 1 & 1 \\ 1 & 0 & 1 & 0 \\ 1 & 1 & 0 & 0 \\ 1 & 0 & 0 & 1 \end{pmatrix}\begin{pmatrix} Si_1 \\ Si_2 \\ Si_3 \\ Si_4 \end{pmatrix} - \quad (7)$$

$$\begin{pmatrix} 0 & 0 & 0 & 0 \\ 0 & 1 & 0 & 1 \\ 0 & 0 & 1 & 1 \\ 0 & 1 & 1 & 0 \end{pmatrix}\begin{pmatrix} Si_1 \\ Si_2 \\ Si_3 \\ Si_4 \end{pmatrix}$$

$$= HvpSiX - HvmSiX$$

$$= \begin{pmatrix} 1 & 1 & 1 & 1 \\ 1 & 1 & 1 & 1 \\ 1 & 1 & 1 & 1 \\ 1 & 1 & 1 & 1 \end{pmatrix}\begin{pmatrix} Si_1 \\ Si_2 \\ Si_3 \\ Si_4 \end{pmatrix} - 2\begin{pmatrix} 0 & 0 & 0 & 0 \\ 0 & 1 & 0 & 1 \\ 0 & 0 & 1 & 1 \\ 0 & 1 & 1 & 0 \end{pmatrix}\begin{pmatrix} Si_1 \\ Si_2 \\ Si_3 \\ Si_4 \end{pmatrix}$$

$$= HvbSiX - 2HvmSiX \quad (6)$$

$$= \begin{pmatrix} Svb \\ Svb \\ Svb \\ Svb \end{pmatrix} - 2\begin{pmatrix} Svm_1 \\ Svm_2 \\ Svm_3 \\ Svm_4 \end{pmatrix} = \begin{pmatrix} Sc_1 \\ Sc_2 \\ Sc_3 \\ Sc_4 \end{pmatrix}$$

The signal computing circuit 44 can determine the four detection signals Sc ($Sc_1$, $Sc_2$, $Sc_3$, $Sc_4$) from the four detection signals $Svm_1$, $Svm_2$, $Svm_3$, and $Svm_4$ through a mechanism similar to that described with reference to Expression (6). Specifically, when the detection signals Si of the respective detection electrodes Rx included in the detection electrode block RxB are ($Si_1$, $Si_2$, $Si_3$, $Si_4$)=(1, 7, 3, 2), the detection signal Svb becomes 13 (Svb=1+7+3+2=13). The detection signals Svm are ($Svm_1$, $Svm_2$, $Svm_3$, $Svm_4$)=(0, 7+2=9, 3+2=5, 7+3=10). The four detection signals Sc ($Sc_1$, $SC_2$, $SC_3$, $SC_4$) can be determined by subtracting the values obtained by multiplying the detection signals $Svm_1$, $Svm_2$, $Svm_3$, and $Svm_4$ by 2 each from the detection signal Svb. Consequently, as in the first embodiment, the detection signals Sc are ($Sc_1$, $SC_2$, $SC_3$, $SC_4)=('-0\times2=13, 13-9\times2=-5, 13-5\times2=3, 13-10\times2=-7)$. Thus, the signal computing circuit 44 successively calculates the detection signals Sc from the detection signals Svm and outputs the detection signals Sc to the storage circuit 48. That is to say, the signal computing circuit 44 is a computing circuit subtracting a double signal obtained by doubling the signal intensity of one selection pattern from a basic signal when the detection electrodes Rx are all the first selection targets.

The signal computing circuit 44, as in the first embodiment, calculates the decoded detection signals Sid $((Si_1d, Si_2d, Si_3d, Si_4d)=(4, 28, 12, 8)$ based on Expression (5). The decoded detection signals Sid correspond to values obtained by increasing the detection signals Si output from the detection electrodes Rx d-fold. The d corresponds to the order of the square matrix Hv and is 4 in this embodiment. The value of the decoded detection signal Sid of the detection electrode Rx corresponding to the position of the protrusion or recess of the finger Fin changes in accordance with the recess or protrusion.

In the sign selection driving described above, the decoding processing using Expression (5) is performed for the detection signals Si $(Si_1, Si_2, Si_3, Si_4)=(1, 7, 3, 2)$ by the signal computing circuit 44, and thus the decoded detection signals Sid: $(Si_1d, Si_2d, Si_3d, Si_4d)=(4, 28, 12, 8)$, can be obtained. The decoded detection signals Sid are the quadruple of the detection signals Si in signal intensity. That is to say, the signal intensity can be obtained four times as great as that obtained in time-division selection driving, without increasing the voltage of the drive signal Vs. Consequently, even when noise comes in from the outside, the noise immunity of the detection apparatus 100 can be improved by increasing the signal intensity.

Figure 14A:
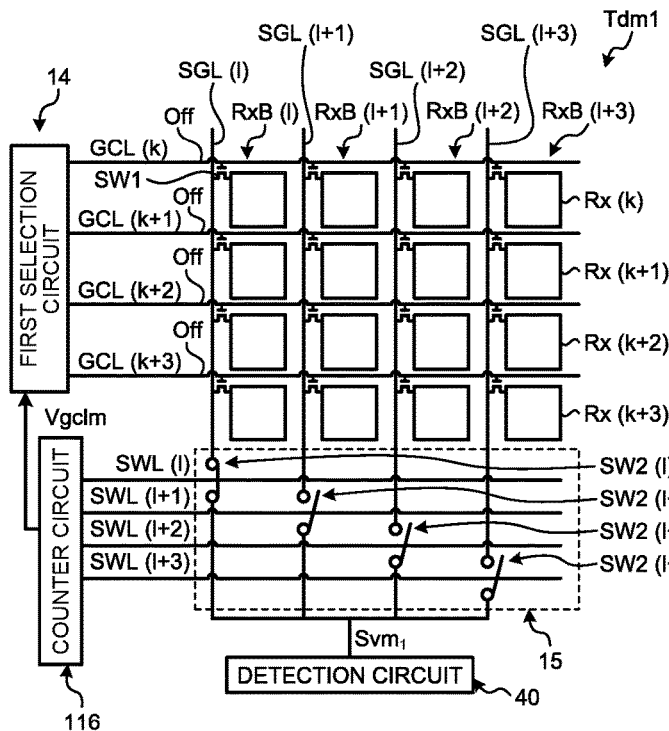
FIGS. 14A to 14H are diagrams of selection patterns of the detection electrodes by negative sign selection driving for the detection electrode blocks.
Figure 14B:
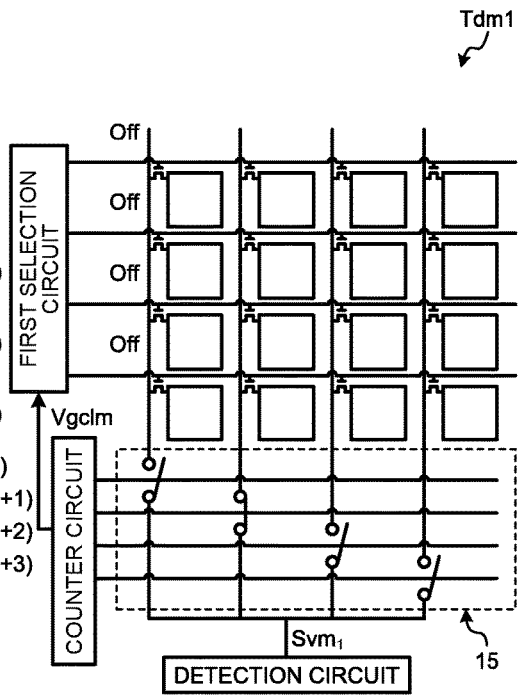
Figure 14C:
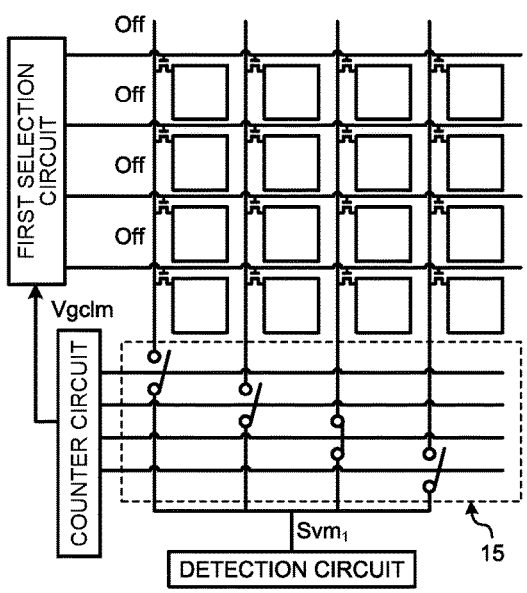
Figure 14D:
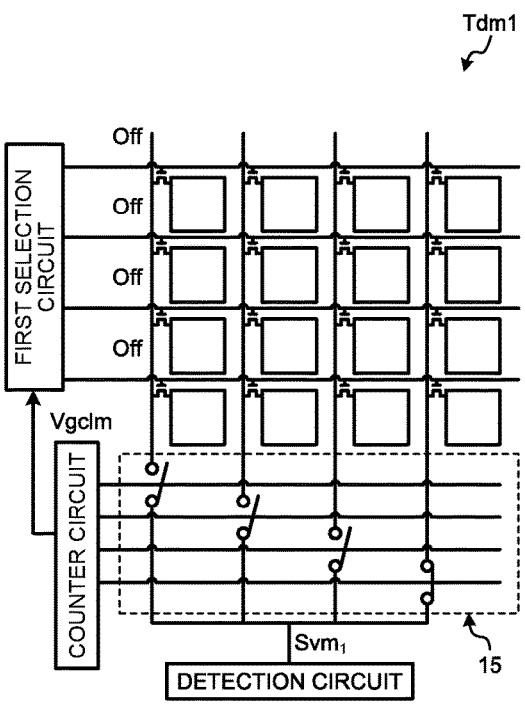
Figure 14E:
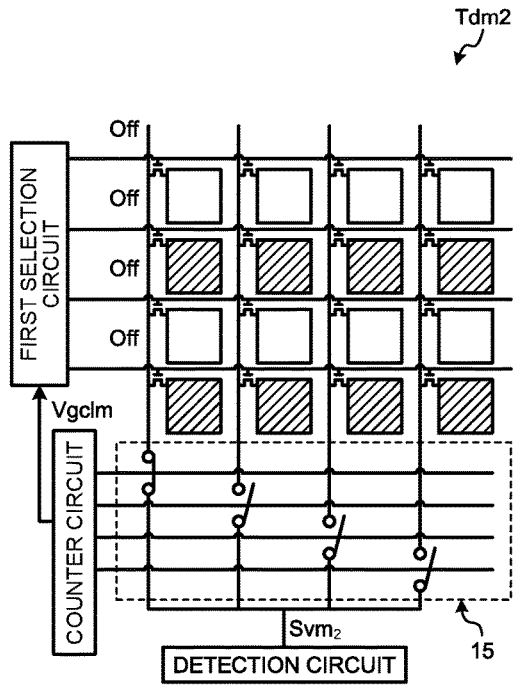
Figure 14F:
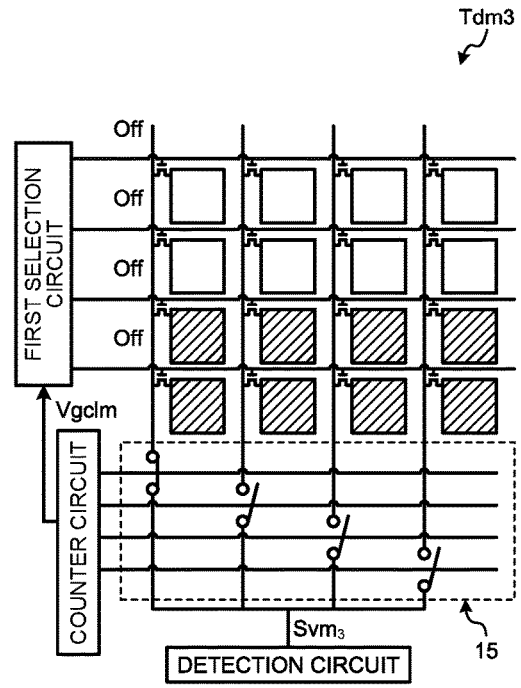
Figure 14G:
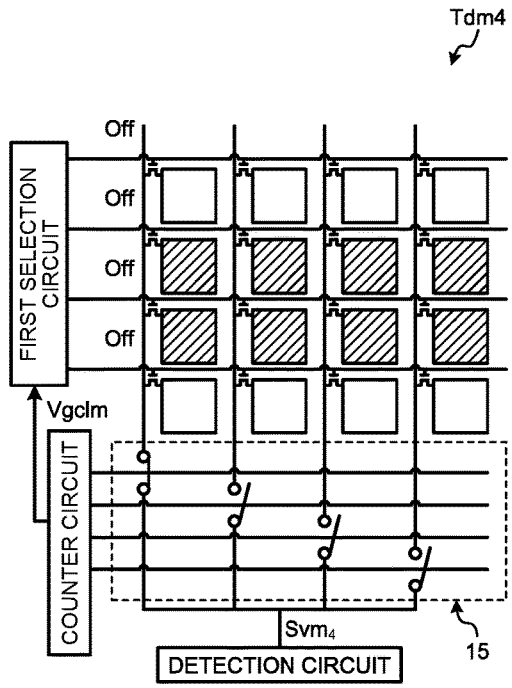
Figure 14H:
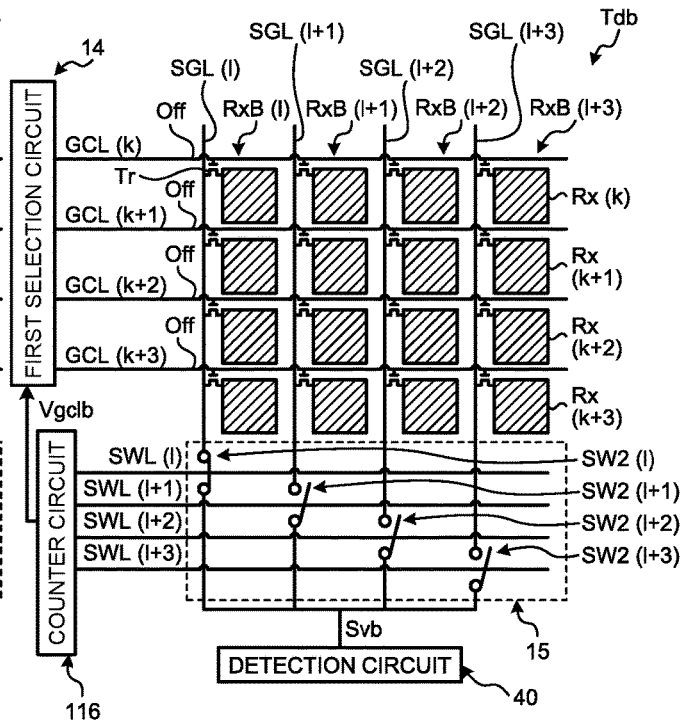

The following describes performing the sign selection driving for the detection electrode blocks RxB(l), RxB(l+1), RxB(l+2), and RxB(l+3). FIGS. 14A to 14H are diagrams of selection patterns of detection electrodes by negative sign selection driving for the detection electrode blocks. FIG. 14A is a diagram of a first selection pattern in the negative sign selection operation Tdm1. FIG. 14B is a diagram of a second selection pattern in the negative sign selection operation Tdm1. FIG. 14C is a diagram of a third selection pattern in the negative sign selection operation Tdm1. FIG. 14D is a diagram of a fourth selection pattern in the negative sign selection operation Tdm1. FIG. 14E is a diagram of a selection pattern in the standard sign selection operation Tdb. FIG. 14F is a diagram of a selection pattern in the negative sign selection operation Tdm2. FIG. 14G is a diagram of a selection pattern in the negative sign selection operation Tdm3. FIG. 14H is a diagram of a selection pattern in the negative sign selection operation Tdm4.

As illustrated in FIG. 13 and FIGS. 14A to 14H, in the detection apparatus 100 of the second embodiment, in a state where the detection electrodes Rx are caused to be the coupled state by the first selection circuit 14 in one of the selection patterns Cpm and the selection pattern Cpb in accordance with the selection signal Vgclm or a selection signal Vgclb from the first control circuit 114, the second selection circuit 15 successively selects the data lines SGL to be coupled to the detection circuit 40 in accordance with a signal from the second control circuit 115.

The detection apparatus 100 of the second embodiment performs the negative sign selection operation Tdm1 as the detection operation Td1. Specifically, based on the selection signal Vgclm from the first control circuit 114, the first selection circuit 14 supplies a scan signal corresponding to the selection pattern Cpm1 to the scan line GCL. As illustrated in FIG. 14A, the second selection circuit 15 couples the data line SGL(l) to the detection circuit 40 in accordance with the selection signal Vsel from the second control circuit 115 to output the detection signal $Svm_1$ from the detection electrode block RxB(l) to the detection circuit 40. Similarly, as illustrated in FIG. 14B, FIG. 14C, and FIG. 14D, the second selection circuit 15 successively couples the data lines SGL(l+1), SGL(l+2), and SGL(l+3) to the detection circuit 40 to output the detection signals Svmi from the detection electrode blocks RxB(l+1), RxB(l+2), and RxB(l+3) to the detection circuit 40.

Next, the detection apparatus 100 of the second embodiment performs the negative sign selection operation Tdm2 as the detection operation Td2. Specifically, based on the selection signal Vgclm from the first control circuit 114, the first selection circuit 14 supplies a scan signal corresponding to the selection pattern Cpm2 to the scan line GCL. As illustrated in FIG. 14E, the second selection circuit 15 couples the data line SGL(l) to the detection circuit 40 in accordance with the selection signal Vsel from the second control circuit 115 to output the detection signal $Svm_2$ from the detection electrode block RxB(l) to the detection circuit 40. Similarly, the second selection circuit 15 successively couples the data lines SGL(l+1), SGL(l+2), and SGL(l+3) to the detection circuit 40 to output the detection signals $Svm_2$ from the detection electrode blocks RxB(l+1), RxB(l+2), and RxB(l+3) to the detection circuit 40.

Next, the detection apparatus 100 of the second embodiment performs the negative sign selection operation Tdm3 as the detection operation Td3. Specifically, based on the selection signal Vgclm from the first control circuit 114, the first selection circuit 14 supplies a scan signal corresponding to the selection pattern Cpm3 to the scan line GCL. As illustrated in FIG. 14F, the second selection circuit 15 couples the data line SGL(l) to the detection circuit 40 in accordance with the selection signal Vsel from the second control circuit 115 to output the detection signal $Svm_3$ from the detection electrode block RxB(l) to the detection circuit 40. Similarly, the second selection circuit 15 successively couples the data lines SGL(l+1), SGL(l+2), and SGL(l+3) to the detection circuit 40 to output the detection signals $Svm_3$ from the detection electrode blocks RxB(l+1), RxB(l+2), and RxB(l+3) to the detection circuit 40.

Next, the detection apparatus 100 of the second embodiment performs the negative sign selection operation Tdm4 as the detection operation Td4. Specifically, based on the selection signal Vgclm from the first control circuit 114, the first selection circuit 14 supplies a scan signal corresponding to the selection pattern Cpm4 to the scan line GCL. As illustrated in FIG. 14G, the second selection circuit 15 couples the data line SGL(l) to the detection circuit 40 in accordance with the selection signal Vsel from the second control circuit 115 to output the detection signal $Svm_4$ from the detection electrode block RxB(l) to the detection circuit 40. Similarly, the second selection circuit 15 successively couples the data lines SGL(l+1), SGL(l+2), and SGL(l+3) to the detection circuit 40 to output the detection signals $Svm_4$ from the detection electrode blocks RxB(l+1), RxB(l+2), and RxB(l+3) to the detection circuit 40.

Further, the detection apparatus 100 performs the standard sign selection operation Tdb as a detection operation Td5. Specifically, based on the selection signal Vgclb from the first control circuit 114, the first selection circuit 14 supplies a scan signal corresponding to the selection pattern Cpb to the scan line GCL. As illustrated in FIG. 14H, the second selection circuit 15 couples the data line SGL(l) to the detection circuit 40 in accordance with a signal from the second control circuit 115 to output the detection signal Svb from the detection electrode block RxB(l) to the detection circuit 40. Similarly, the second selection circuit 15 successively couples the data lines SGL(l+1), SGL(l+2), and SGL(l+3) to the detection circuit 40 to output the detection signals Svb from the detection electrode blocks RxB(l+1), RxB(l+2), and RxB(l+3) to the detection circuit 40.

The signal computing circuit 44 of the detection circuit 40 generates detection signals Svc ($Svc_1$, $Svc_2$, $Svc_3$, $Svc_4$) based on the acquired detection signals Svm ($Svm_1$, $Svm_2$, $Svm_3$, $Svm_4$) and the detection signal Svb, based on Expression (6). Further, the detection signals Svc are decoded based on Expression (5) to generate detection signals Sid ($Si_1d$, $Si_2d$, $Si_3d$, $Si_4d$). The detection circuit 40 outputs the output signal Vout based on the detection signals Sid ($Si_1d$, $Si_2d$, $Si_3d$, $Si_4d$).

As described above, in the second embodiment, the detection signals Sid (the detection signals $Si_1d$, $Si_2d$, $Si_3d$, $Si_4d$) of the respective detection electrodes Rx included in the detection electrode block RxB can be obtained from the detection signals Svm and the detection signal Svb obtained only by the standard sign selection operation Tdb and the negative sign selection operation Tdm that is one of the two sign selection operations based on a certain sign: the positive sign selection operation Tdp and the negative sign selection operation Tdm. Thus, the detection signals Sid of the respective detection electrodes Rx included in each of the detection electrode blocks RxB can be output with fewer selection patterns than a case in which both the positive sign selection operation Tdp and the negative sign selection operation Tdm are performed.

First Modification of Second Embodiment

FIG. 15 is a diagram of drive waveforms corresponding to a first modification of the second embodiment. Descriptions of matters common to the first embodiment will be omitted. In the second embodiment, the standard selection operation Tdb is performed after the negative sign selection operation Tdm; however, the sequence of the operations is not limited thereto. As illustrated in FIG. 15, for example, the standard selection operation Tdb may be performed prior to the negative sign selection operation Tdm. The negative sign selection operation Tdm1 is the selection pattern Cpm1 by which all the detection electrodes Rx included in the detection electrode block RxB are caused to be uncoupled from the data line SGL. For this reason, the detection signal $Svm_1$ in the selection pattern Cpm1 can be regarded as zero. Consequently, as illustrated in FIG. 15, the negative sign selection operation Tdm1 is not necessarily performed.

As described above, the standard sign selection operation Tdb is performed in place of the negative sign selection operation Tdm1, whereby the detection signals Sid can be acquired by the detection operations Td of the same number of times as that of the first embodiment.

Second Modification of Second Embodiment

Figure 16:
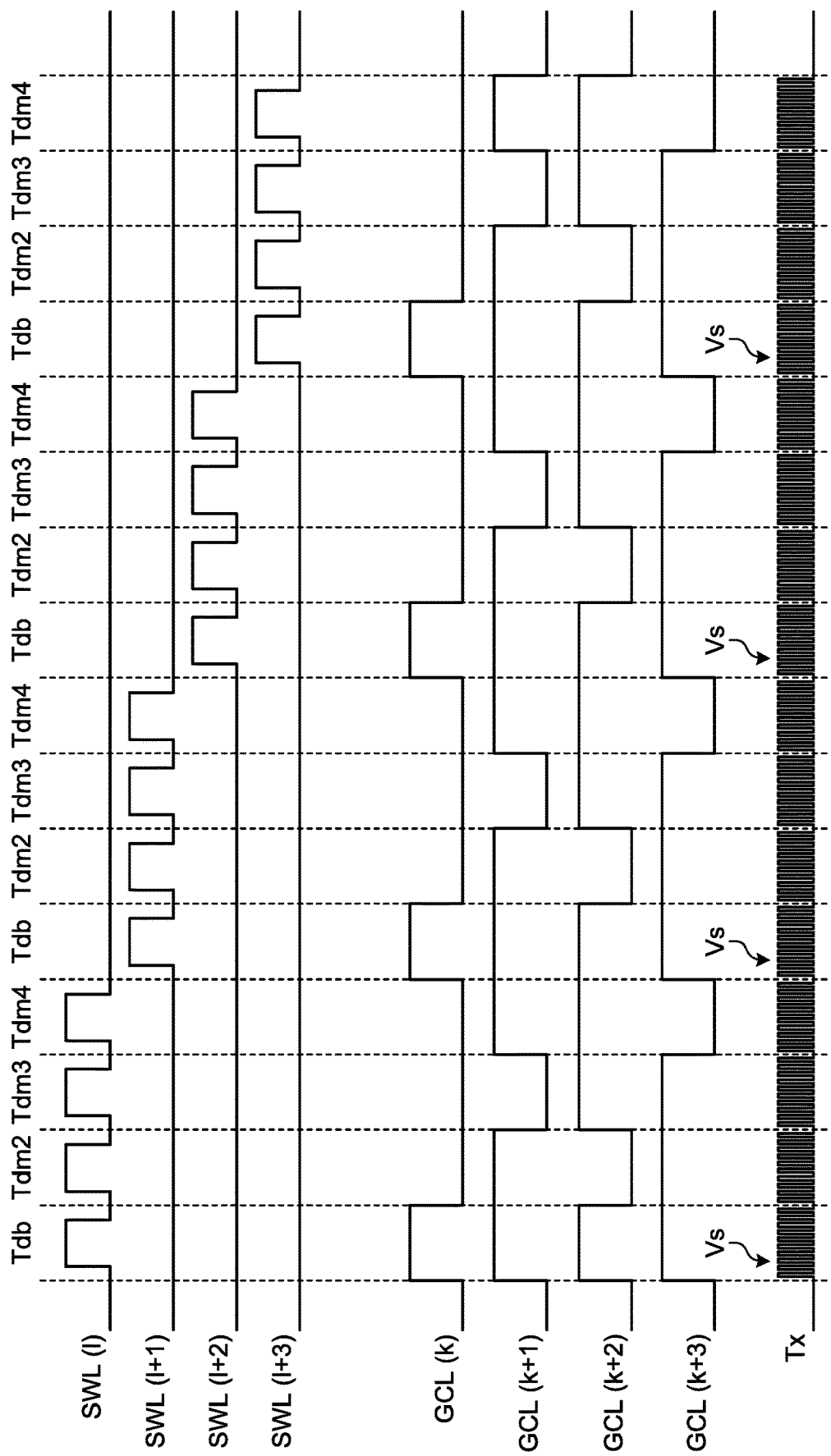
FIG. 16 is a diagram of drive waveforms corresponding to a second modification of the second embodiment.

Although the second embodiment describes a case in which each of the switch elements SW2 of the second selection circuit 15 is successively selected with the first selection circuit 14 coupled to the data line SGL in the same selection pattern Cpp for its respective detection electrode block RxB as illustrated in FIG. 13, the order of driving is not limited to this embodiment. FIG. 16 is a diagram of drive waveforms corresponding to a second modification of the second embodiment. Descriptions of matters common to the second embodiment will be omitted.

In the second modification of the second embodiment, with the switch element SW2(l) of the second selection circuit 15 coupled to the detection circuit 40 based on the selection signal Vsel from the second control circuit 115 to the switch control line SWL(l), the first control circuit 114 and the first selection circuit 14 successively perform the standard selection operation Tdb and the negative sign selection operations Tdm2, Tdm3, and Tdm4. Next, with the switch element SW2(l+1) of the second selection circuit 15 coupled to the detection circuit 40 based on the selection signal Vsel from the second control circuit 115 to the switch control line SWL(l+1), the first control circuit 114 and the first selection circuit 14 successively perform the standard selection operation Tdb and the negative sign selection operations Tdm2, Tdm3, and Tdm4. Similarly, with the switch element SW2(l+2) of the second selection circuit 15 coupled to the detection circuit 40, the first control circuit 114 and the first selection circuit 14 successively perform the standard selection operation Tdb and the negative sign selection operations Tdm2, Tdm3, and Tdm4; with the switch element SW2(l+3) of the second selection circuit 15 coupled to the detection circuit 40, the first control circuit 114 and the first selection circuit 14 successively perform the standard selection operation Tdb and the negative sign selection operations Tdm2, Tdm3, and Tdm4. In other words, after performing a detection operation similar to that illustrated in FIG. 14H, the detection apparatus 100 performs detection operations similar to those illustrated in FIG. 14E, FIG. 14F, and FIG. 14G, and then couples the switch element SW2(l+1) to the detection circuit 40 to perform the standard selection operation Tdb and then perform a detection operation similar to FIG. 14B.

As described in Expression (6) and Expression (5), to detect the detection signals Sc and the decoded detection signals Sid, it is necessary to obtain the detection signal Svb and all the detection signals Svm ($Svm_2$, $Svm_3$, $Svm_4$) except the detection signal $Svm_1$, which can be regarded as zero. According to the second modification of the second embodiment, after the detection signals $Svm_2$, $Svm_4$, and $Svm_4$ and the detection signal Svb of one detection electrode block RxB are obtained based on the negative sign detection operations Tdm2, Tdm3, and Tdm4 and the standard selection operation Tdb, the standard selection operation Tdb and the negative sign selection operations Tdm for the next detection electrode block RxB start. Consequently, without waiting for the completion of the standard selection operation Tdb and the negative sign selection operations Tdm by another detection electrode block RxB, when the standard selection operation Tdb and the negative sign selection operations Tdm necessary for one detection electrode block RxB are completed, the signal computing circuit 44 can perform the computation processing described in Expression (6) and Expression (5). Consequently, the signal computing circuit 44 can perform computation processing for a previous detection electrode block RxB in parallel with an operation of performing the standard selection operation Tdb and the negative sign selection operations Tdm for another detection electrode block RxB and acquiring the detection signals Svm and the detection signal Svb thereof; this can reduce a time until the output signal Vout is output.

After the computation processing described in Expression (6) and the computation processing described in Expression (5) are performed, it becomes unnecessary for the detection signals Svm and the detection signal Svb to be held in the storage circuit 48. This can reduce the amount of data that the storage circuit 48 is required to hold as compared with a case in which all the detection signals Svm and the detection signals Svb are held for all the detection electrode blocks RxB.

Third Embodiment

Although the first embodiment and the second embodiment describes a case in which only either the positive sign selection operation Tdp or the negative sign selection operation Tdm is performed, the operation to be performed is not limited thereto. The coupling circuit may have a first mode of performing either the first embodiment or the second embodiment and a second mode of performing both the positive sign selection operation Tdp and the negative sign selection operation Tdm. Descriptions common to the first embodiment and the second embodiment will be omitted.

In the second mode, the first control circuit 114 outputs the selection signal Vgclp and the selection signal Vgclm to the first selection circuit 14, and the first selection circuit 14 couples the detection electrodes Rx included in the detection electrode blocks RxB to the data lines SGL in accordance with both the selection patterns, or the selection pattern Cpp and the selection pattern Cpm. In accordance with a signal from the second control circuit 115, the second selection circuit couples the data lines SGL to the detection circuit 40. With this operation, the detection circuit 40 acquires the detection signals Svp ($Svp_1$, $Svp_2$, $Svp_3$, $Svp_4$) and the detection signals Svm ($Svm_1$, $Svm_2$, $Svm_3$, $Svm_4$). As described in Expression (7), the signal computing circuit 44 of the detection circuit 40 subtracts the detection signals Svm from the detection signals Svp to generate the detection signals Svc and decodes the detection signals Svc based on Expression (5) to generate the detection signals Sid.

In the second mode, both the positive sign selection operation Tdp and the negative sign selection operation Tdm are performed, which causes a detection period in the second mode to be longer than that in the first mode. However, in the second mode, the number of times of sampling increases, which reduces an S/N ratio. Thus, the detection circuit 40 may further have a noise detection circuit, calculate the amount of noise (e.g., the S/N ratio) of the detection signals Sid acquired in the first mode, and output, to the detection control circuit 11, a switching signal for switching from the first mode to the second mode when the amount of noise exceeds a certain threshold. With this operation, under environments in which noise is mixed into signals, the detection apparatus 100 can detect signals with low noise by the second mode; whereas, under environments in which noise is hard to be mixed into signals, the detection apparatus 100 can output a detection result at higher speed by the first mode.

Fourth Embodiment

The first embodiment and the second embodiment described an operation example when the sign selection operation was used for fingerprint detection in the Y direction (the second direction). In a fourth embodiment, the following describes an operation example when the sign selection driving is used for fingerprint detection in the X direction (the first direction) and the Y direction (the second direction). In this embodiment, in order to distinguish the detection electrode blocks RxB from second detection electrode blocks BKNB described later, the detection electrode blocks RxB are referred to as first detection electrode blocks RxB.

The following describes an example of a case in which positive sign selection operations Tdp are performed with reference to FIGS. 17A to 20D. FIGS. 17A to 17D are illustrative diagrams for illustrating an example of a selection pattern by the second selection circuit when detection electrodes are selected in accordance with a first selection pattern by the first selection circuit according to the fourth embodiment. FIGS. 18A to 18D are illustrative diagrams for illustrating an example of a selection pattern by the second selection circuit when detection electrodes are selected in accordance with a second selection pattern by the first selection circuit according to the fourth embodiment. FIGS. 19A to 19D are illustrative diagrams for illustrating an example of a selection pattern by the second selection circuit when detection electrodes are selected in accordance with a third selection pattern by the first selection circuit according to the fourth embodiment. FIGS. 20A to 20D are illustrative diagrams for illustrating an example of a selection pattern by the second selection circuit when detection electrodes are selected in accordance with a fourth selection pattern by the first selection circuit according to the fourth embodiment.

In the fourth embodiment, the second selection circuit 15 includes switch elements SW2a and switch elements SW2b. The detection circuit 40 includes a first detection circuit DET1 and a second detection circuit DET2. One end of one switch element SW2a and one end of one switch element SW2b are coupled to the same data line SGL, the other end of the switch element SW2a is coupled to the first detection circuit DET1, and the other end of the switch element SW2b is coupled to the second detection circuit DET2. The switch element SW2a and the switch element SW2b are coupled to the same switch control line SWL. When a first voltage is supplied to the switch control line SWL, the switch element SW2a couples the data line SGL to the first detection circuit DET1, whereas the switch element SW2b uncouples the data line SGL from the second detection circuit DET2. When a second voltage different from the first voltage is supplied to the switch control line SWL, the switch element SW2a uncouples the data line SGL from the first detection circuit DET1, whereas the switch element SW2b couples the data line SGL to the second detection circuit DET2. For example, the data line SGL(l) is coupled to both one end of a switch element SW2a(l) and one end of a switch element SW2b(l), the other end of the switch element SW2a(l) is coupled to the first detection circuit DET1, and the other end of the switch element SW2b(l) is coupled to the second detection circuit DET2.

The other end of each of the switch elements SW2a coupled to the detection electrodes Rx included in a corresponding one of the second detection electrode block BKNB is coupled to the first detection circuit DET1 via common wiring. For example, the other ends of switch elements SW2a(l), SW2a(l+1), SW2a(l+2), and SW2a(l+3) are coupled to the first detection circuit DET1 via the same common wiring. Further, the other end of each of the switch elements SW2b coupled to the detection electrodes Rx included in the second detection electrode block BKNB is coupled to the second detection circuit DET2 via common wiring. For example, the other ends of switch elements SW2b(l), SW2b(l+1), SW2b(l+2), and SW2b(l+3) are coupled to the second detection circuit DET2 via the same common wiring.

Figure 17A:
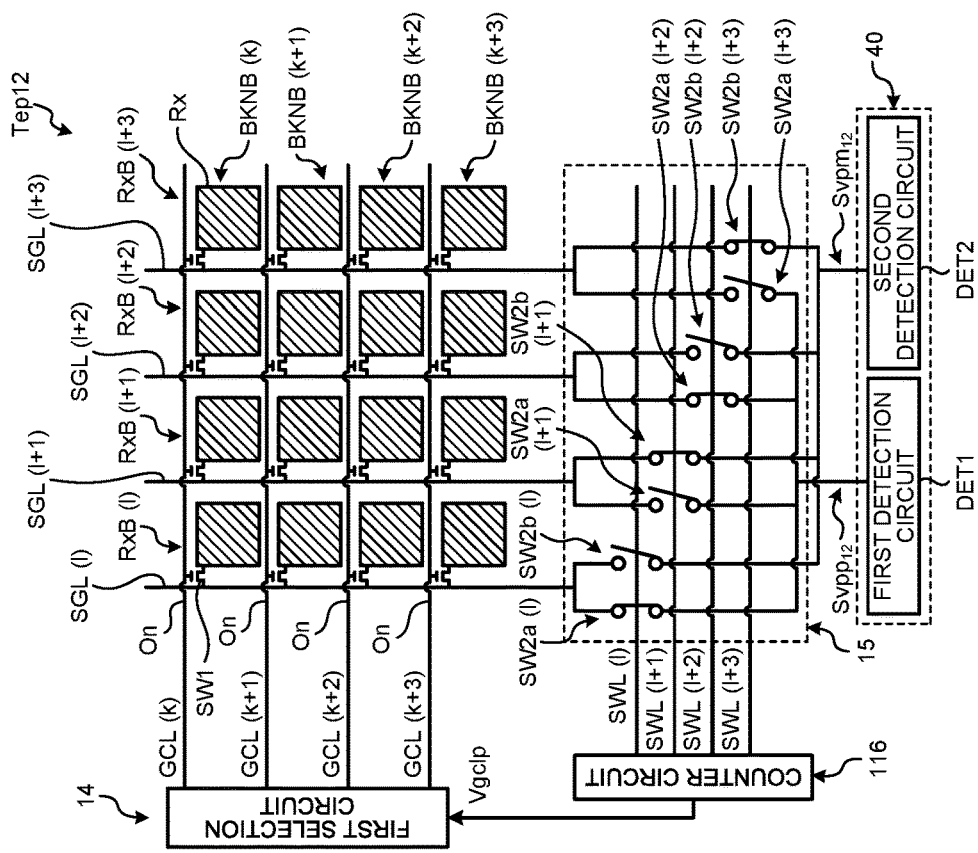
Figure 17B:
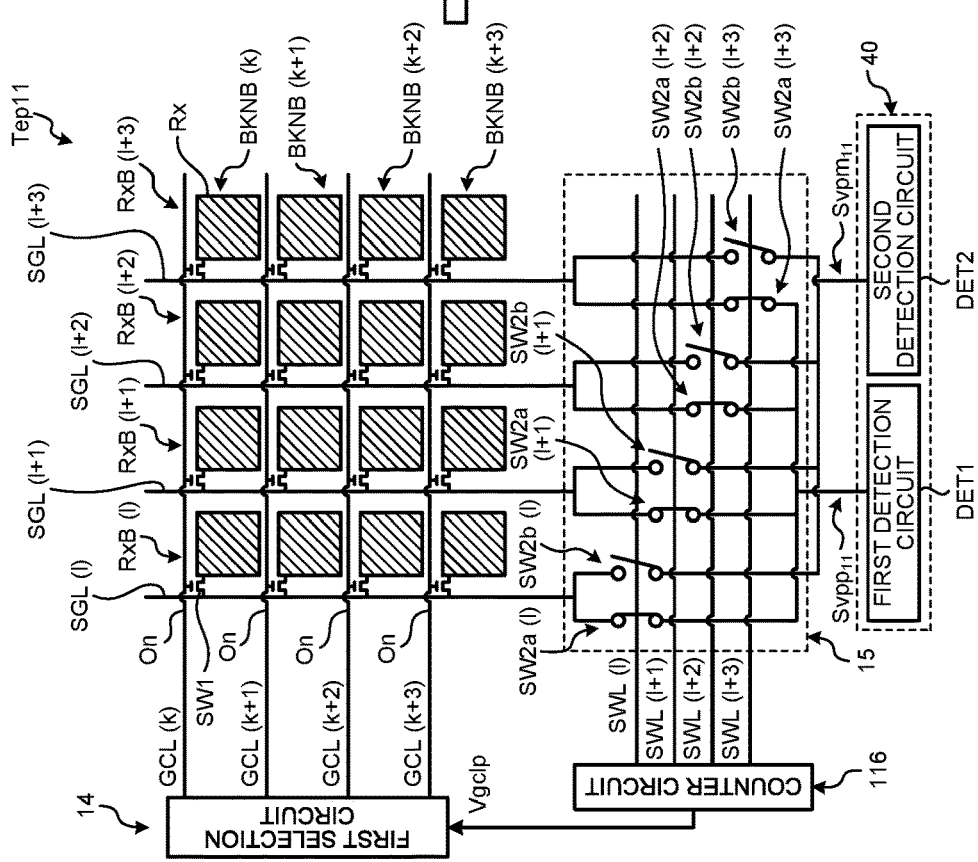
Figure 17C:
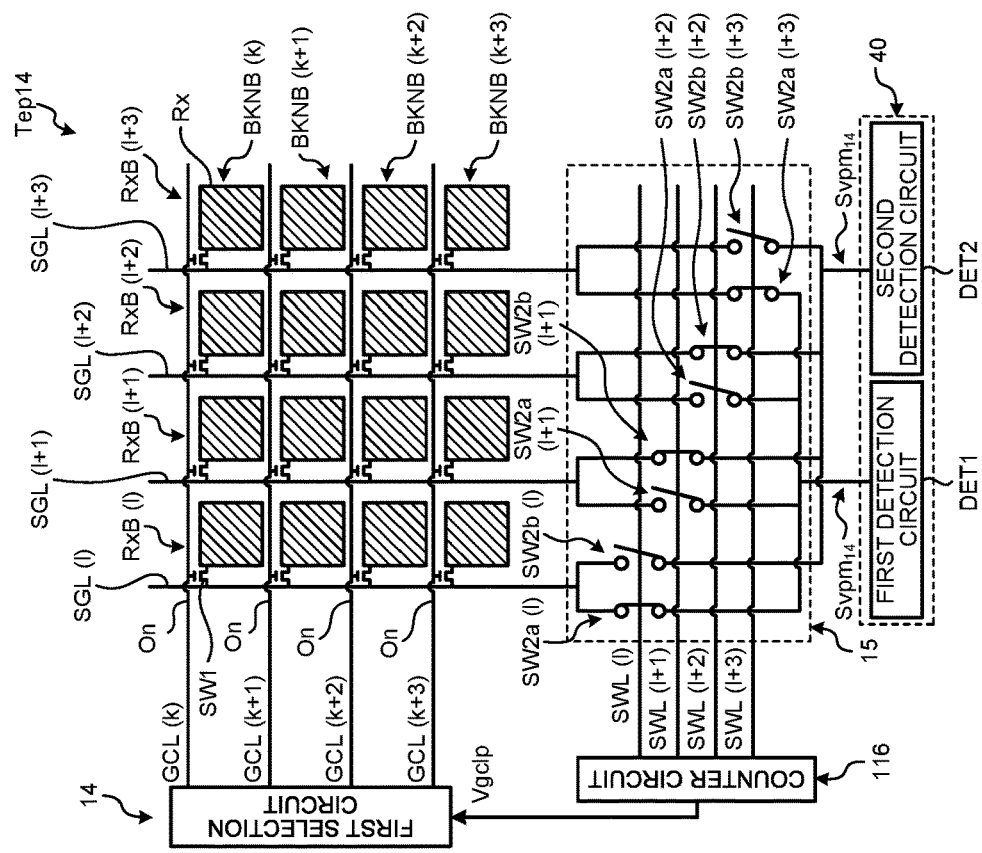
Figure 17D:
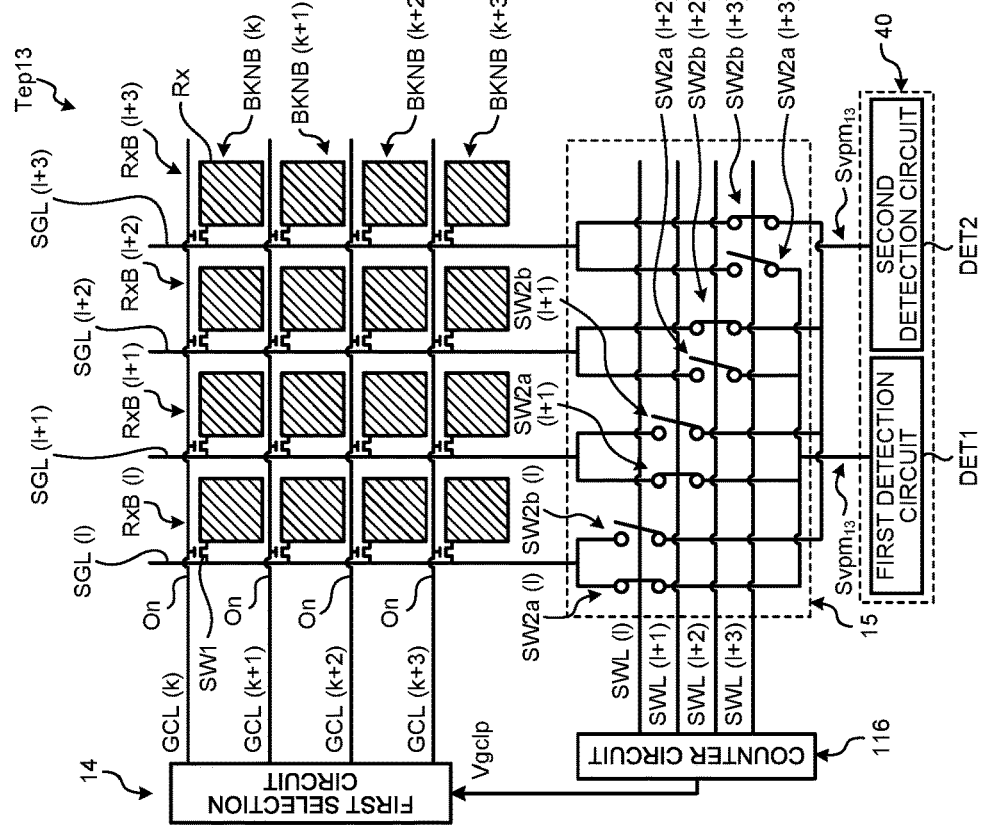

FIG. 17A illustrates a first detection operation according to the fourth embodiment, FIG. 17B illustrates a second detection operation according to the fourth embodiment, FIG. 17C illustrates a third detection operation according to the fourth embodiment, and FIG. 17D illustrates a fourth detection operation according to the fourth embodiment. As illustrated in FIG. 17A through FIG. 17D, in a first detection operation Tep11, a second detection operation Tep12, a third detection operation Tep13, and a fourth detection operation Tep14, the first selection circuit 14 performs the positive sign selection operation Tdp1 based on the selection signal Vgclp from the first control circuit 114. Specifically, in accordance with the elements "1" on the first row of the square matrix Hv described in Expression (2), the detection electrodes Rx belonging to second detection electrode blocks BKNB(k), BKNB(k+1), BKNB(k+2), and BKNB(k+3) are selected as the detection electrodes Rx as the first selection targets of the square matrix Hv.

The detection electrodes Rx of the second detection electrode block BKNB(k) is detection electrodes Rx coupled to the scan line GCL(k). The detection electrodes Rx of the second detection electrode block BKNB(k+1) is detection electrodes Rx coupled to the scan line GCL(k+1). The detection electrodes Rx of the second detection electrode block BKNB(k+2) is detection electrodes Rx coupled to the scan line GCL(k+2). The detection electrodes Rx of the second detection electrode block BKNB(k+3) is detection electrodes Rx coupled to the scan line GCL(k+3).

$$Hh = \begin{pmatrix} 1 & 1 & 1 & 1 \\ 1 & -1 & 1 & -1 \\ 1 & 1 & -1 & -1 \\ 1 & -1 & -1 & 1 \end{pmatrix} \quad (8)$$

As illustrated in FIG. 17A, the second selection circuit 15 simultaneously performs the positive sign selection operation Tdp and the negative sign selection operation Tdm in the X direction (the first direction). In the first detection operation Tep11, the second selection circuit 15 selects the detection electrodes Rx belonging to the first detection electrode blocks RxB(l), RxB(l+1), RxB(l+2), and RxB(l+3) as the detection electrodes Rx as the first selection targets of the square matrix Hh in accordance with the elements "1" on the first column of the square matrix Hh described in Expression (8), and the selected detection electrodes Rx are coupled to the first detection circuit DET1 via the second selection circuit 15. There are no elements "−1" on the first column of the square matrix Hh, and the detection electrodes Rx are not selected as the second selection targets of the square matrix Hh corresponding to the elements "−1."

The square matrix Hh of Expression (8) is an Hadamard matrix and is a square matrix in which "1" or "−1" are included as elements and any different two rows form an orthogonal matrix. The order t of the square matrix Hh is equal to or greater than the number u of the detection electrodes Rx included in the second detection electrode block BKNB(k). In the fourth embodiment, the order t of the square matrix Hh is 4, which is the same as the number u of the detection electrodes Rx included in the second detection electrode block BKNB.

A signal obtained by integrating the detection signals of the respective detection electrodes Rx is output to the first detection circuit DET1 as a detection signal $Svpp_{11}$. A detection signal $Svpm_{11}$ of the second detection circuit DET2 is 0 ($Svpm_{11}=0$). From the difference therebetween, the detection circuit 40 calculates a detection signal $Scp_{11}$ ($Scp_{11}=Svpp_{11}-Svpm_{11}$).

As illustrated in FIG. 17B, in the second detection operation Tep12, the second selection circuit 15 selects the detection electrodes Rx of the first detection electrode blocks RxB(l) and RxB(l+2) as the first selection targets of the square matrix Hh in accordance with the elements "1" on the second column of the square matrix Hh and selects the detection electrodes Rx of the first detection electrode blocks RxB(l+1) and RxB(l+3) as the second selection targets of the square matrix Hh in accordance with the elements "−1" on the second column of the square matrix Hh. In the second detection operation Tep12 illustrated in FIG. 17B, a detection signal $Scp_{12}$ ($Scp_{12}=Svpp_{12}-Svpm_{12}$) is calculated.

As illustrated in FIG. 17C, in the third detection operation Tep13, the second selection circuit 15 selects the detection electrodes Rx of the first detection electrode blocks RxB(l) and RxB(l+1) as the first selection targets of the square matrix Hh in accordance with the elements "1" on the third column of the square matrix Hh and selects the detection electrodes Rx of the first detection electrode blocks RxB(l+2) and RxB(l+3) as the second selection targets of the square matrix Hh in accordance with the elements "−1" on the third column of the square matrix Hh. In the third detection operation Tep13 illustrated in FIG. 17C, a detection signal $Scp_{13}$ ($Scp_{13}=Syp_{13}-Svpm_{13}$) is calculated.

As illustrated in FIG. 17D, in the fourth detection operation Tep14, the second selection circuit 15 selects the detection electrodes Rx of the first detection electrode blocks RxB(l) and RxB(l+3) as the first selection targets of the square matrix Hh in accordance with the elements "1" on the fourth column of the square matrix Hh and selects the detection electrodes Rx of the first detection electrode blocks RxB(l+1) and RxB(l+2) as the second selection targets of the square matrix Hh in accordance with the elements "−1" on the fourth column of the square matrix Hh. In the fourth detection operation Tep14 illustrated in FIG. 17D, a detection signal $Scp_{14}$ ($Scp_{14}=Svpp_{14}-Svpm_{14}$) is calculated.

Figure 18A:
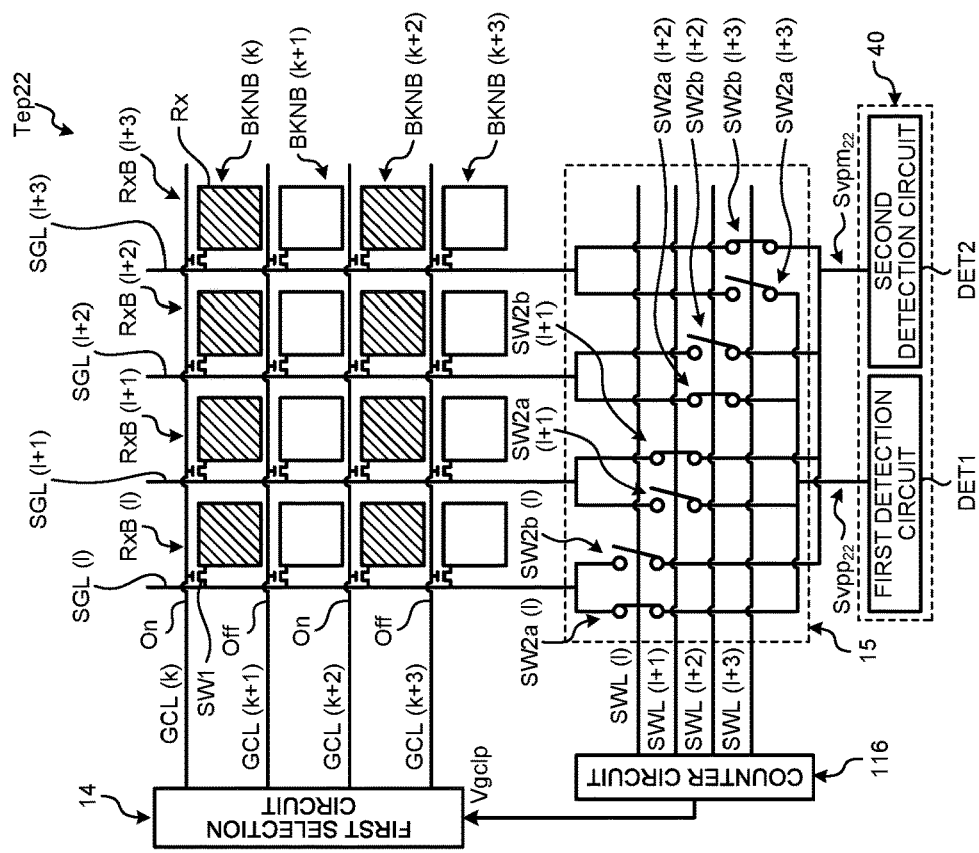
Figure 18B:
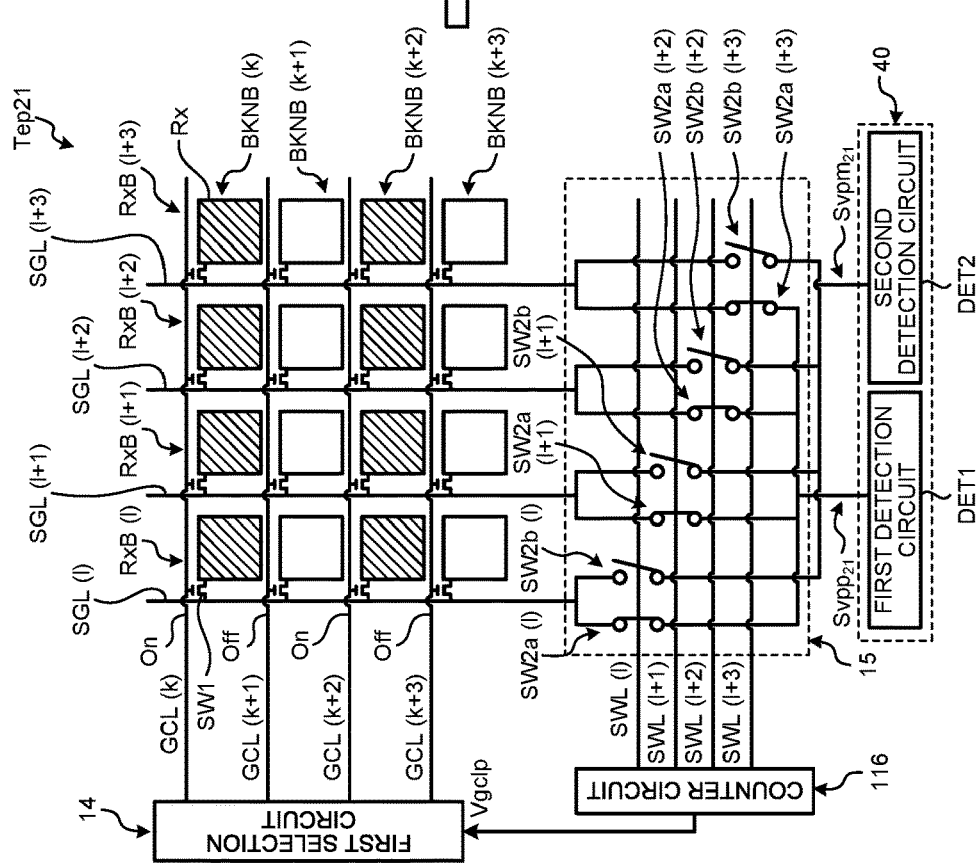

FIG. 18A illustrates a fifth detection operation according to the fourth embodiment, FIG. 18B illustrates a sixth detection operation according to the fourth embodiment, FIG. 18C illustrates a seventh detection operation according to the fourth embodiment, and FIG. 18D illustrates an eighth detection operation according to the fourth embodiment. As illustrated in FIG. 18A through FIG. 18D, in the fifth detection operation Tep21, the sixth detection operation Tep22, the seventh detection operation Tep23, and the eighth detection operation Tep24, the first selection circuit 14 performs the positive sign selection operation Tdp2 based on the selection signal Vgclp from the first control circuit 114. Specifically, in accordance with the elements "1" on the second row of the square matrix Hv described in Expression (2), the detection electrodes Rx belonging to the second detection electrode blocks BKNB(k) and BKNB(k+2) are selected as the detection electrodes Rx as the first selection targets, whereas the detection electrodes Rx belong to the second detection electrode blocks BKNB(k+1) and BKNB(k+3) are selected as the detection electrodes Rx as the second selection targets.

In the fifth detection operation Tep21 illustrated in FIG. 18A, the second selection circuit 15 selects the detection electrodes Rx belonging to the first detection electrode blocks RxB(l), RxB(l+1), RxB(l+2), and RxB(l+3) as the detection electrodes Rx as the first selection targets of the square matrix Hh in accordance with the elements "1" on the first column of the square matrix Hh. In the fifth detection operation Tep21 illustrated in FIG. 18A, a detection signal $Scp_{21}$ ($Scp_{21}=Svpp_{21}-Svpm_{21}$) is calculated.

In the sixth detection operation Tep22 illustrated in FIG. 18B, the second selection circuit 15 selects the detection electrodes Rx of the first detection electrode blocks RxB(l) and RxB(l+2) as the first selection targets of the square matrix Hh in accordance with the elements "1" on the second column of the square matrix Hh and selects the detection electrodes Rx of the first detection electrode blocks RxB(l+1) and RxB(l+3) as the second selection targets of the square matrix Hh in accordance with the elements "−1" on the second column of the square matrix Hh. In the sixth detection operation Tep22 illustrated in FIG. 18B, a detection signal $Scp_{22}$ ($Sc_{22}=Svpp_{22}-Svpm_{21}$) is calculated.

In the seventh detection operation Tep23 illustrated in FIG. 18C, the second selection circuit 15 selects the detection electrodes Rx of the first detection electrode blocks RxB(l) and RxB(l+1) as the first selection targets of the square matrix Hh in accordance with the elements "1" on the third column of the square matrix Hh and selects the detection electrodes Rx of the first detection electrode blocks RxB(l+2) and RxB(l+3) as the second selection targets of the square matrix Hh in accordance with the elements "−1" on the third column of the square matrix Hh. In the seventh detection operation Tep23 illustrated in FIG. 18C, a detection signal $Scp_{23}$ ($Scp_{23}=Svpp_{23}-Svpm_{23}$) is calculated.

In the eighth detection operation Tep24 illustrated in FIG. 18D, the second selection circuit 15 selects the detection electrodes Rx of the first detection electrode blocks RxB(l) and RxB(l+3) as the first selection targets of the square matrix Hh in accordance with the elements "1" on the fourth column of the square matrix Hh and selects the detection electrodes Rx of the first detection electrode blocks RxB(l+1) and RxB(l+2) as the second selection targets of the square matrix Hh in accordance with the elements "−1" on the fourth column of the square matrix Hh. In the eighth detection operation Tep24 illustrated in FIG. 18D, a detection signal $Scp_{24}$ ($Scp_{24}=Svpp_{24}-Svpm_{24}$) is calculated.

Figure 19A:
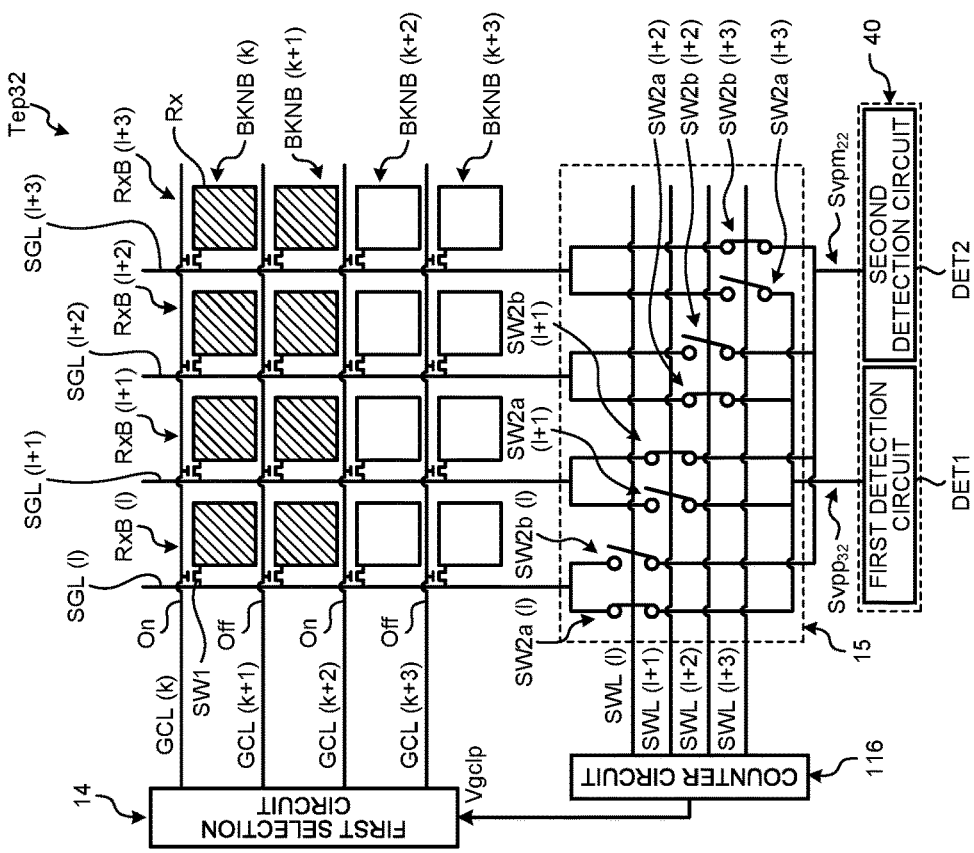
FIGS. 19A to 19D are illustrative diagrams for illustrating an example of a selection pattern by the second selection circuit when detection electrodes are selected by the first selection circuit according to the fourth embodiment in accordance with a third selection pattern.
Figure 19B:
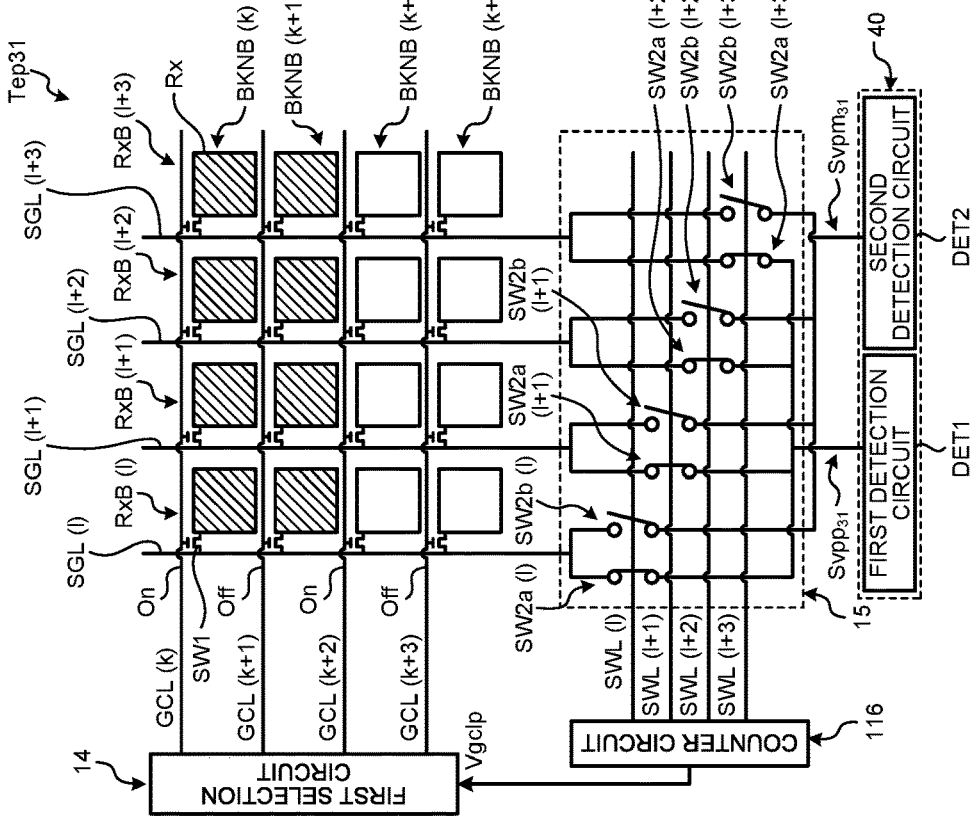
Figure 19C:
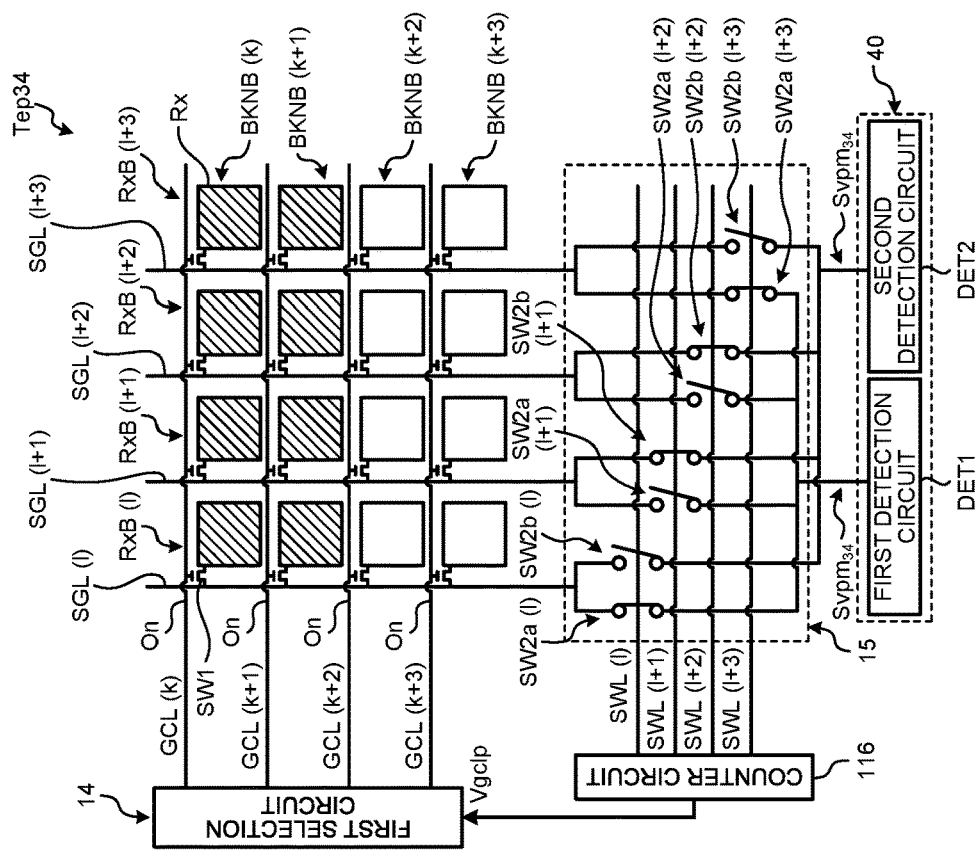
Figure 19D:
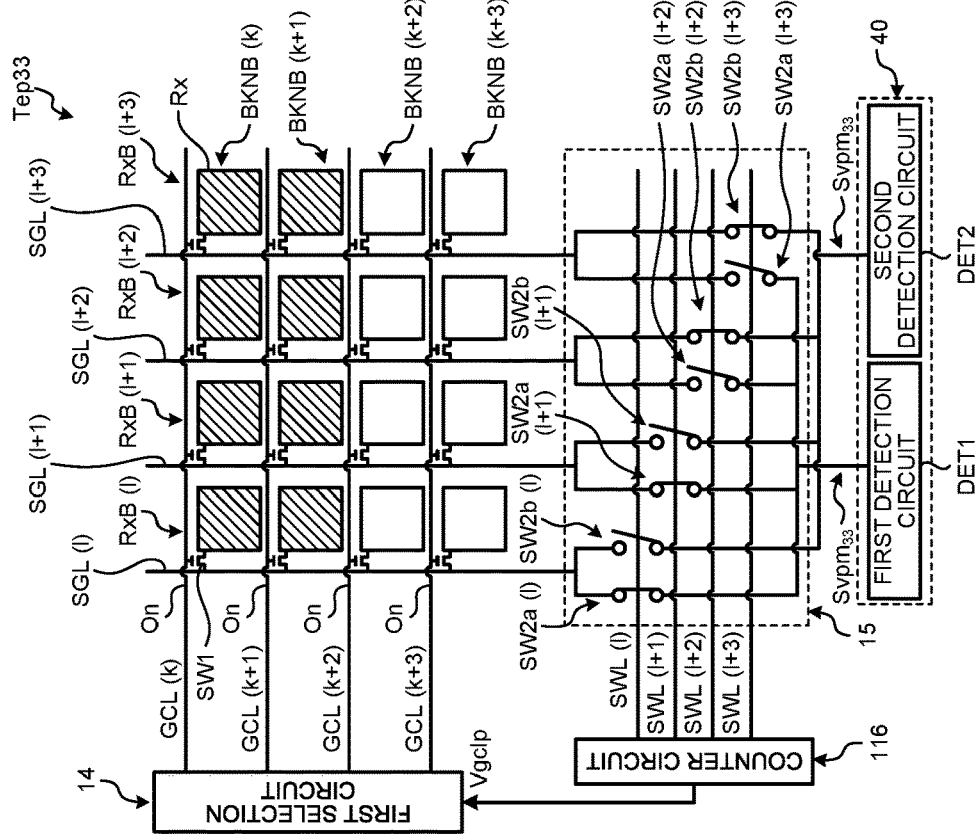

FIG. 19A illustrates a ninth detection operation according to the fourth embodiment, FIG. 19B illustrates a 10th detection operation according to the fourth embodiment, FIG. 19C illustrates an 11th detection operation according to the fourth embodiment, and FIG. 19D illustrates a 12th detection operation according to the fourth embodiment. As illustrated in FIG. 19A through FIG. 19D, in the ninth detection operation Tep31, the 10th detection operation Tep32, the 11th detection operation Tep33, and the 12th detection operation Tep34, the first selection circuit 14 performs the positive sign selection operation Tdp3 based on the selection signal Vgclp from the first control circuit 114. Specifically, the detection electrodes Rx belonging to the second detection electrode blocks BKNB(k) and BKNB(k+1) are selected as the detection electrodes Rx as the first selection targets in accordance with the elements "1" on the third row of the square matrix Hv described in Expression (2), whereas the detection electrodes Rx belonging to the second detection electrode blocks BKNB(k+2) and BKNB(k+3) are selected as the detection electrodes Rx as the second selection targets.

In the ninth detection operation Tep31 illustrated in FIG. 19A, the second selection circuit 15 selects the detection electrodes Rx belonging to the first detection electrode blocks RxB(l), RxB(l+1), RxB(l+2), and RxB(l+3) as the detection electrodes Rx as the first selection targets of the square matrix Hh in accordance with the elements "1" on the first column of the square matrix Hh. In the ninth detection operation Tep31 illustrated in FIG. 19A, a detection signal $Scp_{31}$ ($Scp_{31}=Svpp_{31}-Svpm_{31}$) is calculated.

In the 10th detection operation Tep32 illustrated in FIG. 19B, the second selection circuit 15 selects the detection electrodes Rx of the first detection electrode blocks RxB(l) and RxB(l+2) as the first selection targets of the square matrix Hh in accordance with the elements "1" on the second column of the square matrix Hh and selects the detection electrodes Rx of the first detection electrode blocks RxB(l+1) and RxB(l+3) as the second selection targets of the square matrix Hh in accordance with the elements "−1" on the second column of the square matrix Hh. In the 10th detection operation Tep32 illustrated in FIG. 19B, a detection signal $Scp_{32}$ ($Scp_{32}=Svpp_{32}-Svpm_{32}$) is calculated.

In the 11th detection operation Tep33 illustrated in FIG. 19C, the second selection circuit 15 selects the detection electrodes Rx of the first detection electrode blocks RxB(l) and RxB(l+1) as the first selection targets of the square matrix Hh in accordance with the elements "1" on the third column of the square matrix Hh and selects the detection electrodes Rx of the first detection electrode blocks RxB(l+2) and RxB(l+3) as the second selection targets of the square matrix Hh in accordance with the elements "−1" on the third column of the square matrix Hh. In the 11th detection operation Tep33 illustrated in FIG. 19C, a detection signal $Scp_{33}$ ($Scp_{33}=Svpp_{33}-Svpm_{33}$) is calculated.

In the 12th detection operation Tep34 illustrated in FIG. 19D, the second selection circuit 15 selects the detection electrodes Rx of the first detection electrode blocks RxB(l) and RxB(l+3) as the first selection targets of the square matrix Hh in accordance with the elements "1" on the fourth column of the square matrix Hh and selects the detection electrodes Rx of the first detection electrode blocks RxB(l+1) and RxB(l+2) as the second selection targets of the square matrix Hh in accordance with the elements "−1" on the fourth column of the square matrix Hh. In the 12th detection operation Tep34 illustrated in FIG. 19D, a detection signal $Scp_{34}$ ($Scp_{34}=Svpp_{34}-Svpm_{34}$) is calculated.

Figure 20A:
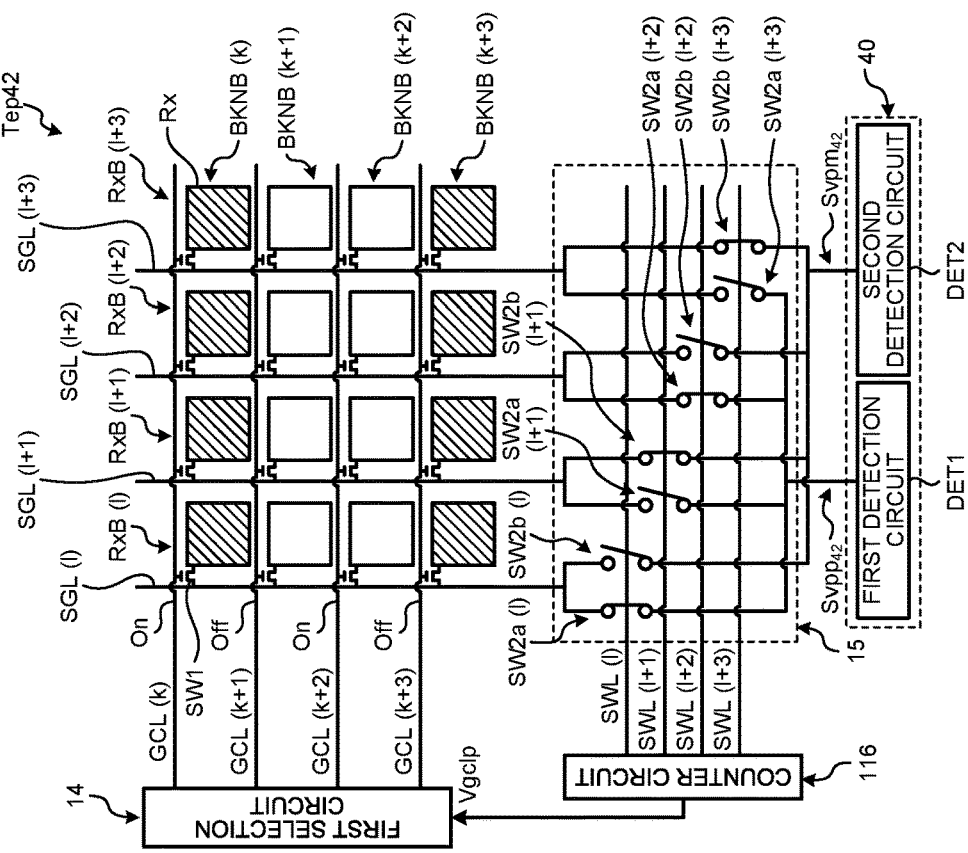
FIGS. 20A to 20D are illustrative diagrams for illustrating an example of a selection pattern by the second selection circuit when detection electrodes are selected by the first selection circuit according to the fourth embodiment in accordance with a fourth selection pattern.
Figure 20B:
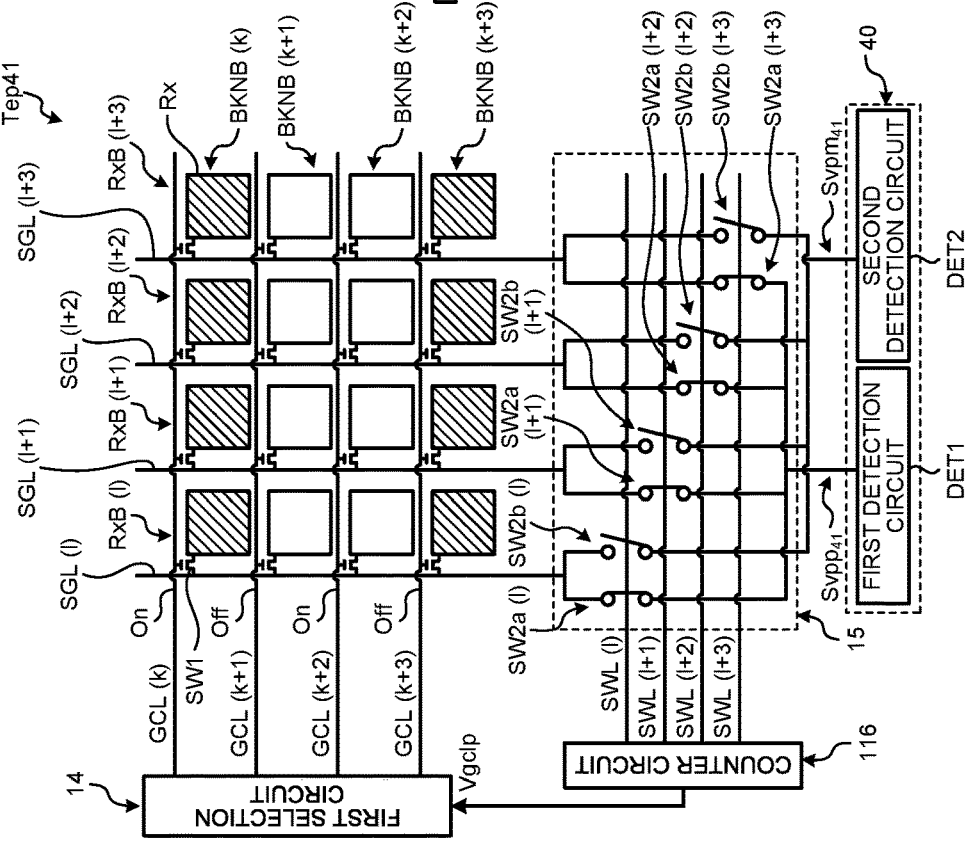
Figure 20C:
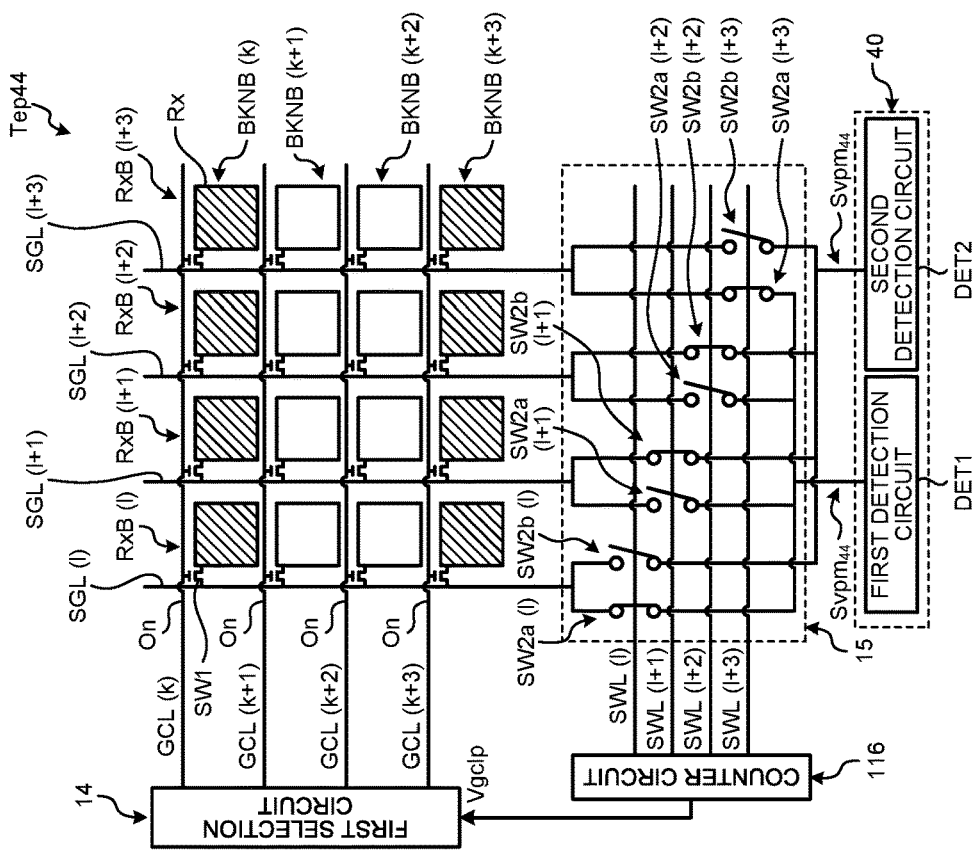
Figure 20D:
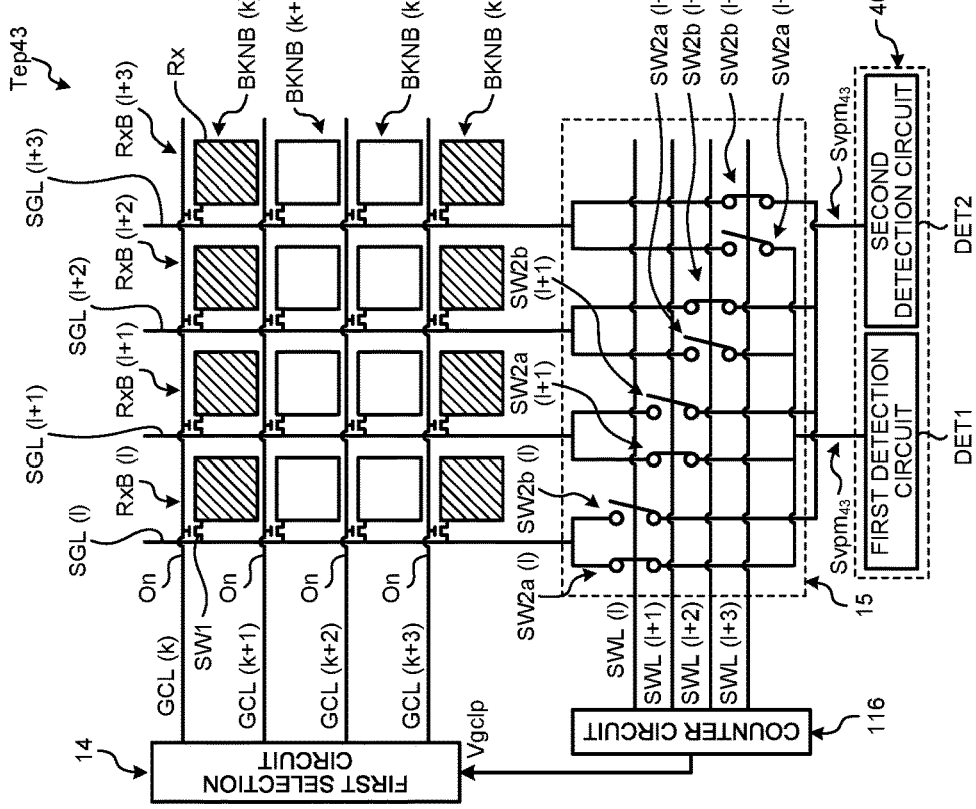

FIG. 20A illustrates a 13th detection operation according to the fourth embodiment, FIG. 20B illustrates a 14th detection operation according to the fourth embodiment, FIG. 20C illustrates a 15th detection operation according to the fourth embodiment, and FIG. 20D illustrates a 16th detection operation according to the fourth embodiment. As illustrated in FIG. 20A through FIG. 20D, in the 13th detection operation Tep41, the 14th detection operation Tep42, the 15th detection operation Tep43, and the 16th detection operation Tep44, the first selection circuit 14 performs the positive sign selection operation Tdp4 based on the selection signal Vgclp from the first control circuit 114. Specifically, the detection electrodes Rx belonging to the second detection electrode blocks BKNB(k) and BKNB(k+3) are selected as the detection electrodes Rx as the first selection targets in accordance with the elements "1" on the fourth row of the square matrix Hv described in Expression (2), whereas the detection electrodes Rx belonging to the second detection electrode blocks BKNB(k+1) and BKNB(k+2) are selected as the detection electrodes Rx as the second selection targets.

In the 13th detection operation Tep41 illustrated in FIG. 20A, the second selection circuit 15 selects the detection electrodes Rx belonging to the first detection electrode blocks RxB(l), RxB(l+1), RxB(l+2), and RxB(l+3) as the detection electrodes Rx as the first selection targets of the square matrix Hh in accordance with the elements "1" on the first column of the square matrix Hh. In the 13th detection operation Tep41 illustrated in FIG. 20A, a detection signal $Scp_{41}$ ($Scp_{41}=Svpp_{41}-Svpm_{41}$) is calculated.

In the 14th detection operation Tep42 illustrated in FIG. 20B, the second selection circuit 15 selects the detection electrodes Rx of the first detection electrode blocks RxB(l) and RxB(l+2) as the first selection targets of the square matrix Hh in accordance with the elements "1" on the second column of the square matrix Hh and selects the detection electrodes Rx of the first detection electrode blocks RxB(l+1) and RxB(l+3) as the second selection targets of the square matrix Hh in accordance with the elements "−1" on the second column of the square matrix Hh. In the 14th detection operation Tep42 illustrated in FIG. 20B, a detection signal $Scp_{42}$ ($Scp_{42}=Svpp_{42}-Svpm_{42}$) is calculated.

In the 15th detection operation Tep43 illustrated in FIG. 20C, the second selection circuit 15 selects the detection electrodes Rx of the first detection electrode blocks RxB(l) and RxB(l+1) as the first selection targets of the square matrix Hh in accordance with the elements "1" on the third column of the square matrix Hh and selects the detection electrodes Rx of the first detection electrode blocks RxB(l+2) and RxB(l+3) as the second selection targets of the square matrix Hh in accordance with the elements "−1" on the third column of the square matrix Hh. In the 15th detection operation Tep43 illustrated in FIG. 20C, a detection signal $Scp_{43}$ ($Scp_{43}=Svpp_{43}-Svpm_{43}$) is calculated.

In the 16th detection operation Tep44 illustrated in FIG. 20D, the second selection circuit 15 selects the detection electrodes Rx of the first detection electrode blocks RxB(l) and RxB(l+3) as the first selection targets of the square matrix Hh in accordance with the elements "1" on the fourth column of the square matrix Hh and selects the detection electrodes Rx of the first detection electrode blocks RxB(l+1) and RxB(l+2) as the second selection targets of the square matrix Hh in accordance with the elements "−1" on the fourth column of the square matrix Hh. In the 16th detection operation Tep44 illustrated in FIG. 20D, a detection signal $Scp_{44}$ ($Scp_{44}=Svpp_{44}-Svpm_{44}$) is calculated.

As described above, the signal computing circuit 44 calculates the data of the 16 detection signals Scp by the first detection operation through the 16th detection operation. The data of the detection signals Scp are stored in the storage circuit 48. When a matrix $Si_{nu}$ X consisting of the detection signals Si of the respective detection electrodes Rx included in the n first detection electrode blocks RxB and the u second detection electrode blocks BKNB is assumed, the sign selection driving with the square matrix Hv is performed for the column direction, and the sign selection driving with the square matrix Hh is performed for the row direction, a matrix ScX consisting of the detection signals Sc described in Expression (9) can be obtained. The signal computing circuit 44 receives the data of the detection signals Scp from the storage circuit 48 and performs decoding processing based on Expression (10) to obtain values obtained by multiplying the detection signals Svp by the order t of the square matrix Hh. From the detection signals $Scp_{11}$, $Scp_{12}$, $Scp_{13}$, and $Scp_{14}$, four detection signals $Svp_1\times t : Svp_{11}\times t$, $Svp_{12}\times t$, $Svp_{13}\times t$, and $Svp_{14}\times t$, are generated, for example. The detection signal $Svp_{11}$ corresponds to the detection signal $Svp_1$ of the data line SGL(l). The detection signal $Svp_{12}$ corresponds to the detection signal $Svp_1$ of the data line SGL(l+1). The detection signal $Svp_{13}$ corresponds to the detection signal $Svp_1$ of the data line SGL(l+2). The detection signal $Svp_{14}$ corresponds to the detection signal $Svp_1$ of the data line SGL(l+3). Similarly, the signal computing circuit 44 generates four $Svp_2\times d$, four $Svp_3\times d$, and four $Svp_4\times d$. In other words, the signal computing circuit 44 generates four detection signals Svp×t: $Svp_1\times t$, $Svp_2\times t$, $Svp_3\times t$, and $Svp_4\times t$, corresponding to the respective data lines SGL. For example, the signal computing circuit 44 generates detection signals $Svp_{11}\times t$, $Svp_{21}\times t$, $Svp_{31}\times t$, and $Svp_{41}\times t$ corresponding to the data line SGL(l).

$$ScX = Hv \times Si_{nu} X \times Hh \qquad (9)$$

$$Svp \times t = Scp X \times Hh \qquad (10)$$

Further, the signal computing circuit 44 generates detection signals Sc×t based on Expression (11) in a manner similar to Expression (4). More specifically, the detection signals Svp×t corresponding to the respective data lines SGL are doubled, and the detection signals $Svp_1\times t$ are subtracted therefrom to acquire detection signals Sc×t. Based on the detection signals $Svp_{11}\times t$, $Svp_{21}\times t$, $Svp_{31}\times t$, and $Svp_{41}\times t$ corresponding to the data line SGL(l), four detection signals $Sc_{11}\times t$, $Sc_{21}\times t$, $Sc_{31}\times t$, and $Sc_{41}\times t$ are acquired, for example. The detection signal $Sc_{11}\times t$ corresponds to the detection signal $Svp_{11}\times t$. The detection signal $Sc_{21}\times t$ corresponds to a value obtained by doubling the detection signal $Svp_{21}\times t$ and subtracting the detection signal $Svp_{11}\times t$ therefrom. The detection signal $Sc_{31}\times t$ corresponds to a value obtained by doubling the detection signal $Svp_{31}\times t$ and subtracting the detection signal $Svp_{11}\times t$ therefrom. The detection signal $Sc_{41}\times t$ corresponds to a value obtained by doubling the detection signal $Svp_{41}\times t$ and subtracting the detection signal $Svp_{11}\times t$ therefrom.

$$Sc \times t = (2Svp - Svp_1) \times t \qquad (11)$$

Further, the signal computing circuit 44 decodes detection signals Si×t×d from the detection signals Sc×t based on Expression (12) in a manner similar to Expression (5). The d corresponds to the order d of the square matrix Hv.

$$Si \times t \times d = Hv \times Sc \times t \qquad (12)$$

Consequently, the signal computing circuit 44 can obtain a signal of a value obtained by increasing one detection signal Si (t×d)-fold. Specifically, both t and d are 4, and the detection signal Si increased 16-fold can be obtained. The coordinates extraction circuit 45 can calculate the two-dimensional coordinates of the finger Fin or the like being in contact or proximity based on the decoded signal Sid. In the fourth embodiment as well, by performing decoding processing based on the detection signals Scp obtained by integrating the detection signals Si of the respective detection electrodes Rx, the signal intensity can be obtained 16 times as great as that obtained in time-division selection driving, without increasing the voltage of the signal value of each node.

First Modification of Fourth Embodiment

Although the fourth embodiment exemplifies a case in which the first selection circuit 14 performs the positive sign selection operation Tdp, whereas the second selection circuit 15 performs the positive sign selection operation Tdp and the negative sign selection operation Tdm, the operations to be performed are not limited thereto. For example, the second selection circuit 15 may perform the negative sign selection operation Tdm as in the second modification of the second embodiment or perform both the positive sign selection operation Tdp and the negative sign selection operation Tdm as in the third embodiment. The second selection circuit 15 may have only either the first detection circuit DET1 or the second detection circuit DET2 and perform only either the positive sign selection operation Tdp or the negative sign selection operation Tdm as in the first embodiment and the second embodiment.

Fifth Embodiment

The specific configuration of the detection apparatus is not limited to the modes with reference to FIG. 1 to FIG. 4 and FIG. 8.

Figure 21:
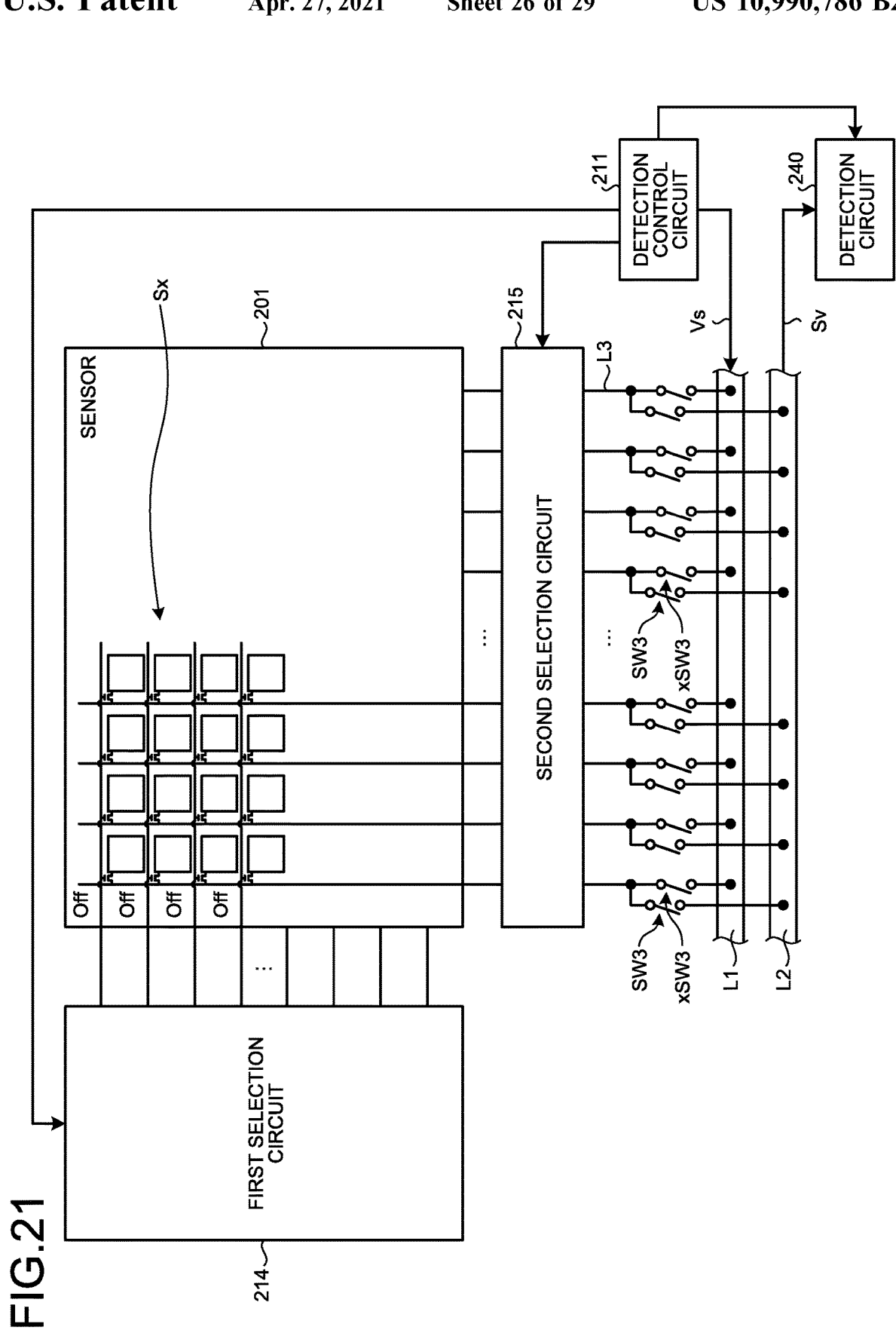
FIG. 21 is a diagram of a configuration example of the detection apparatus according to a fifth embodiment.

FIG. 21 is a diagram of a configuration example of the detection apparatus according to a fifth embodiment. In a sensor 201 illustrated in FIG. 21, the detection electrode Tx and the conductor 26 are removed; and detection electrodes Sx are arranged in a matrix, or row-column configuration, in the same manner as the detection electrodes Rx, and are coupled to the scan lines GCL and the data lines SGL via the switch elements SW1. A first selection circuit 214 has a function similar to that of the first selection circuit 14. A second selection circuit 215 has a function similar to that of the second selection circuit 15. A detection control circuit 211 has a function similar to that of the detection control circuit 11.

In the configuration illustrated in FIG. 21, wiring L3, a plurality of switch elements SW3, and wiring L2 are provided between the second selection circuit 215 and a detection circuit 240. The configuration illustrated in FIG. 21 is a configuration in which a mode in which the detection control circuit 211 supplies the drive signal Vs to the detection electrodes Sx via wiring L1 and a plurality of switch elements xSW3 is employed. That is to say, in the configuration illustrated in FIG. 21, the drive signal generation circuit 112 included in the detection control circuit 211 is coupled to the detection electrodes Sx provided in the sensor 201 to provide the drive signal Vs thereto.

The supply of the drive signal Vs and the output of the detection signal Vs can be switched by the switch elements SW3 and xSW3, for example. When the switch elements SW3 are off (a non-coupled state), the switch elements xSW3 are on (a coupled state), and the drive signal Vs is supplied to each of the detection electrodes Sx as selection targets via the wiring L1 and the wiring L3 and via the second selection circuit 215 and the data lines SGL. When the switch elements SW3 are on (a coupled state), the switch elements xSW3 are off (a non-coupled state), and the detection signals Sv from the detection electrodes Sx as selection targets are output to the detection circuit 240 via the wiring L2 and the wiring L3. That is to say, the detection electrodes Sx in the fifth embodiment are electrodes serving as both the detection electrodes Rx and the detection electrode Tx (the drive electrode) in the first embodiment.

The functions of the switch elements SW3 and xSW3 and the wiring L1, L2, and L3 may be included in the second selection circuit 215 or a circuit provided separately from the second selection circuit 215. The detection control circuit 211 may include the function of the drive signal generation circuit 112. The switch elements SW3 and xSW3 and the wiring L1, L2, and L3 are provided on the base member 101, for example.

Sixth Embodiment

Figure 22:
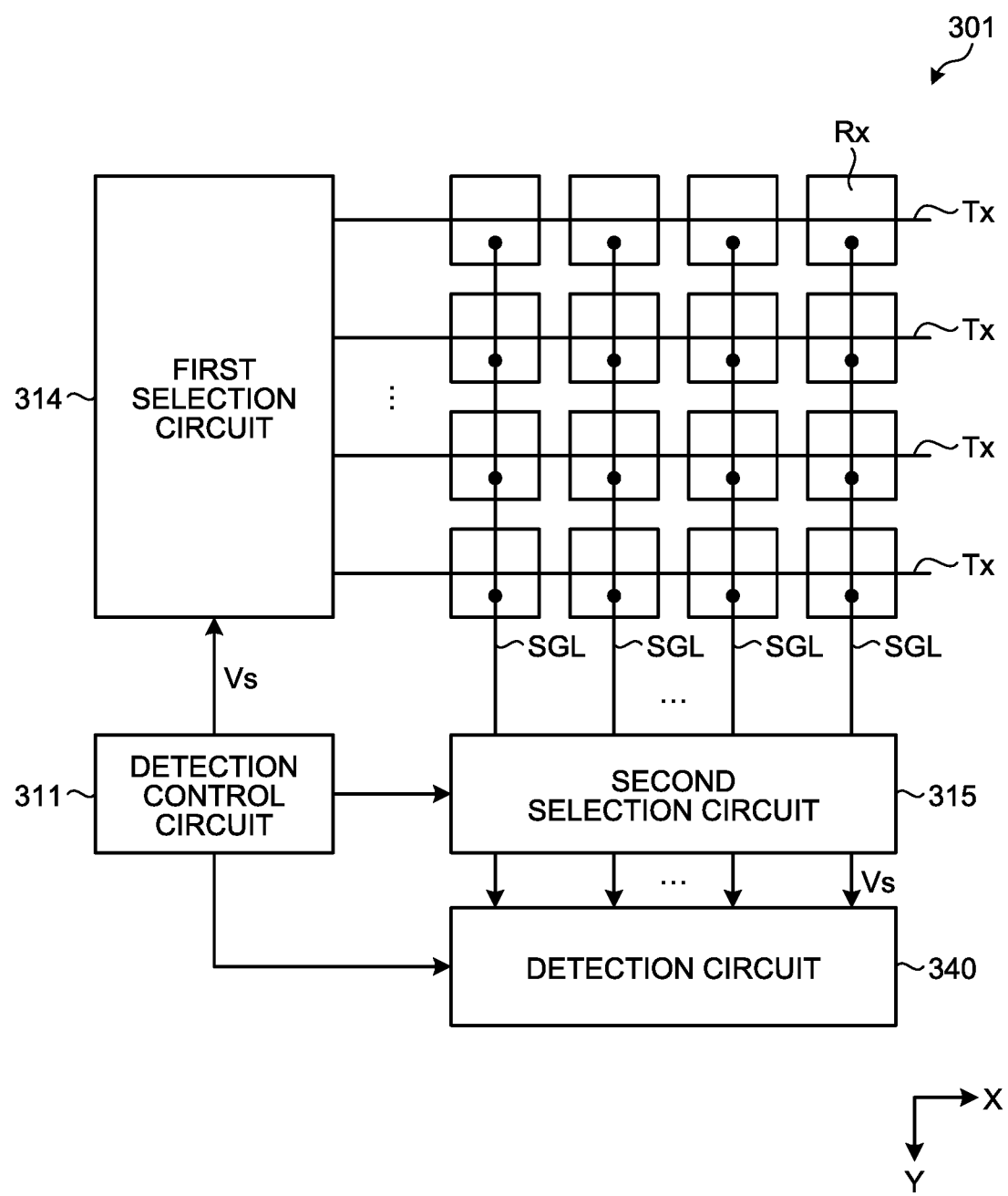
FIG. 22 is a diagram of a configuration example of the detection apparatus according to a sixth embodiment.

FIG. 22 is a diagram of a configuration example of the detection apparatus according to a sixth embodiment. A sensor 301 is arranged such that detection electrodes Tx (drive electrodes) face a plurality of detection electrodes Rx in a noncontact manner. The drive signal generation circuit 112 of a detection control circuit 311 is coupled to the detection electrodes Tx via a first selection circuit 314 to supply the drive signal Vs to the detection electrodes Tx. The sensor 301 does not have any switch elements SW1 coupled to the detection electrodes Tx in the detection area DA, and the detection electrodes Tx and the first selection circuit 314 are coupled to each other in the peripheral area PA. The detection electrodes Rx are coupled to the data lines SGL not through the switch elements SW1.

When the drive signal Vs is supplied to the detection electrodes Tx, the proximity to the detection electrode Rx by an object to be detected such as the finger Fin has an influence on mutual capacitance occurring between the detection electrode Rx and the detection electrode Tx. The configuration illustrated in FIG. 22 performs detection based on the presence or absence of a change in the mutual capacitance appearing in the drive signal Vs and the degree of the change. In the configuration illustrated in FIG. 22, a plurality of detection electrodes Tx provided such that the longitudinal direction thereof is along the X direction so as to be able to simultaneously drive the detection electrodes Rx arranged in the X direction, are arranged in accordance with the arrangement of the detection electrodes Rx in the Y direction. However, this is an example of the configuration of the detection electrodes Tx, and the detection electrodes Tx are not limited thereto. The shape and arrangement of the detection electrodes Tx can be changed as appropriate.

In the configuration illustrated in FIG. 22, the data lines SGL couple a second selection circuit 315 and the detection electrodes Rx to each other. In the configuration illustrated in FIG. 22, the first selection circuit 314 selects the detection electrodes Rx arranged in the Y direction by selecting the detection electrode Tx to which the drive signal Vs is supplied. With regard to other points, the functions of the second selection circuit 315 and a detection circuit 340 are similar to those of the second selection circuit 15 and the detection circuit 40.

Seventh Embodiment

Figure 23:
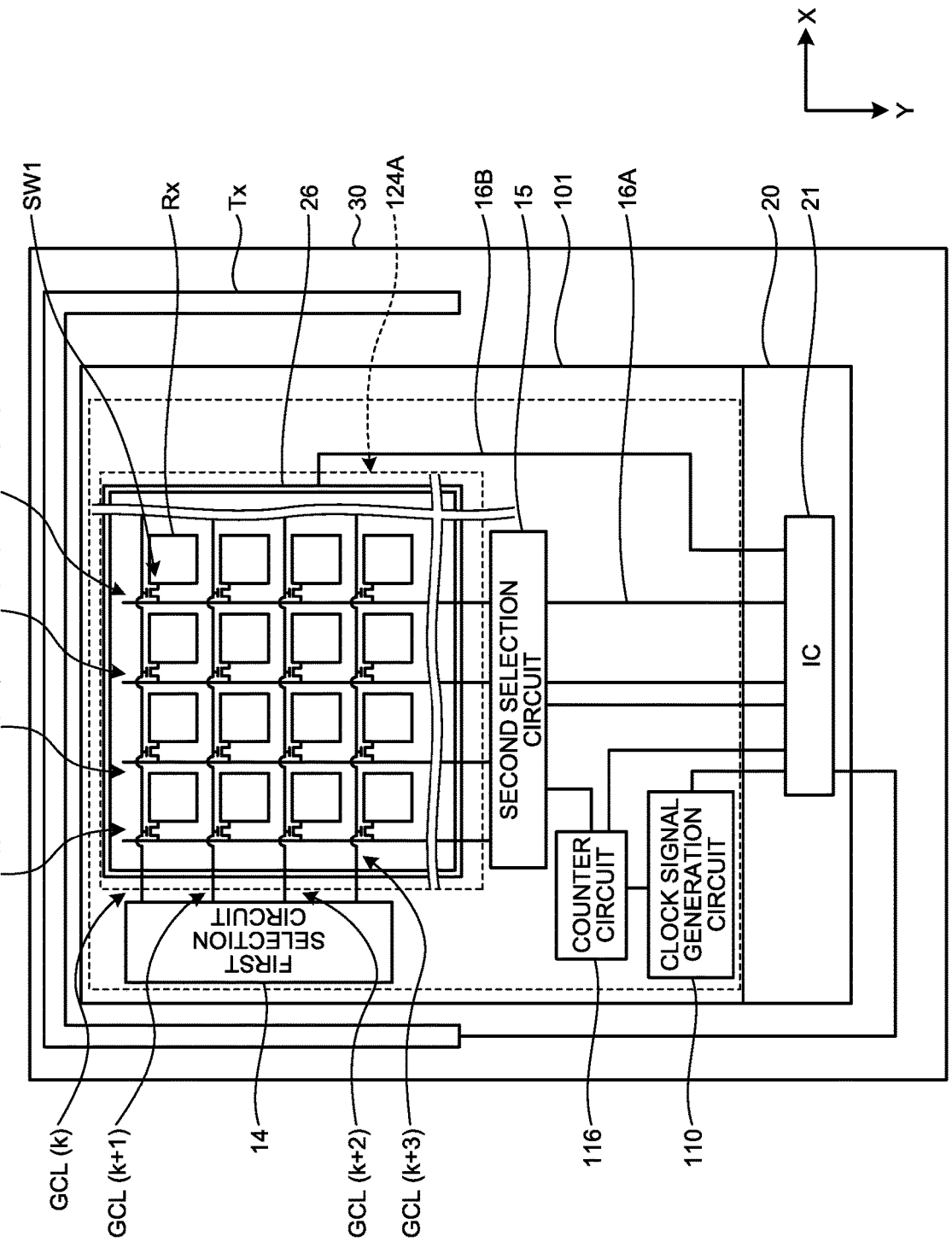
FIG. 23 is a plan view of a detection apparatus according to a seventh embodiment.

In the first embodiment, the shield layer 24 is arranged between the layer in which the detection electrodes Rx are formed and the layer in which the switch elements SW1 are formed as illustrated in FIG. 7. However, the arrangement is not limited thereto. FIG. 23 is a plan view of a detection apparatus 100A according to a seventh embodiment. As illustrated in FIG. 23, this shield layer 124A is arranged so as to be superimposed on circuits formed on the base member 101 such as the first selection circuit 14 and the second selection circuit 15 in a plan view. The shield layer 124A is arranged so as to surround the detection area DA. In the seventh embodiment, the shield layer 124A is arranged so as to surround the four sides of the rectangular detection area DA. However, the arrangement is not limited thereto. The shield layer 124A is only required to be arranged so as to be at least superimposed on the circuits arranged on the base member 101 and may be arranged along two sides of the detection area DA in which the first selection circuit 14 and the second selection circuit 15 are arranged, for example.

Figure 24:
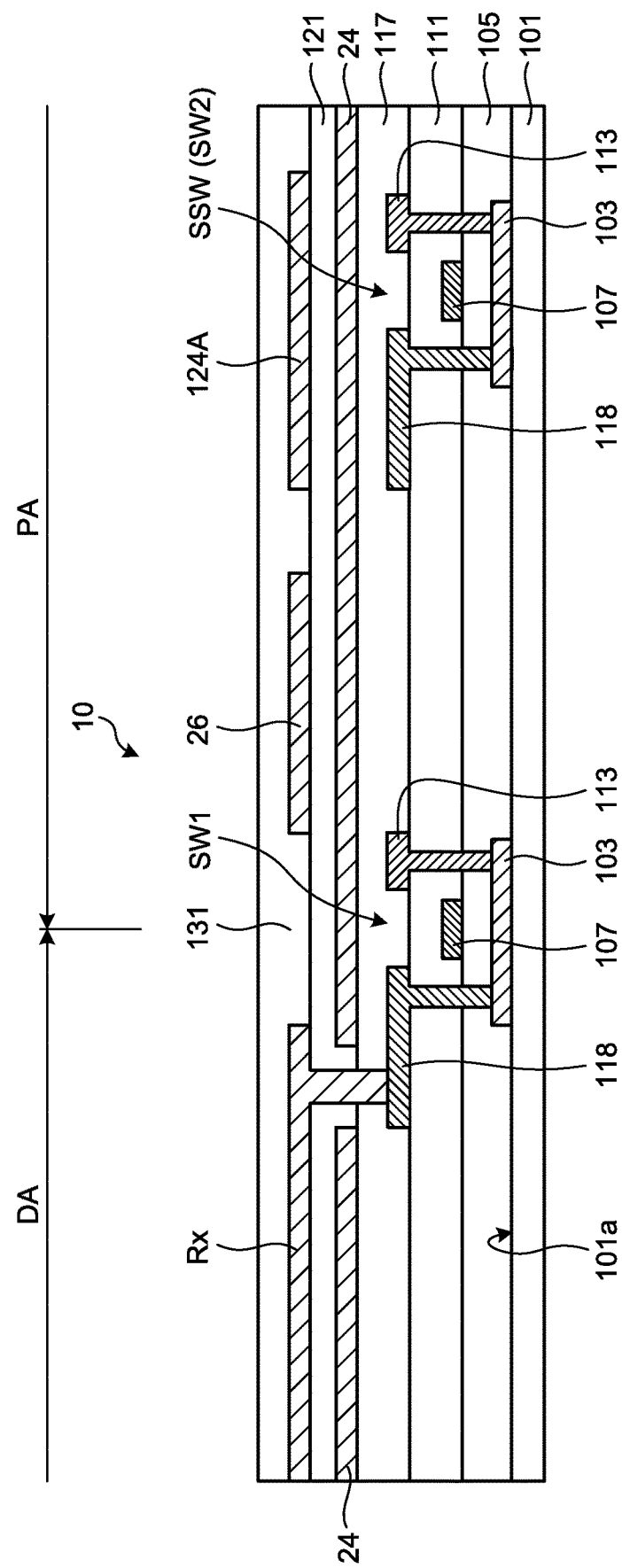
FIG. 24 is a sectional view of the detection apparatus according to the seventh embodiment.

The shield layer 24 may not be provided in the detection apparatus 100A, and instead the shield layer 124A may be provided in the same electrode layer as the detection electrode Rx to cover a switch element SSW included in the circuits formed on the base member 101. The shield layer 124A is formed of a transparent conductor such as ITO. The switch element SSW is the switch element SW2 included in the second selection circuit 15, for example. Although the seventh embodiment exemplifies a case in which the shield layer 24 is not provided, the configuration of the detection apparatus is not limited thereto. As illustrated in FIG. 24, both the shield layer 124A and the shield layer 24 may be arranged. FIG. 24 is a sectional view of the detection apparatus 100A in which both the shield layer 124A and the shield layer 24 are provided.

Preferable embodiments of the present invention are described above, but the present invention is not limited to such embodiments. Contents disclosed in the embodiments are merely exemplary, and various kinds of modifications are possible without departing from the gist of the present invention. Any modification performed as appropriate without departing from the gist of the present invention belongs to the technical scope of the present invention.

What is claimed is:

1. A detection apparatus comprising:
a plurality of detection electrodes;
a detection circuit configured to be coupled to the detection electrodes to detect detection signals corresponding to changes in capacitance of the detection electrodes;
a coupling circuit configured to cause the detection electrodes to be a coupled state in which the detection electrodes are coupled to the detection circuit and a non-coupled state in which the detection electrodes are uncoupled from the detection circuit,
wherein the detection apparatus has a plurality of selection patterns of the detection electrodes causing detection electrodes as first selection targets among the detection electrodes to be the coupled state in which the detection electrodes as the first selection targets are coupled to the detection circuit and causing detection electrodes as second selection targets that are not included in the first selection targets to be the non-coupled state in which the detection electrodes as the second selection targets are not coupled to the detection circuit, and
wherein the selection patterns do not include any selection patterns causing detection electrodes as the first selection targets to be the non-coupled state and causing detection electrodes as the second selection targets to be the coupled state; and
a computing circuit configured to subtract a signal for subtraction obtained when all the detection electrodes are the first selection targets, from a double signal obtained by doubling a signal intensity of one of the selection patterns.

2. The detection apparatus according to claim 1,
wherein the coupling circuit has a first mode and a second mode different from the first mode,
wherein, in the first mode, the coupling circuit performs either a first selection pattern causing the first selection targets to be the coupled state and causing the second selection targets to be the non-coupled state or a second selection pattern causing the first selection targets of the first selection pattern to be the non-coupled state and causing the second selection targets of the first selection pattern to be the coupled state, and
wherein, in the second mode, the coupling circuit performs both the first selection pattern and the second selection pattern.

3. The detection apparatus according to claim 1,
wherein the detection electrodes are arranged in a first direction and a second direction crossing the first direction.

4. The detection apparatus according to claim 1, further comprising:
a drive electrode arranged at a position adjacent to the detection electrodes; and
a drive signal generation circuit configured to be coupled to the drive electrode to supply a drive signal to a conductor for transmission.

5. The detection apparatus according to claim 4,
wherein the detection electrodes are provided to one face of an insulating substrate, and
wherein a height of the conductor for transmission from the one face is greater than a height of the detection electrodes from the one face.

6. The detection apparatus according to claim 1, further comprising:
a drive electrode facing the detection electrodes in a noncontact manner; and
a drive signal generation circuit configured to be coupled to the drive electrode to supply a drive signal to the drive electrode.

7. The detection apparatus according to claim 1, further comprising a drive signal generation circuit coupled to the detection electrodes to supply a drive signal to the detection electrodes.

8. The detection apparatus according to claim 1,
wherein the coupling circuit determines the selection patterns based on positive and negative signs of an Hadamard matrix.

* * * * *